United States Patent [19]
Knee et al.

[11] Patent Number: 6,014,184
[45] Date of Patent: *Jan. 11, 2000

[54] ELECTRONIC TELEVISION PROGRAM GUIDE SCHEDULE SYSTEM AND METHOD WITH DATA FEED ACCESS

[75] Inventors: Robert Alan Knee, Lansdale, Pa.; Anthony R. Favia, Aurora, Colo.; Bruce Davis; Larry Miller, both of Greenwood Village, Colo.

[73] Assignees: News America Publications, Inc., New York, N.Y.; Telecommunications of Colorado, Inc., Englewood, Colo.

[ * ] Notice: This patent is subject to a terminal disclaimer.

[21] Appl. No.: 08/775,479

[22] Filed: Dec. 30, 1996

Related U.S. Application Data

[63] Continuation of application No. 08/476,217, Jun. 7, 1995, Pat. No. 5,589,892, and a continuation-in-part of application No. 08/428,809, Apr. 24, 1995, which is a continuation-in-part of application No. 08/247,101, May 20, 1994, which is a continuation-in-part of application No. 08/119,367, Sep. 9, 1993.

[51] Int. Cl.⁷ .............................. H04N 5/50; H04N 5/445
[52] U.S. Cl. ...................... 348/731; 348/564; 348/569; 348/906
[58] Field of Search .................................. 348/563, 564, 348/569, 570, 553, 473, 474, 478, 731, 732, 734, 725, 906, 460, 588, 461, 468; H04N 5/50, 5/445

[56] References Cited

U.S. PATENT DOCUMENTS

| | | | |
|---|---|---|---|
| 4,908,707 | 3/1990 | Kinghorn | 348/473 |
| 4,977,455 | 12/1990 | Young | 348/473 |
| 5,047,867 | 9/1991 | Stubbe et al. | 348/570 |
| 5,210,611 | 5/1993 | Yee et al. | 348/906 |
| 5,223,924 | 6/1993 | Strubbe | |
| 5,353,121 | 10/1994 | Young et al. | 348/563 |
| 5,523,796 | 6/1996 | Marshall et al. | 348/906 |
| 5,589,892 | 12/1996 | Knee et al. | 348/564 |

FOREIGN PATENT DOCUMENTS

| | | |
|---|---|---|
| WO9414282 | 6/1994 | WIPO . |
| WO9421085 | 9/1994 | WIPO . |
| WO9507003 | 3/1995 | WIPO . |

OTHER PUBLICATIONS

"Digital On–Screen Display, A New Technology for the Consumer Interface" by Brugliera Jun. 10, 1993, 18th International Television Symposium and Technical Exhibition, Montreaux (CH) pp. 580–583.

*Primary Examiner*—Michael Lee
*Attorney, Agent, or Firm*—Weil, Gotshal & Manges, LLP

[57] ABSTRACT

An electronic program schedule system with access to both stored television program schedule information and data feeds containing status information for live programs such as sporting events. The system includes a data processor for receiving program schedule information for a plurality of programs and data feeds containing status information for certain of the programs, and a video display generator for generating a display signal simultaneously comprising information from both the stored schedule information and the received data feed. The system is further provided with user control means such as a remote controller for generating user control commands and transmitting signals to the data processor in response thereto so as to control the content of the display signal. The display signal may be displayed on a display apparatus such as a television receiver. In addition, the program schedule system of the present invention utilizes category-specific user interfaces providing access to multiple services including television programs, received data feeds, home shopping services, and video games as well as the stored program schedule information.

19 Claims, 71 Drawing Sheets

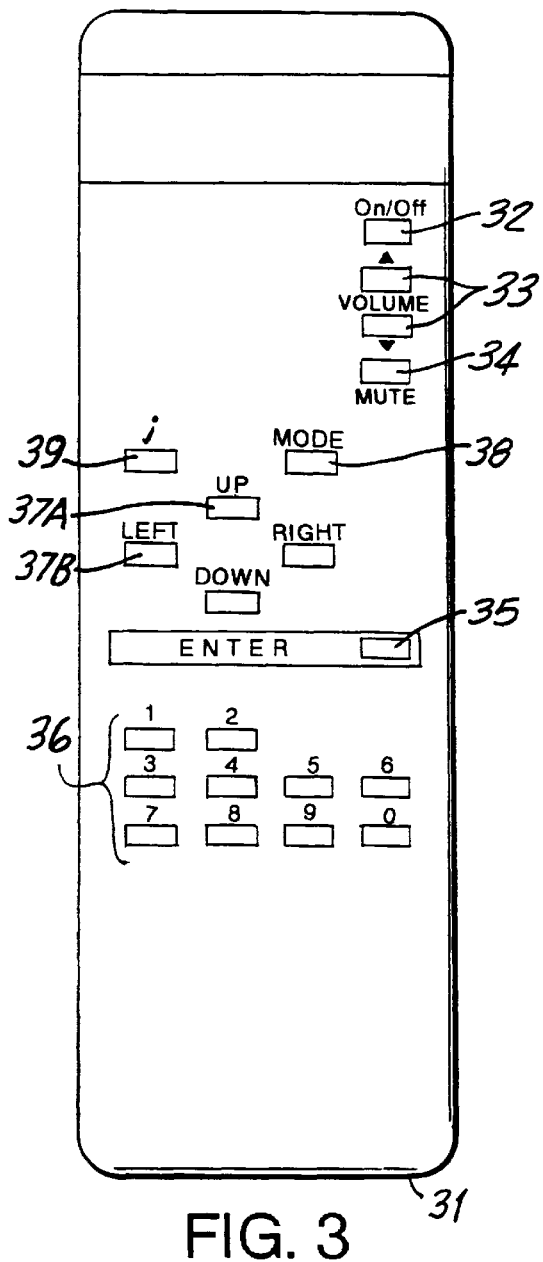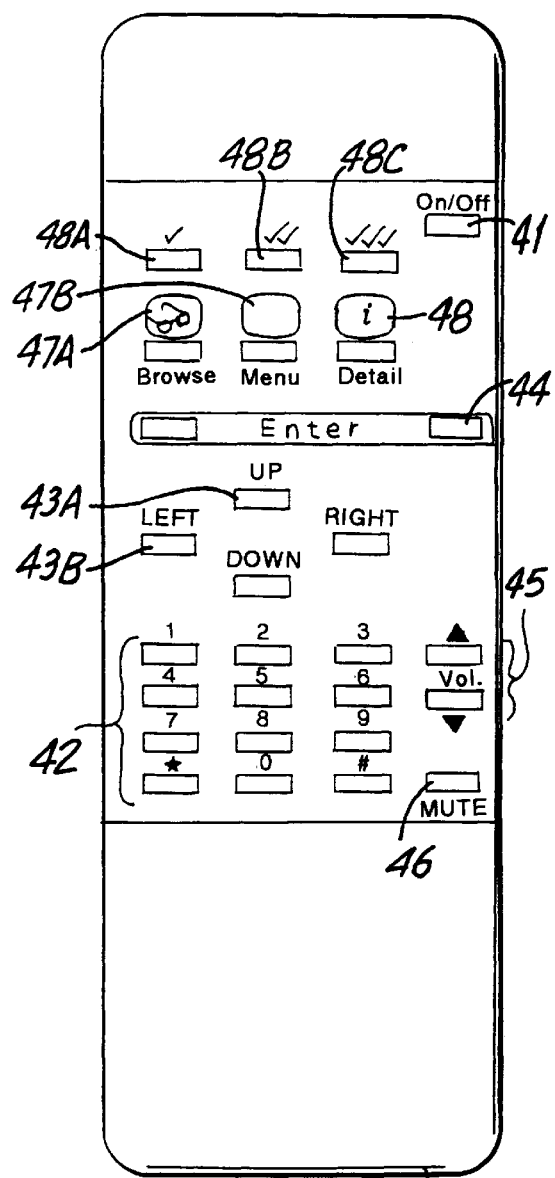
FIG. 3
FIG. 4

FIG. 18

All—180
Listings

TV GUIDE —182
7:13 pm —183

△ Enter —184
▽  i

| 4 KRON | Baseball (4:30-7:30p) | | |
|---|---|---|---|
| Today | 7:00p | 7:30p | 8:00p | 8:30p |
| 4 KRON —185 | Baseball | Ent. Tonight | Fresh Prince | Blossom |
| 5 KPIX | Evening Shade | Major Dad | Murphy Brown | |
| 6 HBO | JFK: In His Own Words | JFK | |
| 7 KGO | Jeopardy! | Wheel of Fortune | Day One | |

| LISTINGS | ⇕ Listing ◁▷ | 6:06P AUG 16 |

| 5:00 | 5:30 | 6:00 | 6:30 | 7:00 | 7:30 | 8:00 |

NBC 4 News
ABC 6 News
CBS 10 CBS News
Fox 28 Club Paradise (5:00)
PBS 29 Mystery!
COM 30 Tribute to Carson
HBO 33 Gremlins 2: The New Batch
ESN 34 Tennis (4:30)
AMC 35 Arise my Love (5:00)
DSC 37 Natural World
NIK 38 I Love Lucy

FIG. 25

Quote Watch

XPRESS
5:53 pm

| Alarms | Symbol | Last | Vol(100s) | Change |
|---|---|---|---|---|
| | CMCSA | 18 | 5415 | -0.25 |
| | CVC | 29.75 | 129 | -0.125 |
| | JOIN | 10.5 | 22 | 0 |
| ◁ | LBTYA | 18.125 | 873 | 0.625 |
| ◁ | LBTYB | 18 | 0 | 1.5 |
| | TCOMA | 18.25 | 22970 | -0.5 |
| | TCOMB | 19.25 | 51 | -0.375 |
| | TUNE | 5.375 | 407 | -0.125 |

Portfolio Value is 433200 and your gain is 443

FIG. 32

STORIES 

Jun 7

US World News

Cubans use Vitamins to combat epidemic

Geneva-A costly campaing to provide vitamins to all Cubans has helped curb a mysterious epidemic that has affected thousands with vision problems, a World Health Organization offical said yesterday.

The outbreak of optical neuritis has dimmed the vision of about 20,000 Cubans and a related malady has affected 6,000 other people, mostly women.

FIG.34

SPORTS

Major League Baseball

Yesterday in National League Action

Colorado 7, Houston 5

San Francisco 5, Chicago 4

Yesterday in American League Action

Detroit 4, Boston 1

Toronto 4, Milwaukee 2

Full Metal Jacket     VHS    $29.95

To order a professionally produced video cassette of this program, select a format then press ⓄⓀ

Video tape Format: ◁ ( VHS ) ▷

Full Metal Jacket     VHS   UPS   $39.95

Please select the payment and shipment methods you would like to use for this order, then press ⓄⓀ

Payment Method: ◁ ( Visa ) ▷

Shipment Method: ◁ ( Fed-X ) ▷

Card #: [          ]    Exp. Date: [      ]

To return to the menu of additional music selections, press (OK)

84 DMX5 Alternative Rock
Counting Crows: Mr. Jones [i] ☆

Flip

FIG. 46

TODAY'S GAMES

| 34 ESPN | Nets at Hawks 45 - 58, 4:10 2nd | *i* |
|---|---|---|
| 61 WXMI | Bulls at Celtics 37 - 36, 3:45 2nd | *i* |
| | Pistons at Hornets 98 - 98, 0:32 4th | *i* |
| | Knicks at Pacers 101 - 90 Final | *i* |
| 9 WXPN | Warriors at Nuggets 80 - 78, 1:12 4th | *i* |
| 34 ESPN | Bucks at Cavaliers (7:30 - 10:00) | *i* |
| 6 WLUC | Phillies at Pirates (8:30 - 10:30) | *i* |
| 18 WSPT | Orioles at Red Sox (8:30 - 10:30) | *i* |

TODAY'S SPORTS TV

| 13 WMMI | NBA NJ Nets at Hawks (4:30 - 7p) | *i* |
|---|---|---|
| 6 WGOP | Wrestling Federation Showdown 6:00 | *i* |
| 11 ESPN | Phillies at Pirates (6:00 - 8:00) | *i* |
| 4 ESPN2 | MichaelJordanRetrospectiv 6:30p  | *i* |
| 7 WYRT | Sports Wrapup (6:30 - 7p) | *i* |
| 11 ESPN | Cubs at Dodgers (8:00 - 11:00) | *i* |
| 4 ESPN2 | Mets at Rockies (8:00 - 11:00) | *i* |
| 45 PRIME | College World Series (8:05 - 11:05) | *i* |
| 38 WGRI | NASCAR Hooters 500 (9:00 - 11:00) | *i* |

Arizona Cardinals     82 ARCA

580

The Cardinals fell to last place in the NFC East this week with their 17 - 10 loss to the Green Bay Packers.

Arizona has dropped four straight road games after winning in Dallas in the season-opener.

The Cardinals, who are in Washington to face the Redskins this week, are 2-2 against the NFC East in 1994.

National Hockey League    192 NHL
590
SWITCHING SITES
The NHL on Monday canceled plans to hold its amateur draft in Winnipeg with the sale of the Jets imminent. A new location for the draft has not yet been chosen.
 CBS/Fox 1994 Stanley Cup Playoff Video
 CBS/Fox 1995 NHL All-Star Game Video
FIG.57

ELECTRONIC TELEVISION PROGRAM GUIDE SCHEDULE SYSTEM AND METHOD WITH DATA FEED ACCESS

This application is a continuation of application Ser. No. 08/476,217 filed on Jun. 7, 1995, now U.S. Pat. No. 5,589,892, and is a continuation-in-part of application Ser. No. 08/428,809, filed Apr. 24, 1995 which is a continuation-in-part of application Ser. No. 08/247,101, filed May 20, 1994 which is a continuation-in-part of application Ser. No. 08/119,367, filed Sep. 9, 1993.

BACKGROUND OF THE INVENTION

This invention relates to an electronic program schedule system, which provides a user with schedule information for programs viewed by the user on a television receiver, whether broadcast, cablecast, delivered by satellite, optical fiber, or any other means of program distribution. More particularly, it relates to an electronic program guide that provides the user with the capability to access data feeds containing one or more types of information and to order products and services remotely at the user location simply by depressing a button on a remote control device or other user-controlled device.

Electronic program guides ("EPGs") for television systems are known in the art. For example, one prior system used an electronic character generator to display textual schedule information on the full screen of a television receiver. Other prior systems presented electronically stored program schedule information to a user for viewing while allowing the user to select display formats. Still other systems employed a data processor to input user-selection criteria, then stored only the program schedule information meeting these criteria, and subsequently used the stored information to automatically tune a programmable tuner or activate a recording device at the time of broadcast of the selected television programs. Such prior systems are generally discussed in "Stay Tuned for Smart TV, " published in the November 1990 issue of *Popular Science*.

Collectively, the prior electronic program systems may be difficult to implement and cumbersome to use. They also fail to provide viewing capabilities that address in a more realistic manner the viewing habits of the users of these electronic program systems. Moreover, many of these systems are complex in their design and are expensive to implement. Ease of use and economy are primary concerns of television program distributors and viewers as they contemplate dramatic increases in the number and nature of program networks and other television-based services. And, as the number of television channels available to a user increases dramatically with the advent of new satellite and cable-based technologies, the utility of these prior systems substantially diminishes.

These prior-art systems also fail to provide the user with sufficient information, for example pricing and the like, about pay-per-view events, premium services or other packaged programming to which the user does not subscribe, nor do they provide the user with the capability to automatically purchase such programming on demand or impulse. Moreover, these prior-art systems are deficient in that they fail to provide an efficient and automatic method of updating or replacing the application software programs that implement the electronic guide at the user sites, relying instead on manual or other cumbersome forms of revision or replacement or hardware-based systems that can not be updated without physical replacement of integrated circuits and/or other parts.

Nor do these prior electronic guide systems have the capability of linking the user to other applications or information systems which are not part of the electronic program guide application or data.

Nor do these prior electronic guide systems provide video promotion of television programs and services that are functionally linked and visually displayed in an integrated fashion. Program promotion is an important element of the effective marketing of television programming. The promotion of pay-per-view pay (i.e., "a la carte") programs and other unregulated program services is particularly important to cable television operators in the wake of re-regulation by the federal government. The current method of promoting such programming using video is through dedicated "barker" channels that use full screen continuous trailers (i.e., previews) which may or may not be accompanied by prices and ordering information. Recently, such promotional videos have been shown in split screens where part of the screen shows general schedule information for a time period roughly corresponding to the time period during which the general program being promoted is shown. Accordingly, there exists a need for an electronic program guide which can provide improved display and linking of video promotions with program schedule information and order processing functions.

The prior electronic program guides also fail to provide the user with a simple and efficient method of controlling access to individual channels and individual programs. The amount of adult situations involving sex and violence has steadily increased during the last 40 years. The issue of how this affects children or other viewers has gained national attention. Providing a parent with the ability to lockout a channel is a well known and widespread feature of certain television receivers and cable converter boxes. Despite this availability, the feature is seldom used by parents. The main impediments to its effective use are the cumbersome ways in which it is generally implemented, as well as the requirement that entire channels be blocked in order to block access to any objectional programming. A channel-oriented parental lock is unfair to other programmers on the blocked channel—who, for example, offer adult-oriented programming in the evening and youth-oriented programming the following morning—and inconvenient for viewers who want access to such programs. Thus, there is a particular need for a system which provides password control to individual programs and channels using a flexible and uncomplicated on-screen user interface.

The prior electronic program guides are also deficient in that they do not provide the user with the ability to view on demand current billing status and, thus, a need exists for a system which can provide the user with current billing information on the user's demand.

An additional problem with prior program guides is that when displaying schedule information in grid format, i.e., columns representing time slots and rows representing channels, program titles generally are width-wise truncated to fit into the cells of the grid. The width of a grid cell varies with the duration of the program. Since a 30 minute program is allotted only a small amount of space for the program title and description, titles and/or descriptions for half and even full hour programs often must be truncated in order to fit into the allotted space. Some systems simply cut off the description of a program without abbreviating it in any way, such that the user is unable to determine the subject matter of the program. For example, a recent television program display included the following text in a grid cell: "Baseball: Yankees v." Although some systems partially alleviate this problem by providing two lines of text in each grid cell, this solution is not ideal because program descriptions may still be truncated.

A similar problem arises as the time slots change, either automatically or in response to a user control command. Typically, 90 minutes of schedule information is displayed at one time and the 90 minute window is shiftable in 30-minute increments. In the case where a 30 minute shift causes a 30 minute size grid cell to display, e.g., a two-hour movie, it is likely that the full title of the movie will not fit into the cell. Truncation of the title is thus required in this situation as well. In this case, while two lines of text may be desirable to fit the title in the 30 minute cell, the 60 and 90 minute cells may require only one line of text to display the title.

The prior electronic program guides also lack a method for creating a viewing itinerary electronically while still viewing a program currently appearing on the television receiver. Moreover, these prior program guides leave much guess work for the user as he navigates through a sequence of channels. When skimming through channels to ascertain the program then being displayed on any channel, commonly known as "channel surfing," the user needs to guess which program is currently being aired from the video encountered as the user surfs through the channels. Since much—in some cases, up to 30%—of the programming appearing on any given channel at any given time is advertising or other commercial programming, the user is not provided with any clues as to what program is appearing on a selected channel at a given time and must therefore wait until the advertisement or commercial is over before ascertaining the program then appearing on the selected channel. Thus a need exists for a program guide which displays current program schedule information for each channel as the user surfs through the available channels.

Interactive home shopping services are also known in the art. Lacking in the art, however, is an interactive home shopping service deployed in conjunction with an EPG permitting users of the EPG to remotely order products and services associated with the EPG or the program listings included in the EPG.

In addition, with the availability of techniques for electronically blocking the home recording of copyrighted programs, it is now possible to prevent the loss of copyright royalties and other revenues that result when a home viewer makes an archival copy of a copyrighted program. Many viewers may be willing to pay for professional copies of these programs that they can no longer copy themselves by recording off-the-air. As a result, a new marketing opportunity is available if a convenient means for acquiring purchased archival copies of copyrighted programs can be provided. Users who would otherwise have produced an amateur recording of a program using consumer equipment may decide to purchase a professionally produced and packaged copy from a licensed distributor if they are unable to record the program on their own.

A further problem with existing EPGs is they have not adapted to the changing role of television in today's society. Increasingly, television is being used for more than just the delivery of broadcast program signals and is taking on a much broader role as an intelligent, interactive multimedia information terminal. The television is no longer a dumb device for simply receiving widely distributed broadcast signals. Return paths for providing information upstream from viewers to program distributors are currently in use. Intelligence is usually provided with a set-top box that provides memory and data processing capabilities. Typically, the EPG resides in the set-top box as well. The types and amount of information accessible through a television receiver have increased dramatically. In addition to the availability of nearly 100 and in some cases more than 100 channels of programming, the television is now also being used for access to games, home shopping and banking services, and information provided in data feeds.

Because the quantity and types of information available have increased substantially, existing EPGs that provide information on broadcast programs only are inadequate. Although it is known in the art to search and display stored television program listings based on the category of the program, a more sophisticated information filtering system is needed that, in addition to disposing of information on television programs not of interest to the viewer, provides information on other services that are of interest and access to these services in a convenient manner. In addition, due to the large amounts of information available, a more sophisticated user interface is needed for navigating through the different services.

Accordingly, there is a need in the art for a simplified electronic program schedule system that may be more easily implemented, and which is appealing and efficient in operation. There is also a need to provide the user with an electronic program schedule system that displays both broadcast programs and electronic schedule information in a manner not previously available with other electronic program schedule systems, particularly those using a remote controller.

For example, there is a particular need for a flexible program schedule system that allows a user to view selected broadcast programs on a portion of the screen of the television receiver while simultaneously viewing program schedule information for other channels and/or services on another portion of the screen. There is also a need for such a program schedule system that permits the user to select from a plurality of selectable display formats for viewing the program schedule information. It is also preferred to have a system that indicates to the user those keys on the remote controller that are active in any particular mode of operation. There also exists a need for such a system that will give a user the capability to set a programmable reminder for viewing a program scheduled to air at a future time.

There is also a need for an electronic guide system providing the user with comprehensive information about pay-per-view events, premium services or other packaged programming to which the user does not ordinarily subscribe, and which provides the user with the capability to automatically purchase such programming on demand or impulse. There is also a need for an electronic guide system providing a reliable and efficient method of updating or replacing the application software that implements the electronic guide at the user sites.

There also exists a need for an electronic program guide that operates as a shell or window to provide the user with the capability to access other applications or information systems that are not part of the electronic program guide application or data.

There also exists a need for an interactive home shopping service deployed in conjunction with an EPG permitting users of the EPG to remotely order services and products associated with the EPG or the program listings included in the EPG.

There is also a need for a convenient means for purchasing archival copies of copyrighted programs that cannot be recorded by viewers.

There is also a need for providing EPG users with convenient access to information that may be of interest to users but is not available in the locally stored program schedule information or a received broadcast signal.

It is accordingly an object of the present invention to provide a system that will allow the user to view a broadcast program while, at the same time, interactively viewing program schedule information for other programs.

It is another object of the present invention to provide the user with the ability to select from among a plurality of display formats for the program schedule information.

It is yet another object of the present invention to indicate to the user of the program schedule system those keys on the remote controller active in the particular mode of operation of the system at the time of use.

It is a still further object of the present invention to provide the user of the electronic program schedule system with the capability of setting programmable reminder messages for any future program.

It is yet a further object of this invention to provide the system user with comprehensive information about pay-per-view events, premium services or other packaged programming to which the user does not subscribe and the capability to automatically purchase such programming on demand or impulse.

It is another object of the present invention to provide an electronic guide system that provides a reliable and efficient method of updating or replacing the application software programs that implement the electronic guide at the user sites.

It is still another object of the electronic program guide to operate as a shell or window to provide the user with the capability to access other applications or information systems which are not part of the electronic program guide application or data.

It is yet another object of the electronic program guide to provide a system whereby video promotion of television programs and services are functionally linked and visually displayed in an integrated fashion to facilitate the marketing and sale of such programs and services.

It is still a further object of the present invention to provide password control for access to individual programs, as well as channels, using a protected interactive flexible and uncomplicated on-screen interface.

Another object of the present invention is to provide the user with current programming information for all programs as the user surfs through the available channels.

It is yet a further object of the present invention to provide a system in which the user can access his current billing information on demand.

It is another object of the present invention to provide a system which overlays television program listings against varying background views.

It is yet another object of the present invention to provide an improved display of text in the grid cells comprising a page of television program listings.

It is a further object of the invention to provide an electronic television program guide with an interactive home shopping service for ordering products and services associated with the EPG or a particular program.

It is a further object of the invention to provide an electronic television program guide with an interactive home shopping service for ordering products and services associated with the EPG or a particular program simply by depressing a button on a remote control device or other user-controlled selection means.

Another object of the present invention is to provide an electronic television program guide with convenient access to user-controlled additional information.

These and other objects of the invention are achieved by an electronic program schedule system which includes a receiver for receiving broadcast, satellite or cablecast television programs for a plurality of television channels and a tuner for tuning a television receiver to a selected one of the plurality of channels. A data processor receives and stores in a memory television program schedule information for a plurality of television programs to appear on the plurality of television channels. A user control apparatus, such as a remote controller, is utilized by a viewer to choose user control commands and transmit signals in response to the data processor which receives the signals in response to user control commands. A television receiver is used to display the television programs and television program schedule and other information. A video display generator receives video control commands from the data processor and program schedule information from the memory and displays a portion of the program schedule information in overlaying relationship with a television program appearing on a television channel in at least one mode of operation of the television programming guide. The data processor controls the video display generator with video control commands, issued in response to the user control commands, to display program schedule information for any chosen one of the plurality of television programs in overlaying relationship with at least one television program then appearing on any chosen one of the plurality of channels on the television receiver.

The EPG system of the present invention is further provided with an interactive home shopping service permitting the user to order products or services associated with a program from an EPG display using a remote control device or other user-controlled selection means. The data processor is configured to generate user product and service requests and provide them to a central location for processing. Telephone lines, cable, optical fiber, or wireless transmissions may be used for providing the requests to the central location.

In addition, the EPG system of the present invention is provided with data feeds containing different types of information and selectable for display by the user on an on-demand basis. The data feeds may contain many different types of up-to-the-minute information, including sports scores, stock market quotations, general news, etc. Information from the stored program schedule information is combined with information obtained from received data feeds and displayed simultaneously. In an exemplary embodiment, the stored program schedule information comprises an identification of teams participating in a live sporting event and the channel on which the event is being broadcast and the information received from the data feed comprises information regarding the status of the game such as the current score and time remaining.

A related aspect of the present invention is the use of virtual channels for convenient access to different categories of information obtained from data feeds. The user may thus access data feeds in the same manner as television channels and customize a user interface by creating a favorite channel list comprised of both real and virtual channels.

BRIEF DESCRIPTION OF THE DRAWINGS

FIG. 3 depicts a remote controller that can be used in connection with the preferred embodiment of the electronic program guide system of the present application.

FIG. 4 depicts an alternative embodiment of the remote controller shown in FIG. 3.

FIG. 18 shows a grid listing of schedule information displayed in an All Listings mode of operation of the preferred embodiment of the present invention.

FIG. 25 shows another grid listing of schedule information displayed in an All Listings mode of operation of the present invention.

FIG. 32 shows information that appears in a Quote Watch menu in connection with the Interactive Television mode of operation shown in FIG. 31.

FIG. 34 is a menu showing information that appears in a news display in the Interactive Television mode of operation of the preferred embodiment of the present invention.

FIGS. 43A–E illustrate one embodiment of a series of screens that may be used for ordering a product associated with a program displayed in the EPG.

FIG. 46 illustrates the product or service ordering feature in conjunction with program information for a music program.

FIG. 50 is an example of how information form a data feed may be combined with information from stored program schedule information.

FIG. 57 illustrates an embodiment combining the product ordering and virtual channel features of the present invention.

DETAILED DESCRIPTION OF THE PREFERRED EMBODIMENT

System Configuration

Figure 1:
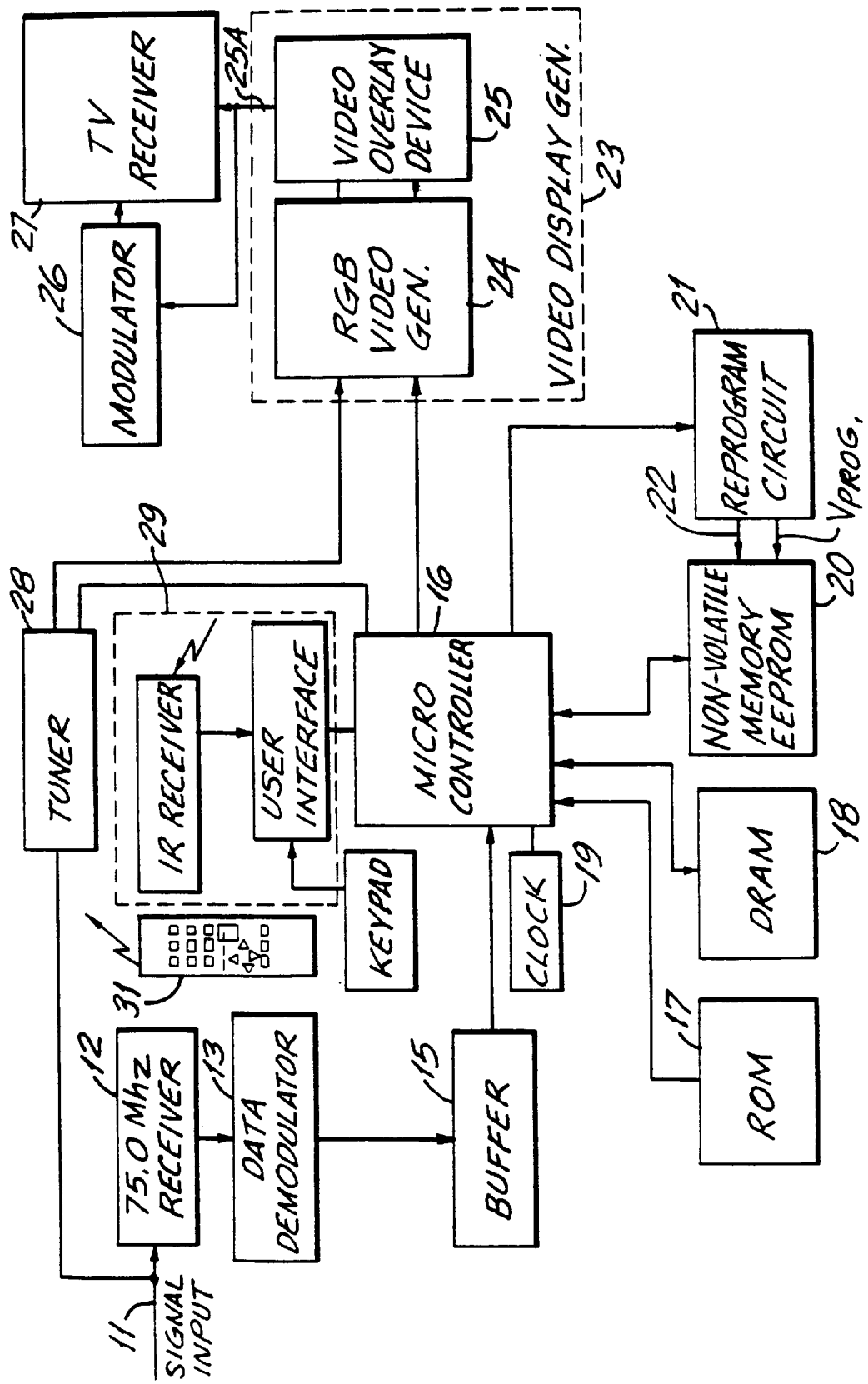
FIG. 1 is a block diagram showing various components of the preferred embodiment of the invention herein.

FIG. 1 is a block diagram showing various components of the electronic program schedule system generally designated as 10. Physically, these system components can be located in a user's set-top cable converter box or other signal reception or processing device, such as a satellite receiver. Alternatively, the components can be mounted in a separate housing, or included as part of a television receiver, VCR, personal computer, or multimedia player; or reside as a distributed application in a broadband network architecture.

An input signal 11 is connected to a receiver 12, which receives a transmitted data stream from a data provider. The data stream may contain, for example, information about programs or services available in a particular market, geographical or otherwise. The input signal 11 can originate, for example, as part of a standard broadcast, cablecast or satellite transmission, or other form of data transmission, such as video dial tone. The data provider is a program information provider, the satellite uplink manager, a local cable operator, or a combination of these sources, and the data stream contains program schedule information for all television programs and other services available in the operator's geographical market.

The data stream may be modulated and then transmitted on the cable line in any number of ways, including as part of a dedicated channel transmission operating at a frequency of, for example, 75 MHz. Those of skill in the art will understand that numerous other transmission schemes can be used to transmit the data stream, such as embedding it in the vertical blanking interval of a program broadcast signal. As will be discussed in greater detail below, according to the present invention, the transmitted data stream may additionally contain application software for implementing or updating the electronic program guide at the user site.

The transmitted program schedule data or application software is received by the receiver 12 on signal input line 11. The received signal is passed from the receiver to a data demodulator 13, such as a QPSK demodulator or a GI Info-Cipher 1000R, which demodulates the transmission and passes it to a buffer 15.

A microcontroller 16, such as a M68000EC, receives data passed to the buffer 15. Bootstrap operating software, which may be used for capturing electronic program guide application software updates, is stored in a read only memory (ROM) 17. The microcontroller 16 uses the received program schedule information to build a database by storing the data in appropriately organized records in dynamic random access memory (DRAM) 18. The stored schedule information can be updated on a periodic basis, such as hourly, daily or weekly, or at any time when changes in scheduling or other factors warrant an update. The system also includes a system clock 19.

Alternatively, the program schedule information could be supplied in a ROM, disk or other non-volatile memory, or it could be downloaded to a storage disk or other data storage device. The invention herein is not directed to the particular method of transmission or reception of the schedule information.

If the microcontroller 16 recognizes the received data as application software which controls the program schedule system, as opposed to program schedule information, it stores it in non-volatile memory, such as an electrically erasable programmable ROM (EEPROM) 20 or battery-backed static RAM (SRAM). This configuration allows revised or replacement versions of the application software to be downloaded directly from the software developer to the user site through the cable or other transmission system.

In the case where an EEPROM is utilized, revised or replacement versions of the application software downloaded from the developer are first stored in DRAM 18 by the microcontroller 16, under direction of the downloading operating software stored in the ROM 17. The stored application software can then be checked for accuracy by, for example, a checksum analysis or other verification routine.

After the accuracy of the application software has been verified, the microcontroller 16 initiates a routine to re-program the EEPROM 20, where the application software is permanently stored. The microcontroller 16 will issue proper control commands to a reprogram circuit 21, which is adapted to supply the proper program voltage and logic control signals 22 required to erase and write to the EEPROM. It supplies this program voltage, Vprog, as well as any other required control signals, such as read or write enable, to the EEPROM 20 upon command from the microcontroller 16. After the EEPROM 20 has been electrically erased, the microcontroller 16 initiates transfer of the new application software from the DRAM 18 to the EEPROM 20 for storing.

When a battery-backed SRAM is utilized as non-volatile memory, the microcontroller stores the revised or replacement version of the application software downloaded from the developer directly in the SRAM, again under direction of the downloading operating software stored in the ROM. The stored application software can then be checked for accuracy by, for example, a checksum analysis or other verification routine.

When power is first applied to the system 10, the bootstrap operating software verifies that the program guide application software is resident in memory. If it is not resident, the bootstrap operating software waits for a download of the software. Once the application software is resident, the microcontroller 16 executes the application program software from a dedicated portion of the DRAM 18. Alternatively, the application software can be executed directly from the non-volatile memory 20. Under control of the program guide application software, the microcontroller 16 first verifies that the program schedule information is resident in DRAM 18. If it is not resident, the microcontroller waits for a download of the program schedule information, as discussed above. Alternatively, if the application program is resident in memory, but the database records containing the program schedule information data are not yet available, the application software can be configured to carry out other tasks, such as allowing the user to carry out functions not requiring the program schedule information data, as well as displaying an appropriate message indicating the database data is not yet available.

When the schedule system is operating, as discussed in greater detail hereinbelow, the microcontroller 16 takes the program schedule information stored in the DRAM 18 and, in conjunction with other downloaded data types such as stored bit maps for the screen configuration and the graphic symbol or logo displays stored in non-volatile memory 20 or, alternatively, in DRAM 18, supplies it to a video display generator (VDG) 23, which in the present embodiment may be a commercially available VGA-type graphics card, such as a Rocgen card manufactured by Roctec. The VDG includes a standard RGB video generator 24, which takes the digital program schedule information sent by the microcontroller 16 and converts it to an RGB format in accordance with the bit map for the particular screen display then being presented to the user on the television receiver 27. The configuration of each screen is shown and discussed in greater detail in the System Operation section below.

Figure 2:
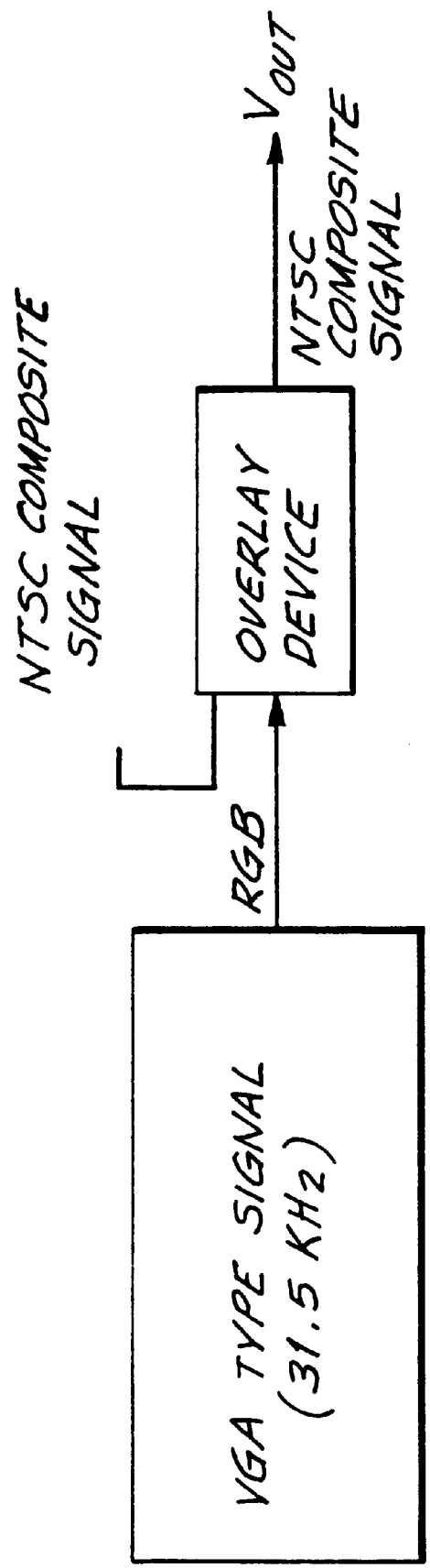
FIG. 2 is a block diagram showing the combination of program and schedule information by the video overlay device utilized in the preferred embodiment of the invention.

The VDG also includes a Video Overlay Device 25, which accepts the RGB video input, as well as an input from conventional television tuner 28, such as a conventional tuner manufactured by General Instrument or a Jerrold DPBB tuner, which supplies a program signal in standard NTSC video format. The overlay device 25 converts and combines the RGB signal with the signal from the tuner 28, and produces a composite NTSC output signal containing both the program signal and the program schedule information, as shown in FIG. 2. This composite video signal is supplied to a modulator 26, shown in FIG. 1, which can be a modulator such as available from Radio Shack, and then to the television receiver 27, which the user keeps tuned to the modulated channel, for example, channel 3 or 4. The composite video signal can also be supplied directly to the television receiver 27 or other receiving device from the VDG through a video port 25A on the VDG.

The system components identified in connection with FIG. 1 can all be implemented in a preferred platform by, for example, an IBM personal computer equipped with a transmission link and a video graphics card, such as those manufactured by Roctec. Other platforms, such as a cable converter box equipped with a microprocessor and memory, or a broadband network also could be used. Examples of the particular components are as follows: Microcontroller—Motorola part no. MC68331-16; ROM—Texas Instruments part no. TMS27PC512; DRAM—Texas Instruments part no. TM4256; EEPROM—Intel part no. 28F001BX-T. In any event, those of skill in the art will appreciate that the particular details of the hardware components and data storage are a function of the particular implementation of the system, and are not the subject of the present invention.

As discussed in detail below, the user may navigate through the program schedule system with a remote controller, such as that shown in FIG. 3, which operates on conventional principles of remote control transmitter-receiver logic, such as by infrared or other signalling, or other suitable user interface. The remote controller 31 communicates with the microcontroller 16 through the remote controller receiver 29, shown in FIG. 1, which can be a Silent Partner IR receiver and which receives signals transmitted by the remote controller 31 and supplies the microcontroller 16 with a corresponding digital signal indicating the key depressed by the user.

A remote controller suitable for the present invention, such as shown in FIG. 3, which can be a remote controller manufactured by Universal Electronics or Presentation Electronics' Silent Partner, may include a power switch 32, volume 33 and mute 34 controls, an ENTER key 35, 0–9 digit keys 36, four direction arrow keys 37A and 37B, a MODE key 38 and an information key 39 that is designated with a lower case "i." The power 32, volume 33 and mute 34 keys operate in the same manner as conventional remote controllers typically used with present-day television receivers. The numeric digit keys 36 also function in much the same manner as conventional remote controllers. A brief description of the remaining keys follows.

The MODE key 38 takes the user through various layers of the electronic program schedule system 10 and generally allows the user to return to a previous screen when he is in a submenu. The up/down direction arrow keys 37A allow a user to navigate through the different TV program channels when the program schedule system is in a FLIP or BROWSE mode, as will be fully described below, and also allow the user to navigate through highlighted bars displayed on the TV screen when in a MENU mode. The left/right direction arrow keys 37B allow the user to navigate through selected time periods when the program schedule system is in the BROWSE mode, as will also be described below. They further allow the user to navigate across subject-matter categories while in the "Categories" submenu of the MENU mode, as well as to navigate across time periods when the program schedule system is in a pay-per-view ordering mode and, in general, navigate in left or right directions to select various icons and other objects. The information, or "i," key 39 allows the user to view supplemental program and other information during the various modes of the program schedule system. The ENTER 35 key fulfills and inputs a command once the user has made a selection from the remote controller keys. The function and operation of these keys will be made more apparent in the detailed discussion of the FLIP, BROWSE and MENU modes below.

A second embodiment of the remote controller 40 is shown in FIG. 4. This embodiment of the remote controller also includes a power key 41, numeric digit keys 42, direction arrow keys 43A and 43B, information key 48, ENTER or SELECT or "OK" key 44, volume control 45, lockout key 45A, mute keys 46 and help key 48A. It also includes pound sign and star keys.

This embodiment of the remote controller further includes a number of icon keys 47A and 47B, which correspond to different submenus or modes of the program schedule system. The icons 47A and 47B may also be displayed on the TV screen when the program schedule system is operating. The icon keys essentially replace the MODE key 38 used in the embodiment of the remote controller shown in FIG. 3. Using these keys, the user can move from one mode to another simply by depressing the icon key corresponding to the desired mode of operation of the program schedule system. In the embodiment of FIG. 4, the icons 47A and 47B are shown as graphic symbols situated directly above a corresponding color-coded key. Alternatively, the color-coded keys could be eliminated and keys could be formed in the image of the icon itself.

The embodiment of the remote controller shown in FIG. 4 also includes three color-coded viewer preference or favorite channel keys, 48A, 48B and 48C that are situated directly above the icon keys. Each of these keys indicates to the program schedule system a distinct user-created "Channel Preference" or "Favorite Channel" list, which is a listing of a specific subset of channels for a particular user, arranged in the sequential order that the user wishes to view during operation of the program schedule system. The creation of the Channel Preference or Favorite Channel list is discussed in the following section. Thus, the system provides for at least three individual channel subsets for three individual users.

The remote controller of FIG. 4 also may be equipped with a "HELP" key 48A, which, when depressed, causes the microcontroller 16 to retrieve previously stored instruction messages from memory and cause them to be displayed on the television receiver 27. These messages offer help to the user in the form of instructions that guide the user through the operation of the various operating modes of the electronic television program guide. They may be text messages, or instructional video images, or audio programs, depending on the storage capacity of the system, or any combination of these. Moreover, these help messages may be created so that they are context-sensitive, i.e., the messages displayed depend entirely upon the precise point in the operation of the electronic program guide that the user depresses the help key 48A. For example, information could be supplied for operation of the remote controller, for operating the FLIP or BROWSE mode (discussed below), or any other mode of operation of the guide, for impulse ordering, for setting a lockout, etc. In order to accomplish this, each point of operation of the guide could be coded so that the microprocessor could track the current operating point, for example, by temporarily storing the code reflecting the present operating point as the user operated the guide. When the user pressed the help key 48A, the microcontroller 16 would retrieve an appropriate set of messages based on the presently stored operating point code. Additionally, the i key 39 could be used to carry out the function of the help key.

Additionally, each of the functions of the remote controllers can also be integrated into a keypad on the user's cable box or other hardware.

System Operation

In operation, the electronic program schedule system of the present invention functions as follows.

FLIP Mode

Figure 5:
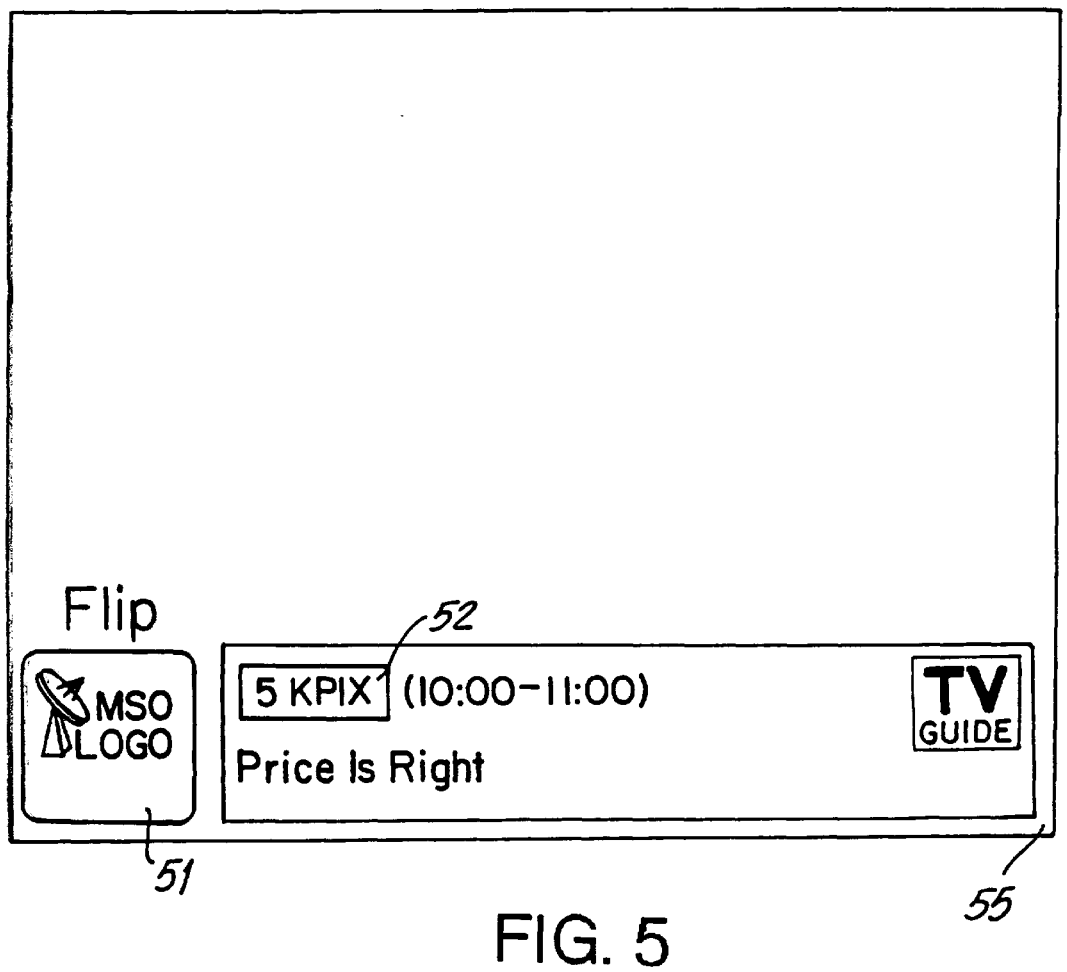
FIG. 5 shows an overlay appearing on a television screen in one mode of operation of the preferred embodiment of the present invention.

When the user is viewing a particular program channel on the television receiver, the program schedule system defaults to a FLIP mode, shown in FIG. 5. In this mode, a graphic overlay 51 containing programming information for the channel currently tuned on the tuner is superimposed in overlaying relationship with a received program signal 55 on the screen of the television receiver 27 whenever the viewer changes the program channel, for example, by using the up/down direction arrows on the remote controller. The video overlay device 25, such as shown in FIG. 1, combines the computer-generated RGB video-graphic overlay information with the NTSC-format program signal from the tuner 28, and supplies an NTSC-format output signal, which includes the program signal from the tuner and the program schedule overlay information for viewing on the television receiver 27.

The programming information contained in the graphic overlay 51 is supplied to the RGB video generator by the microcontroller. In FLIP mode, the microcontroller first searches the program schedule database in, for example, the DRAM 18 to retrieve the programming information for the currently tuned channel 52 corresponding to the current time; i.e., the time at which the user just turned on the television receiver for viewing. The microcontroller 16 then supplies the current channel and program information to the RGB video generator 24 which converts the digital data information to RGB format and supplies it to the video overlay device 25.

In normal operation, the microcontroller 16 defaults to displaying all channels offered by the cable company prioritized by numeric order, which is determined by the broadcast channel position in the radio spectrum or the marketing judgments of local cable operators. Using a "Channel Preference" submenu, or an alternative "Locator" screen, both of which are discussed below, the user can revise the content and/or sequential order of the channels presented to the television receiver 27.

In general, if the user does not issue a change-channel instruction, or other command, from the remote controller 40 within a predetermined time interval while in the FLIP mode, the microcontroller 16 instructs the VDG 23 to remove the graphic overlay 51 from the television receiver, thus presenting only a program signal 55 to the television receiver 27 for viewing. The duration of the predetermined time interval is such that it allows the user sufficient time to read the programming information contained in the overlay. The duration of the predetermined time interval during which the graphic 51 overlay appears is stored in a location in non-volatile memory 20 addressable by the microcontroller 16. The user can change the duration of the time interval, by first entering a Viewer Preference mode, and then selecting an "overlay interval" entry. The microcontroller 16 then causes a user prompt to be displayed on the screen which, for example, asks the user to select an appropriate time period for displaying in the graphic overlay on the screen. Using the numeric keys, the user can input an appropriate response, for example, a period between 5 and 60 seconds, and then depress ENTER. The new interval period is then read and stored by the microcontroller 16 in the overlay time interval location in memory.

If the user issues a change-channel command from the remote controller 40 before or after the predetermined overlay period has elapsed, either by using the up/down direction arrows 43A, or by entering a desired channel number using the numeric keys 42 and then depressing the ENTER key 44, the microcontroller 16 will cause the tuner 28 to tune to the desired channel—either the channel immediately preceding or following the current channel when the up or down arrow 43A is used or the specific channel entered on the numeric key pad by the user—and will also search for and immediately cause to be displayed the current program information for that channel. Thus, as the user flips through the channels, the program schedule information for any selected channel automatically appears in the graphic overlay 51 while the actual program 55 appearing on the selected channel at the particular time occupies the remainder of the screen.

The system can also be configured to issue an error message, such as an audible beep or displayed text indicating an invalid key stroke, if the user depresses either the left or right direction arrow keys while in the FLIP mode.

BROWSE Mode

To initiate the BROWSE mode, the user depresses the MODE switch once while in the FLIP mode when using the first embodiment of the remote controller 31 shown in FIG. 3. Utilizing the second embodiment of the remote controller 40 shown in FIG. 4, the user would depress the button below the BROWSE icon 47A.

Figure 11:
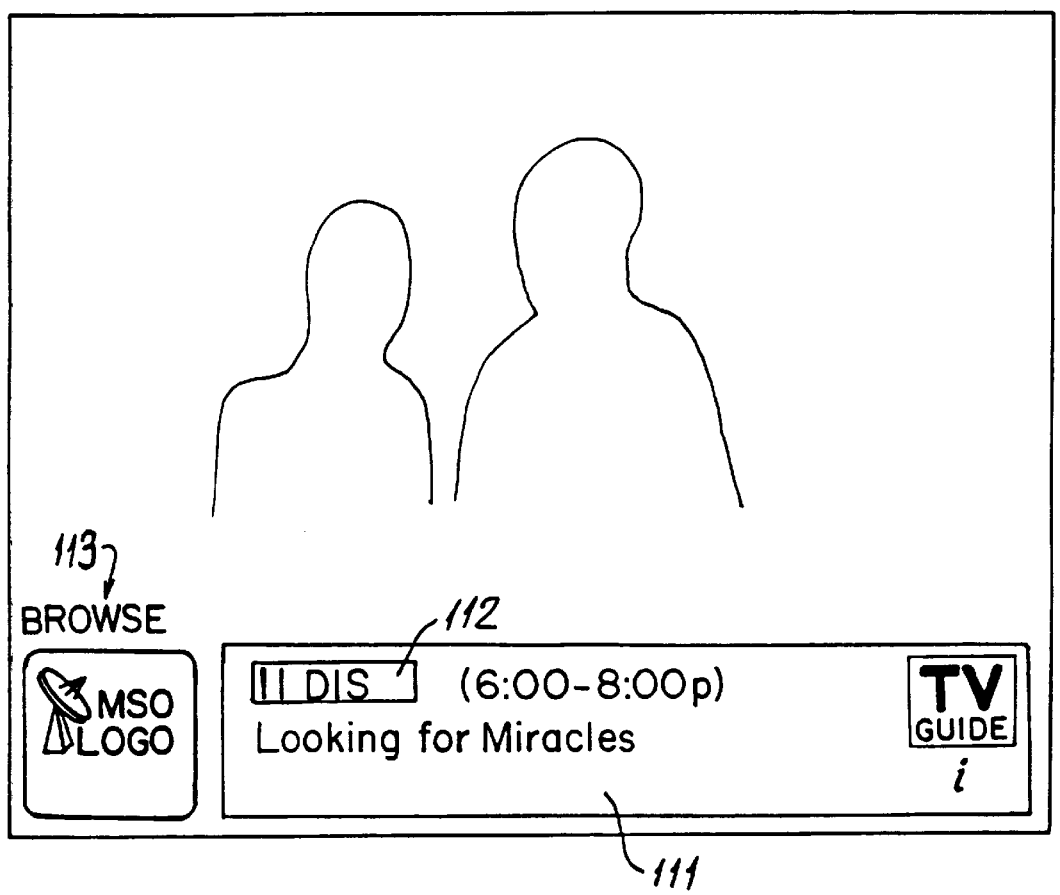
FIG. 11 shows a graphic overlay appearing on a television screen in a BROWSE mode of operation of the preferred embodiment of the present invention.

In the BROWSE mode, the user is provided with the ability to scan through program schedule information for any channel, including, but not limited to, the channel being viewed, while at the same time continuing to view the TV program previously selected. As shown in FIG. 11, in this mode the graphic overlay information that appears in the FLIP mode is replaced with programming information for the channel being browsed, which may or may not be the channel currently being viewed by the user. After the user issues the command from the remote controller 40 to enter the BROWSE mode, a graphic overlay 111 is generated, as in the FLIP mode, with program schedule information for the currently tuned channel 112 and a textual BROWSE indicator 113 to remind the user of the currently active mode, as shown in FIG. 11.

Figure 12:
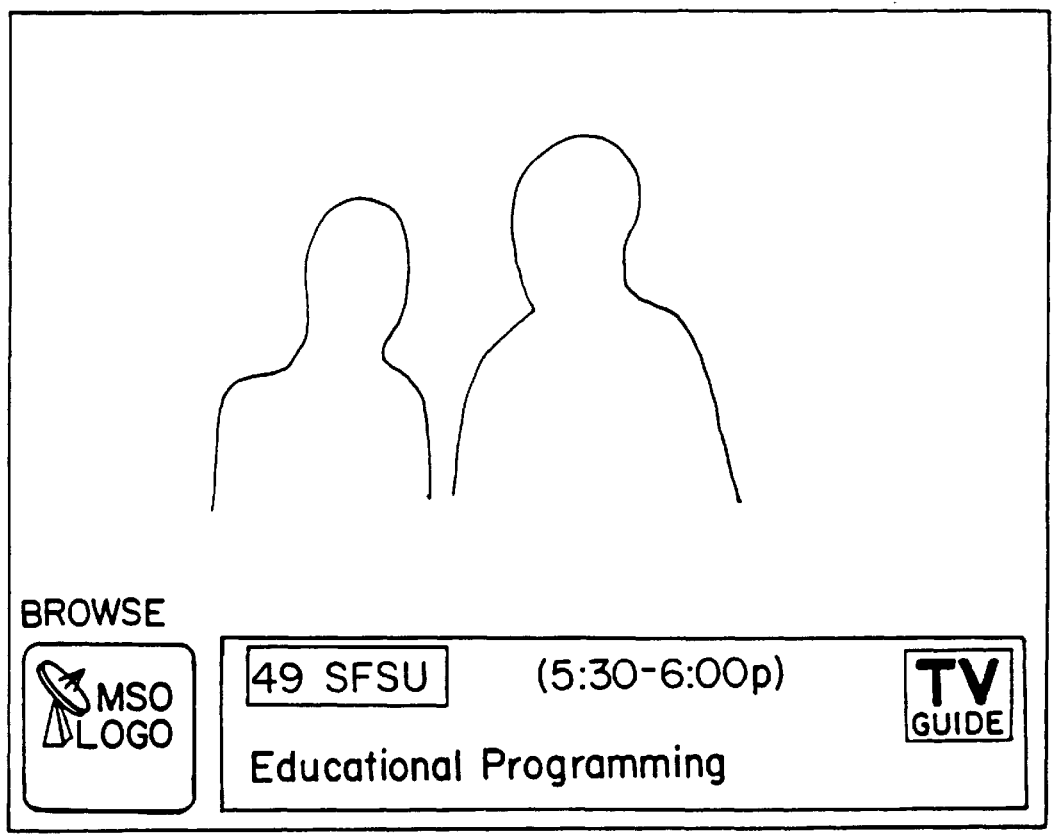
FIG. 12 shows a graphic overlay appearing on a television screen in a BROWSE mode of operation of the preferred embodiment of the present invention having different information from that shown in FIG. 11.

If the user depresses either the up or down direction arrow on the remote controller 40 while in the BROWSE mode, program schedule information for either the prior or next channel is displayed in the graphic overlay portion 111 of the television receiver screen 27, while the tuner remains tuned to the channel program that appeared on the television receiver at the time the user entered the BROWSE mode, as shown in FIG. 12, and continues to so appear. Each successive depression of the up or down direction arrow key produces corresponding program schedule information for the selected channel. The graphic overlay may also include a small video window for showing the actual video signal of a currently aired program or a clip of a future program corresponding to the schedule information then appearing in the BROWSE overlay. In this way, the user can simultaneously scan program schedule information for all channels while continuously viewing at least one selected program on the television receiver. With the advent of sophisticated television receivers, it may also be possible to simultaneously display multiple broadcast programs on a single screen for viewing, or to split the screen to show, for example, broadcast programs in combination with advertisements. The BROWSE feature could be used in any of these situations.

If, at any time during scanning of the program schedule information in the BROWSE mode, the user desires to tune the television receiver 27 from the program channel currently being viewed to the program channel indicated in the schedule information in the graphic overlay, he simply depresses the ENTER button 44 and the tuner 28 will be tuned to that channel. If the user does not want to view another channel and wishes to exit the BROWSE mode, thus removing the graphic overlay 111 with the program schedule information, he must depress the MODE key twice in the first embodiment of the remote controller 31. The first depression of the MODE key takes the user to the MENU mode, discussed below, and the second depression will take the user to the FLIP mode. Once in the FLIP mode, the graphic overlay will be removed after the duration of the time-out interval has passed. In the second embodiment of the remote controller shown in FIG. 4, the user toggles the BROWSE icon key to deactivate the BROWSE mode.

When the user first enters the BROWSE mode and begins scanning channels, the schedule information appearing in the overlay portion 111 describes the programs currently playing on any particular channel. In order to view programming information for later or earlier times, the user employs the left and right direction arrows 43B. As a consequence, the system will display future program schedule information for the particular channel previously selected by the up and down direction arrows, whether it is the channel currently being viewed or any other available channel. The schedule information presented includes the name of the program and program start/stop time. The instant embodiment of the system, in order to conserve memory, will not allow the user to view programming information for a time prior to the current time. The system could be easily modified to provide such information if adequate memory is made available. It may be desirable, for example, to allow a user to view schedule information for an earlier time to find a particular show and then allow the user to command the microcontroller to find and display future airing dates of the show, or the microcontroller could simply do this automatically.

Figure 12A:
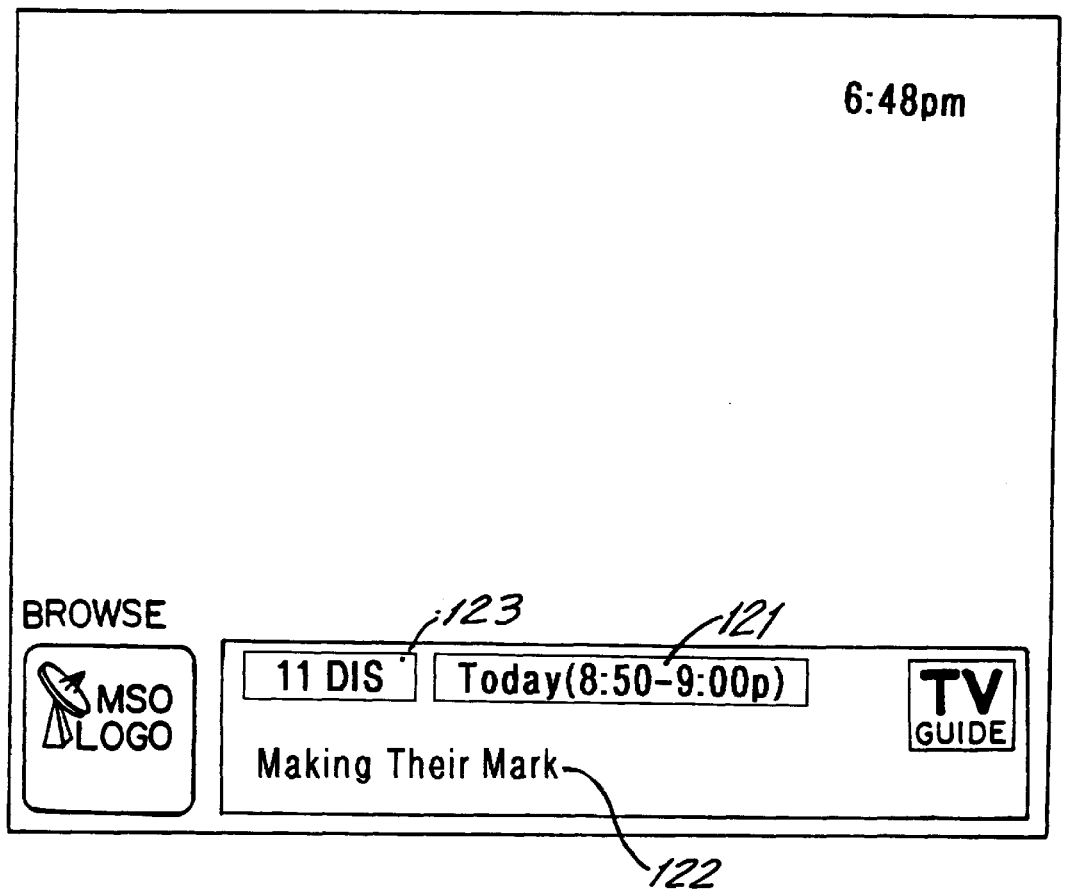
FIG. 12A shows a graphic overlay appearing on a television screen in a BROWSE mode of operation in the present invention displaying schedule information for a time and channel other than that shown in FIG. 11.

When viewing program schedule information for a future time in the BROWSE mode, the displayed time of airing 121 of the particular show 122 is highlighted, as well as the channel number and service indicator 123, as shown in FIG. 12A. Such highlighted information reminds the user that he is viewing program schedule information for a future time. Also, when viewing program schedule information for a future time on any particular channel in the BROWSE mode, depression of the channel up direction arrow key on the remote controller 40 causes programming schedule information for the next channel to appear, which corresponds in time to the future time that was being viewed before the up key was depressed by the user. The channel down direction arrow key 43B functions identically in this mode.

Figure 13:
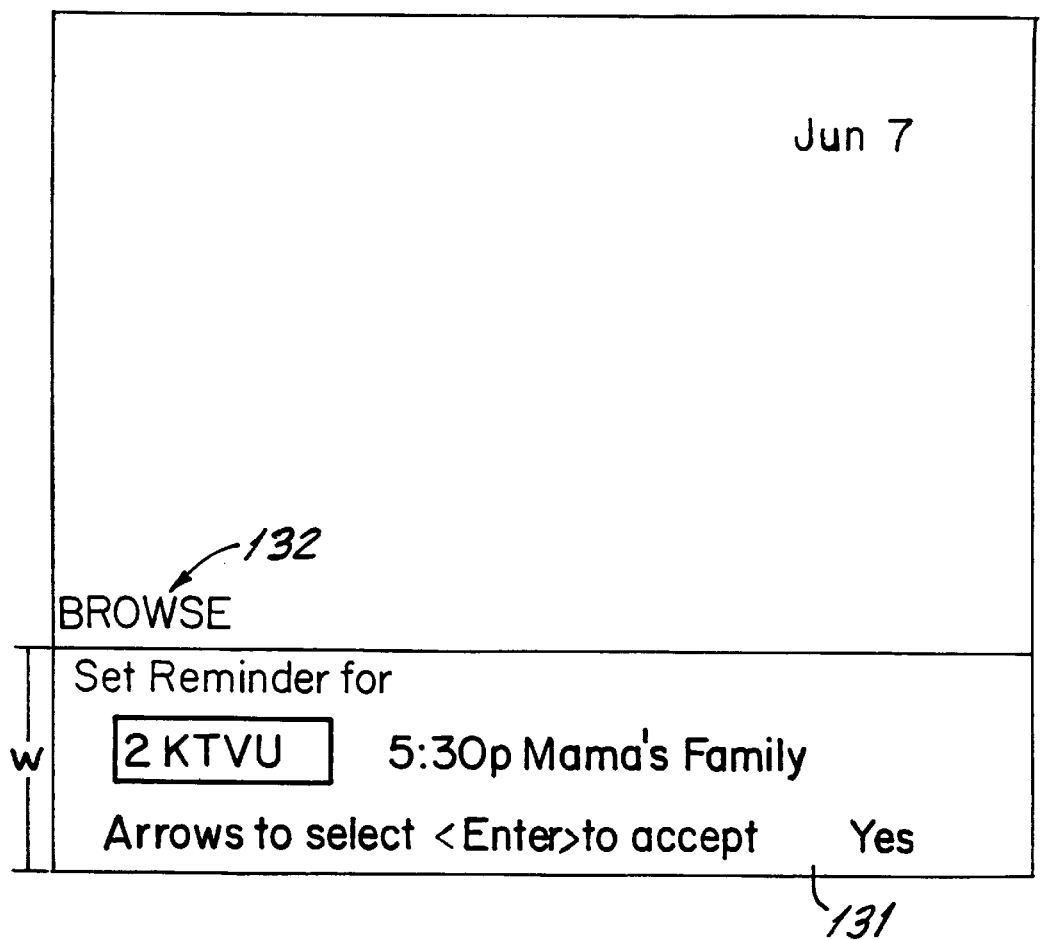
FIG. 13 shows a graphic overlay appearing in a REMINDER mode of operation of the preferred embodiment of the present invention.
Figure 14:
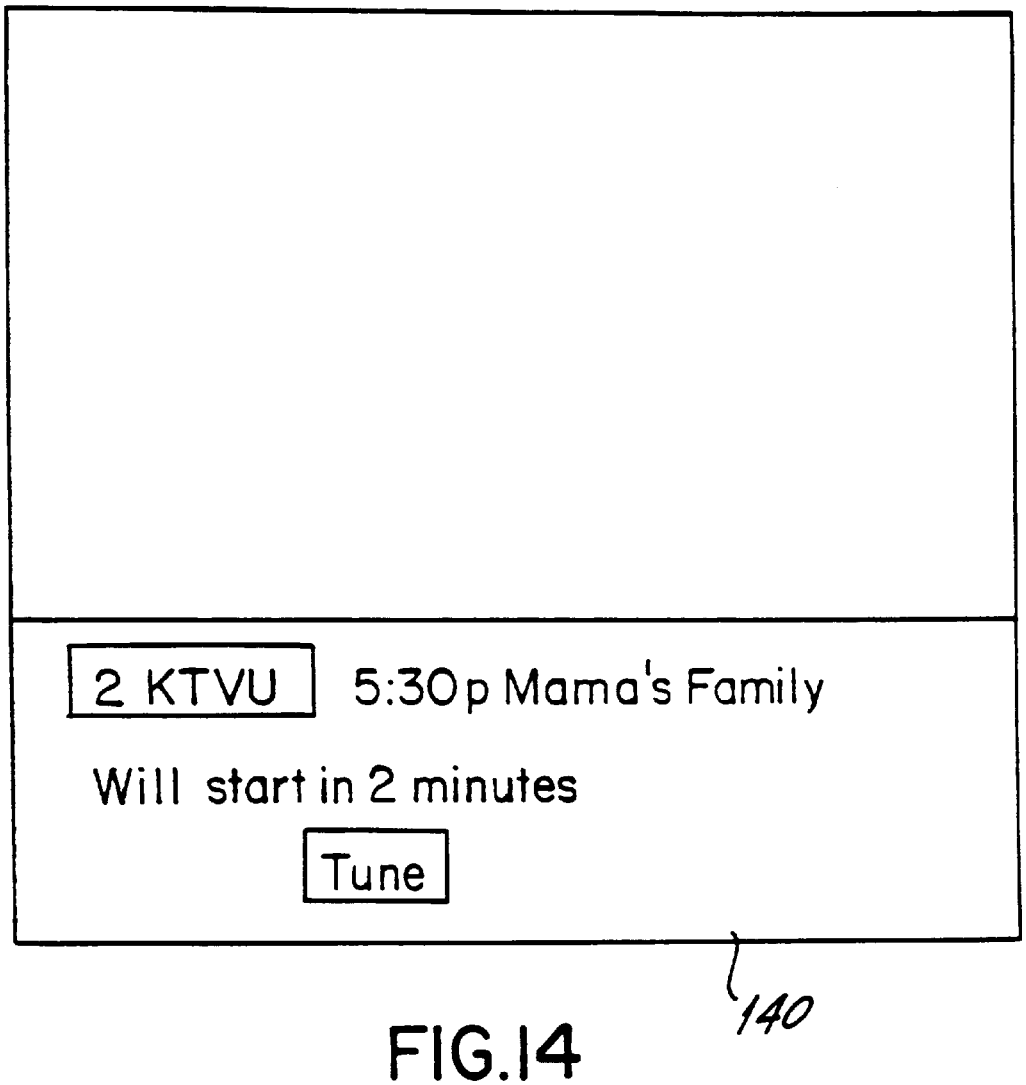
FIG. 14 shows yet another graphic overlay appearing in a REMINDER mode of operation of the preferred embodiment of the present invention.

If while viewing program schedule information for a future time in BROWSE mode the user depresses the ENTER key on the remote controller, the microcontroller 16 will instruct the VDG 23 to display a REMINDER overlay message 130 which, as shown in FIG. 13, is displayed as a second overlay 131 appearing above the BROWSE overlay 132. The REMINDER message 130 queries the user as to whether the system should remind the user, at a predetermined time before the start of the selected program, that he or she would like to view the selected program, as shown in FIG. 13. If the user responds affirmatively, the microcontroller 16 stores reminder data consisting of at least the channel, time and day of the selected program in a reminder buffer, which contains similar schedule information for all programs for which the user has set a reminder. At a pre-determined time before the selected program start time, for example, five minutes, the microcontroller 16 will retrieve schedule information, including title and service, based on the reminder data, and will instruct the VDG 23 to display a REMINDER overlay message 140 on the television receiver 27, as shown in FIG. 14, to remind the user that he or she previously set a reminder to watch the selected program. The REMINDER message 140 contains the channel, service and start time. It also displays the number of minutes before the time of airing of the particular show and updates the display every minute until the time of airing. The REMINDER message 140 also displays a "TUNE" inquiry, which asks the user if she would like to tune to the selected program. When the user sets multiple reminders, the reminder overlays are stacked, for example, in ascending order according to the time each reminder is scheduled to be displayed, and the next reminder message will appear on the television receiver after the user takes appropriate action to remove the reminder message then being displayed. The REMINDER message (140 could also be adapted to allow the user to display or modify a list of all reminders previously set by the user. As with the overlay display time period in the FLIP mode, the user can modify the time period before a selected program that the REMINDER message appears by entering the Viewer Preference mode and revising the time entry.

MENU Mode

Using the remote controller 31 shown in FIG. 3, the user can enter the MENU mode from the BROWSE mode or from the FLIP mode by toggling the MODE button 38 once or twice, respectively. Using the remote controller 40 of FIG. 4, the user would simply depress the key 47B corresponding to the MENU icon.

Figure 6:
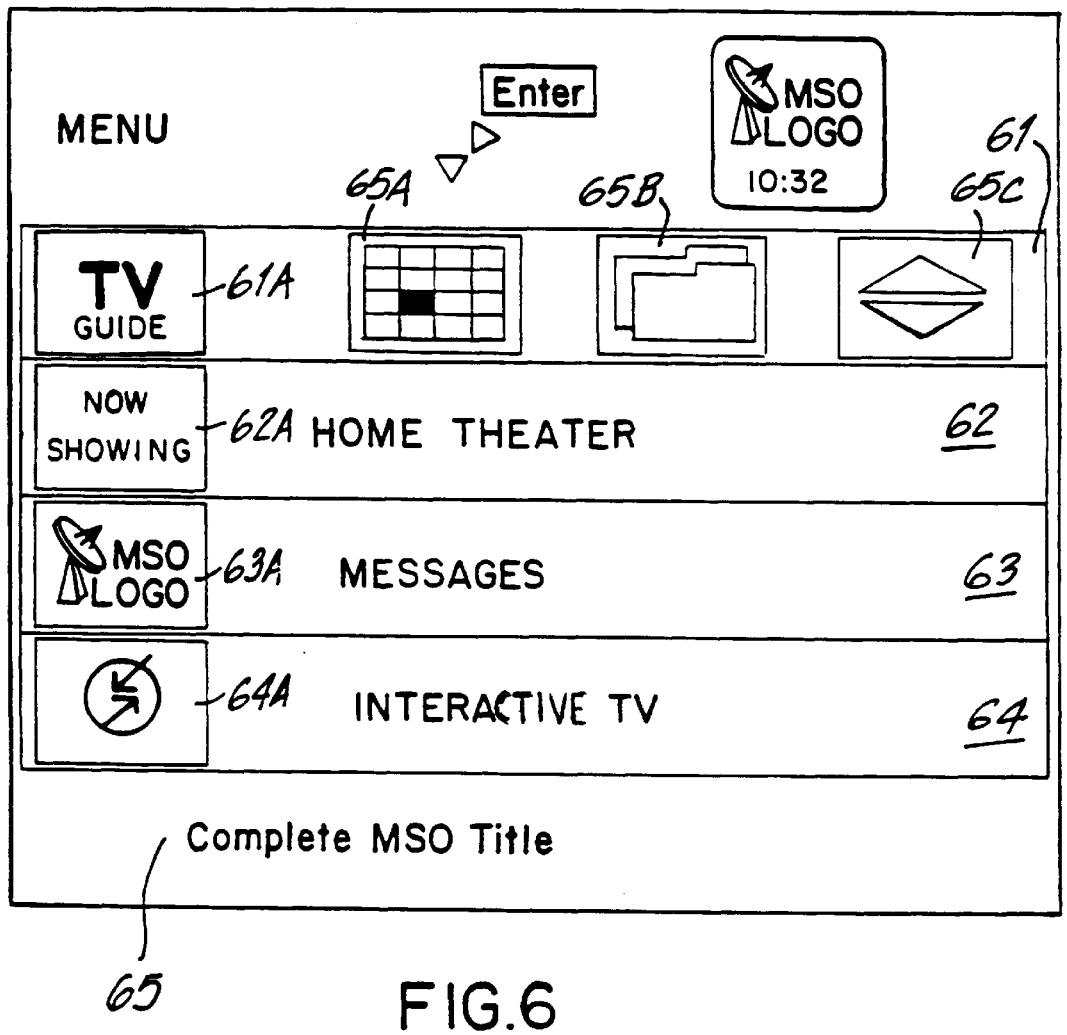
FIG. 6 is a menu that appears on a television screen in a MENU mode of operation of the preferred embodiment of the present invention.
Figure 6A:
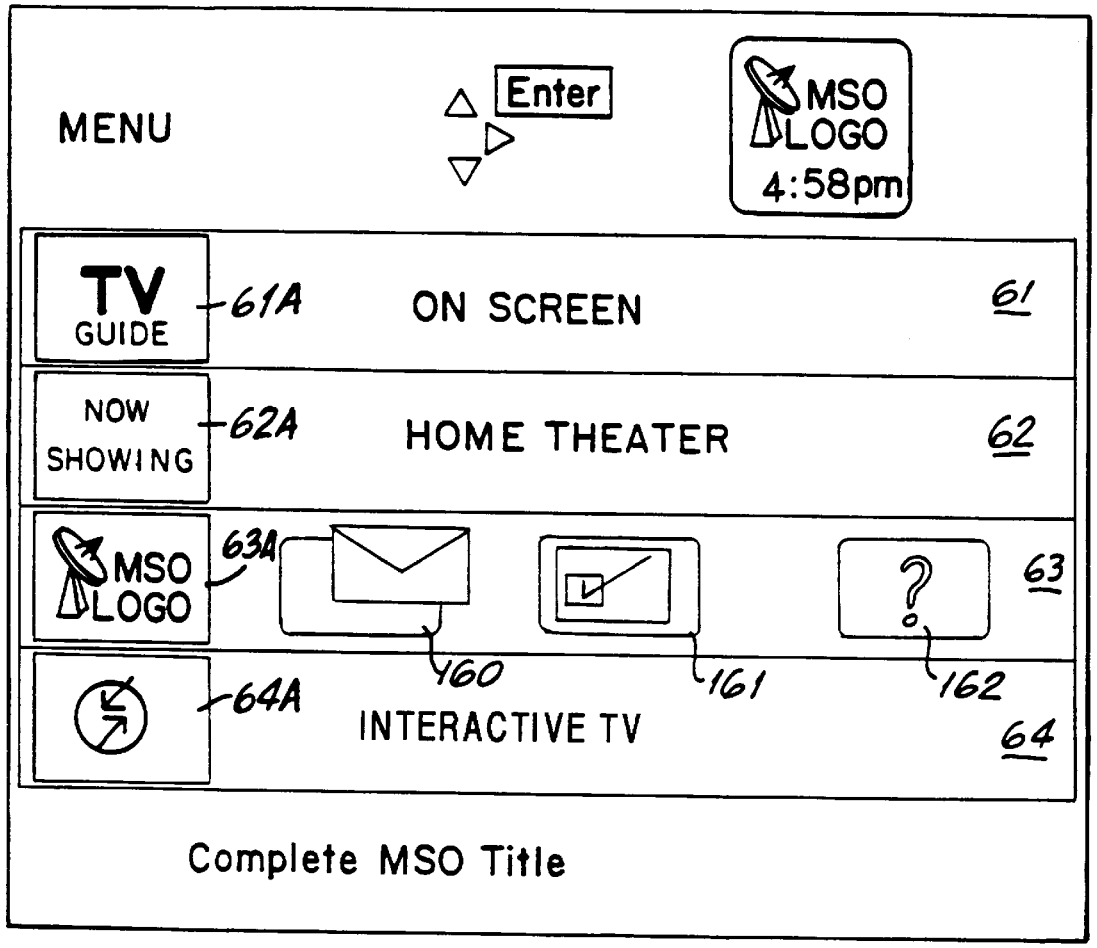
FIG. 6A is yet another menu that appears on a television screen in a MENU mode of operation of the preferred embodiment of the present invention.

Referring to FIG. 6, in the MENU mode, the system displays a plurality of menu items and icons, which correspond to and allow user selection of distinct program schedule information display formats, local cable system message boards and other on-line information services. The MENU screen shown in FIG. 6 is a full-screen display. In the embodiment shown in FIG. 6, there are four vertically selectable horizontal bars 61–64, which are accessed using the up and down direction arrows 43A on the remote controller 31 or 40. At the extreme left of each bar, an identifying icon 61A–64A is displayed, which identifies the information contained in that bar. In the embodiment of FIG. 6, the "TV GUIDE" icon 61A in the first bar corresponds to program schedule information from TV Guide® magazine, the "NOW SHOWING" icon 62A in the second bar 62 corresponds to pay-per-view and premium service events, the "MSO Logo" icon 63A in the third bar 63 corresponds to Customer Service or local cable company information messages, and the circular icon 64A in the fourth bar 64 corresponds to other interactive services available to the user, or in the case of broadband networks, other venues, e.g., home shopping, banking or telephone use. As also shown in FIGS. 6 and 6A, each bar also contains a textual description of its contents.

Figure 15:
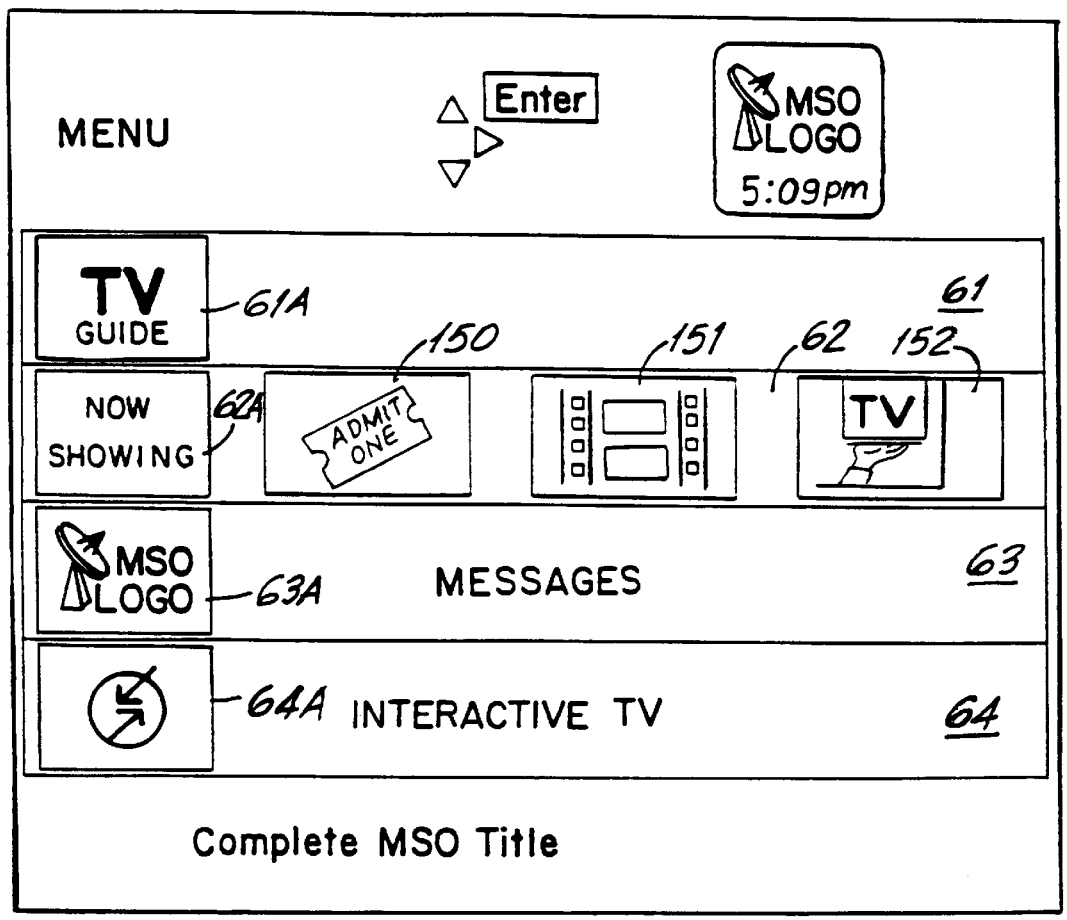
FIG. 15 is yet another menu that appears on a television screen in a MENU mode of operation of the preferred embodiment of the present invention.
Figure 16:
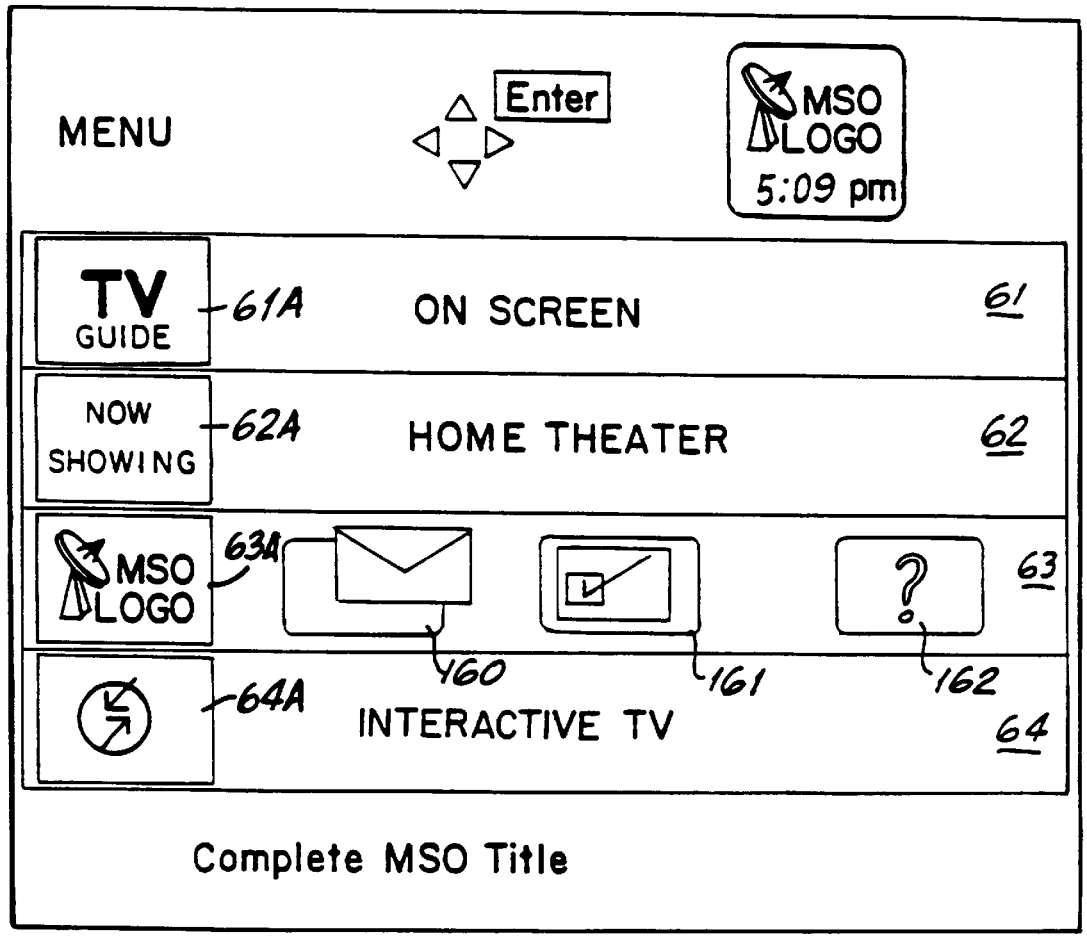
FIG. 16 is yet another menu that appears on a television screen in a MENU mode of operation of the preferred embodiment of the present invention.
Figure 17:
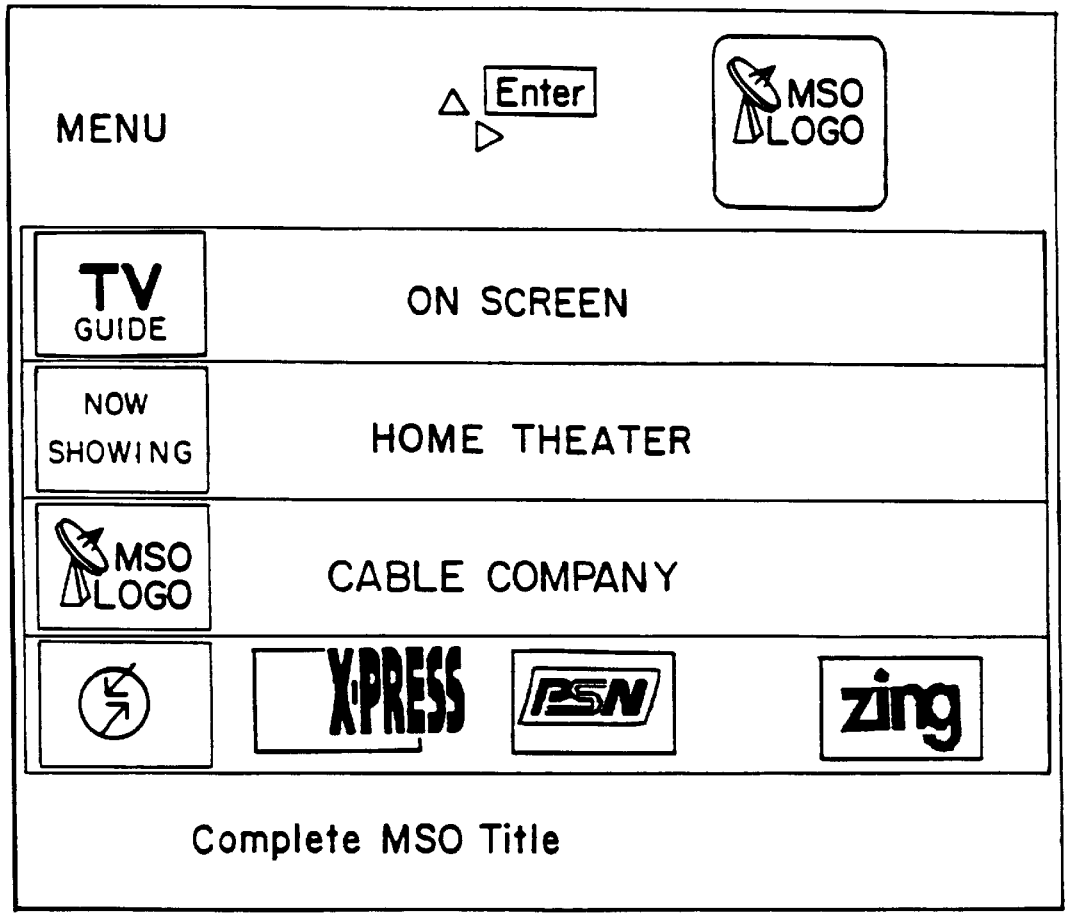
FIG. 17 is yet another menu that appears on a television screen in a MENU mode of operation of the preferred embodiment of the present invention.

When the user first enters the MENU mode, the system defaults to selection of the program schedule bar. When a particular bar is selected, the textual description is removed and a plurality of icons or identifying windows are displayed adjacent the identifying icon. In FIG. 6, the program schedule bar 61 is selected. Using the up or down direction arrow key on the remote controller 40, the user selects a vertically adjacent bar. FIGS. 15–17 show, respectively, selection of the Pay-Per-View bar 62, the Customer Service or Messages bar 63 and the Interactive TV services bar 64.

Figure 38:
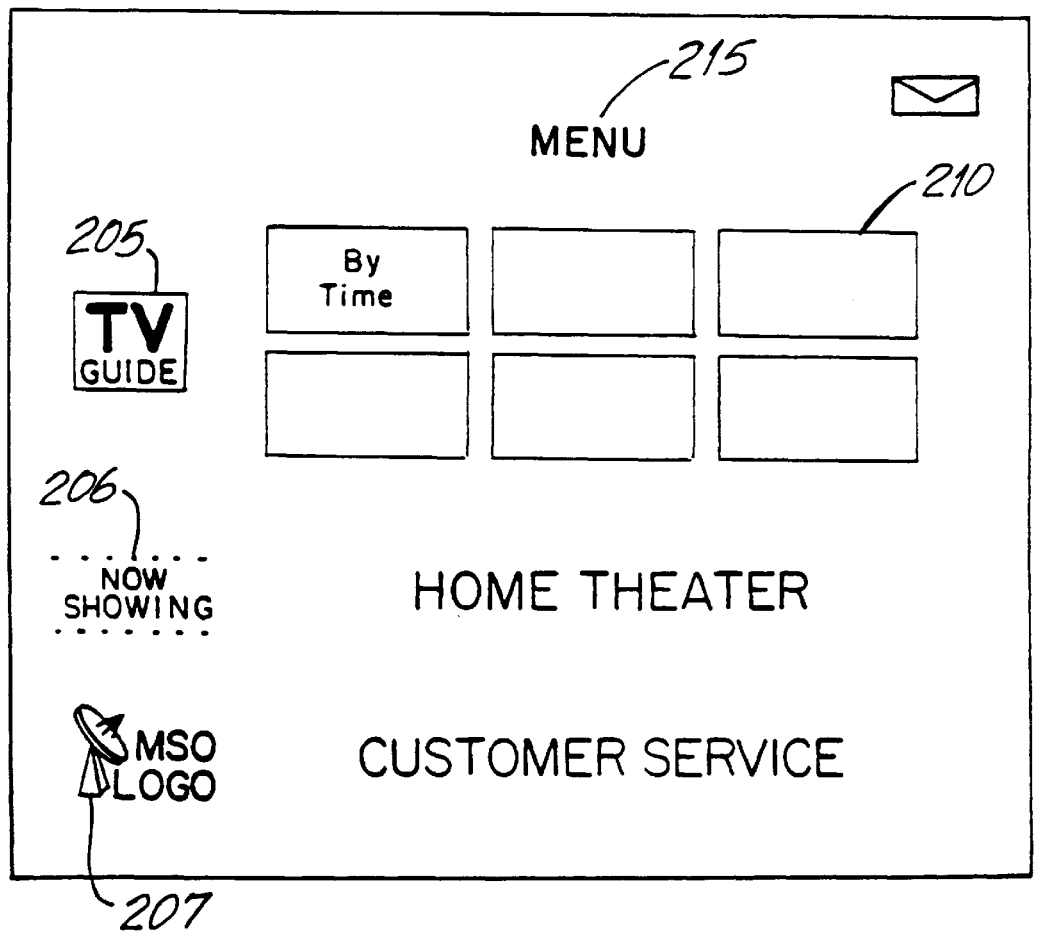
FIG. 38 is an alternative menu that can be used in a MENU mode of operation of the electronic program guide.
Figure 38A:
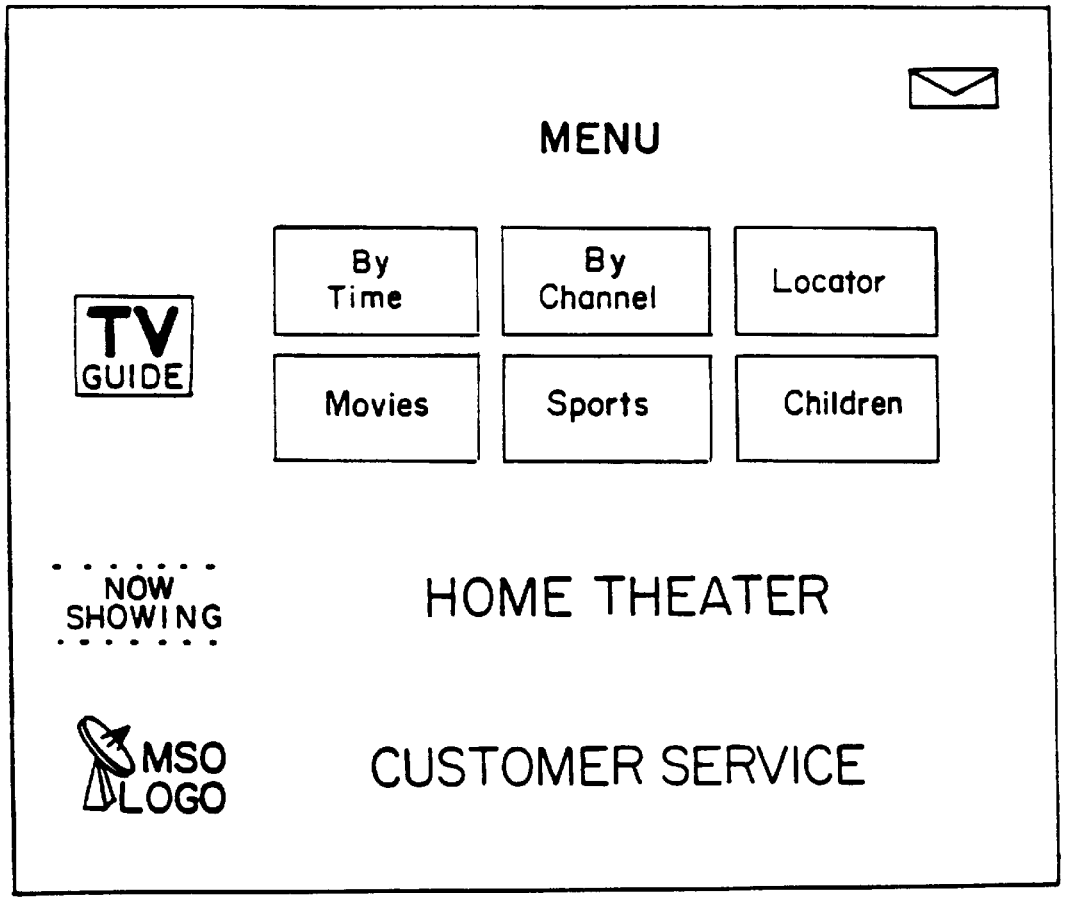
FIG. 38A and 38B show, respectively, an alternative main menu screen and a listing-by-time screen accessible from the alternative main menu.
Figure 38B:
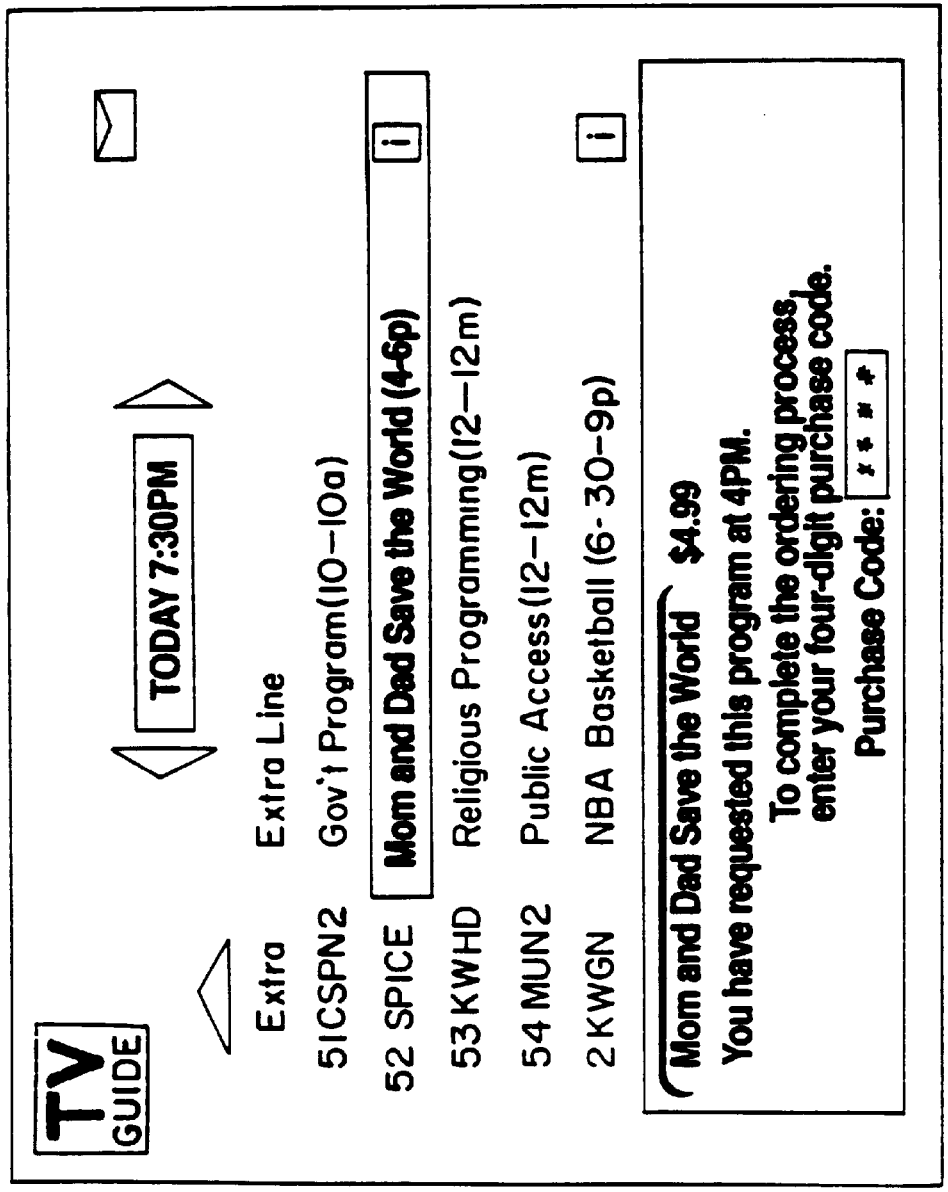

An alternative MAIN MENU screen 215 is shown in FIG. 38. Certain selection screens accessible from the menu shown in FIG. 38 are shown in FIGS. 38A and 38B. It has three horizontally selectable bars: program schedule 205, Home Theater 206 and Customer Service 207. The MAIN MENU screen 215 also contains an additional "Locator" identifier, which is described below.

Once a particular bar in the MENU screen is selected, the user can select a particular icon from the plurality of horizontally selectable displayed icons 65A–65C by using the left or right direction arrow and the ENTER key on the remote controller 40. Each icon contains a graphical symbol appearing in a background window of a particular color. When a particular icon is selected, it is offset from its background window and the color of the window changes. In FIG. 6, the grid icon 65A immediately adjacent the "TV GUIDE" icon in the first bar 61 is selected.

The function corresponding to the selectable entries in the MAIN MENU screen will now be discussed with reference to FIG. 6. It will be appreciated by those of skill in the art that the same functionality applies in the categories shown in the MAIN MENU 215 shown in FIG. 38.

In the uppermost vertically selectable horizontal bar 61, the first grid icon 65A represents an "All Listings" mode in which the program schedule information is displayed in a grid listing, such as that shown in FIG. 18. Alternatively, a single column grid-like display could be used, as that shown in FIG. 25. In this format, the vertical y-axis identifies the channel number and service while the horizontal x-axis identifies the time. The screen display of FIG. 18 also contains in the upper left-hand corner a mode identifier 180, in this case the notation "All Listings," to remind the user of the current operating mode of the system. Directly underneath the mode display is a highlighted display 181 of the channel that the user was watching before entering the MENU mode. In the upper right-hand corner, a logo icon 182 appears in a window directly above a date/time identifier 183, which alternatively displays the current date and time.

In the center of the screen display shown in FIG. 18 is a graphical Active Key Display (AKD) 184 which indicates to the user those keys on the remote controller that are active for that particular mode of the program guide display system. For example, in the screen display of FIG. 18, the cursor can only move up, down or to the right. If the user were to depress the left direction arrow key on the remote controller at that point, the system would not carry out any function since the cursor can not move to the left. Thus, the left arrow key is not active so its image is not displayed on the AKD 184. Similarly, since the system will only respond to a depression of the up, down or right direction arrow keys and the ENTER key, they are the only key images displayed on the graphical AKD 184. The MODE key, though not displayed, is always active to change from one mode to another. When the user first enters the All Listings guide, the time listing begins by default at the half-hour immediately preceding the current time unless the current time is on the hour or half-hour, in which case the display begins with the particular hour or half-hour, and the channel listing begins at the last channel being viewed by the user before entering the MENU mode. For example, in FIG. 18, the current time is displayed as 7:13 p.m., the time listing begins at 7:00 p.m. and the channel listing begins with channel 4.

In the All Listings mode, a moveable highlighted cursor 185 is used to indicate the currently selected program to the user. The user manipulates cursor movement using the direction arrow keys on the remote controller 40. Furthermore, the entire information display pages upward if the cursor is placed at the bottom of the screen and the down direction arrow is depressed, and similarly pages to the left if the cursor is at the extreme right side of the display and the right direction arrow is depressed. In this way, the user can navigate through the entire program schedule.

Figure 19:
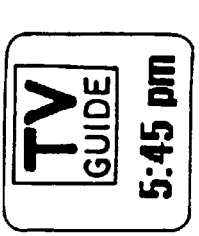
FIG. 19 shows schedule information displayed in a Listings By Category mode of operation of the preferred embodiment of the present invention.

The folder icon 65B immediately to the right of the All Listings icon in the top horizontal bar 61 of FIG. 6 identifies a "Category Listing" mode in which program schedule information is displayed and categorized by program content, as shown in FIG. 19. The particular listing shown in FIG. 19 includes the categories of Movies, Sports, News and Children 190A–190D. The database record stored for each listing contains a content-specific identifier so the microcontroller can search the database and categorize the information by content for purposes of displaying it in the Category Listing mode. As shown in FIG. 19, the user can manipulate the cursor left or right to highlight any one of the categories which appear at the head of the listing. In FIG. 19, the "Movies" category 190A is selected. As shown, the user is given a display of all movies, prioritized by time and then alphabetically by title of show, beginning with the half-hour immediately preceding the current time unless the current time is on the hour or half-hour, in which case the display begins with the particular hour or half-hour. The screen display shown in FIG. 19 also includes a textual description of the current operating mode of the program schedule system, as well as the graphic AKD 184, similar to that used in connection with the All Listings mode.

As with the All Listings mode, if the user highlights a show which is currently airing, he can immediately tune to that show by depressing the ENTER key on the remote controller 40. If the highlighted show is one that will appear at future time, the user is again given the option of setting a REMINDER message.

Figure 20:
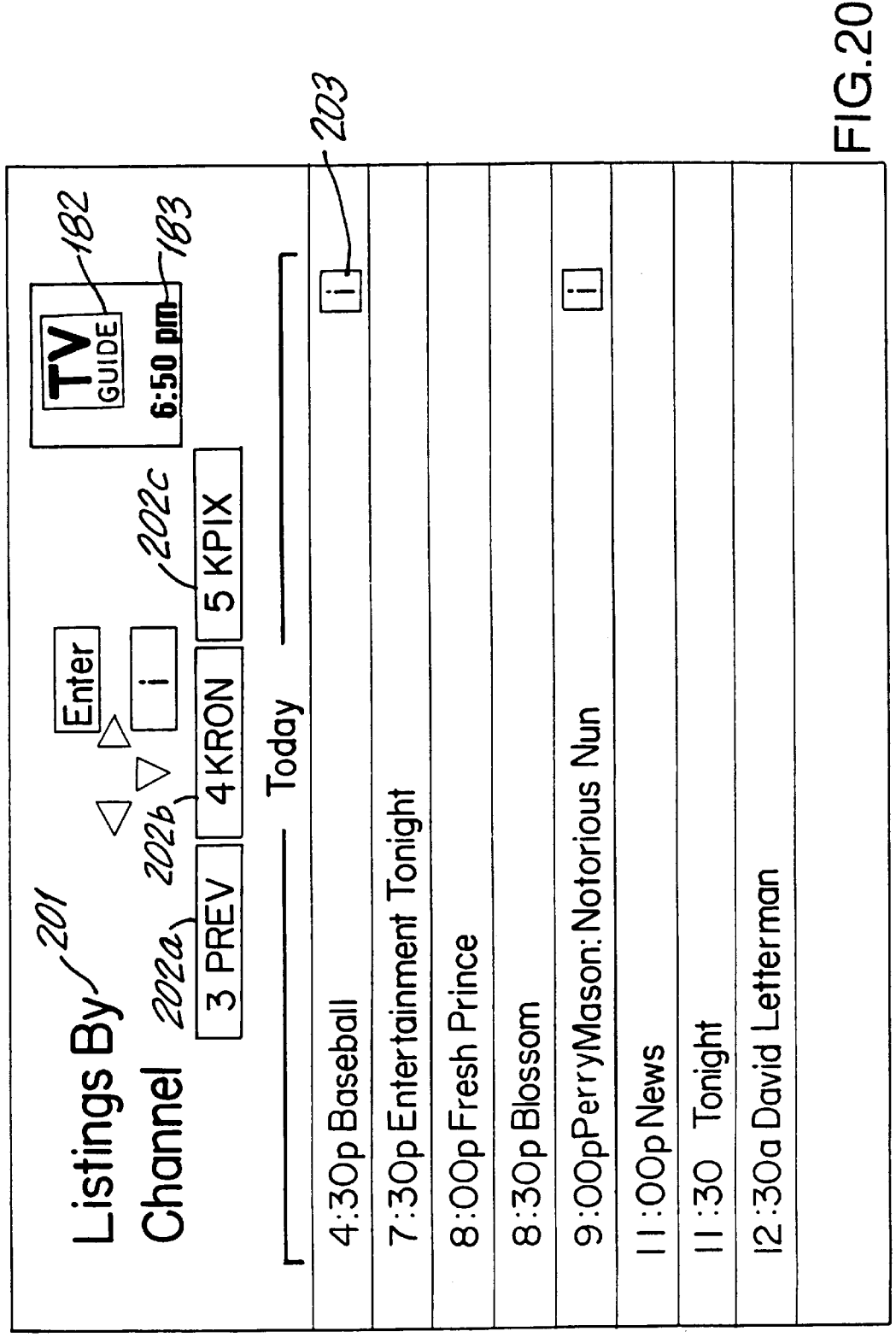
FIG. 20 shows schedule information displayed in a Listings By Channel mode of operation of the preferred embodiment of the present invention.

The triangular icon 65C at the far right of the TV GUIDE bar 61 in the display of FIG. 6 identifies a "Channel Listing" mode in which the program schedule information is categorized and displayed by channel, as shown in FIG. 20. The screen display shown in FIG. 20 again includes a textual mode identifier 201, the graphic AKD 184, and the window including the logo icon 182 and alternating time/date display 183. At the head of the program listing is a list of several consecutive channels 202A–202C beginning with the last channel viewed by the user before entering the Channel Listing mode. The channel in the middle window 202B is highlighted and is the channel for which schedule information is displayed. The display identifies those programs appearing on the highlighted channel beginning with the half-hour immediately preceding the current time unless the current time is on the hour or half-hour, in which case the display begins with the particular hour or half-hour. The user can display further future listings by manipulating the cursor to the bottom of the screen and paging the display, as previously described. The user can also change the selected channel by manipulating the left or right direction arrow keys on the remote controller 40. When the user issues a change-channel command in this manner, the next consecutive channel will be displayed in the highlighted window 202B in the channel string at the head of the display, and schedule information for the newly selected channel will be displayed on the television receiver 27.

As with other modes, if a user wishes to tune to a highlighted program that is currently airing, he can do so by simply depressing the ENTER key on the remote controller 40, and if the user wishes to view a program that airs at a future time, the user is again given the option of setting a REMINDER message.

Figure 21:
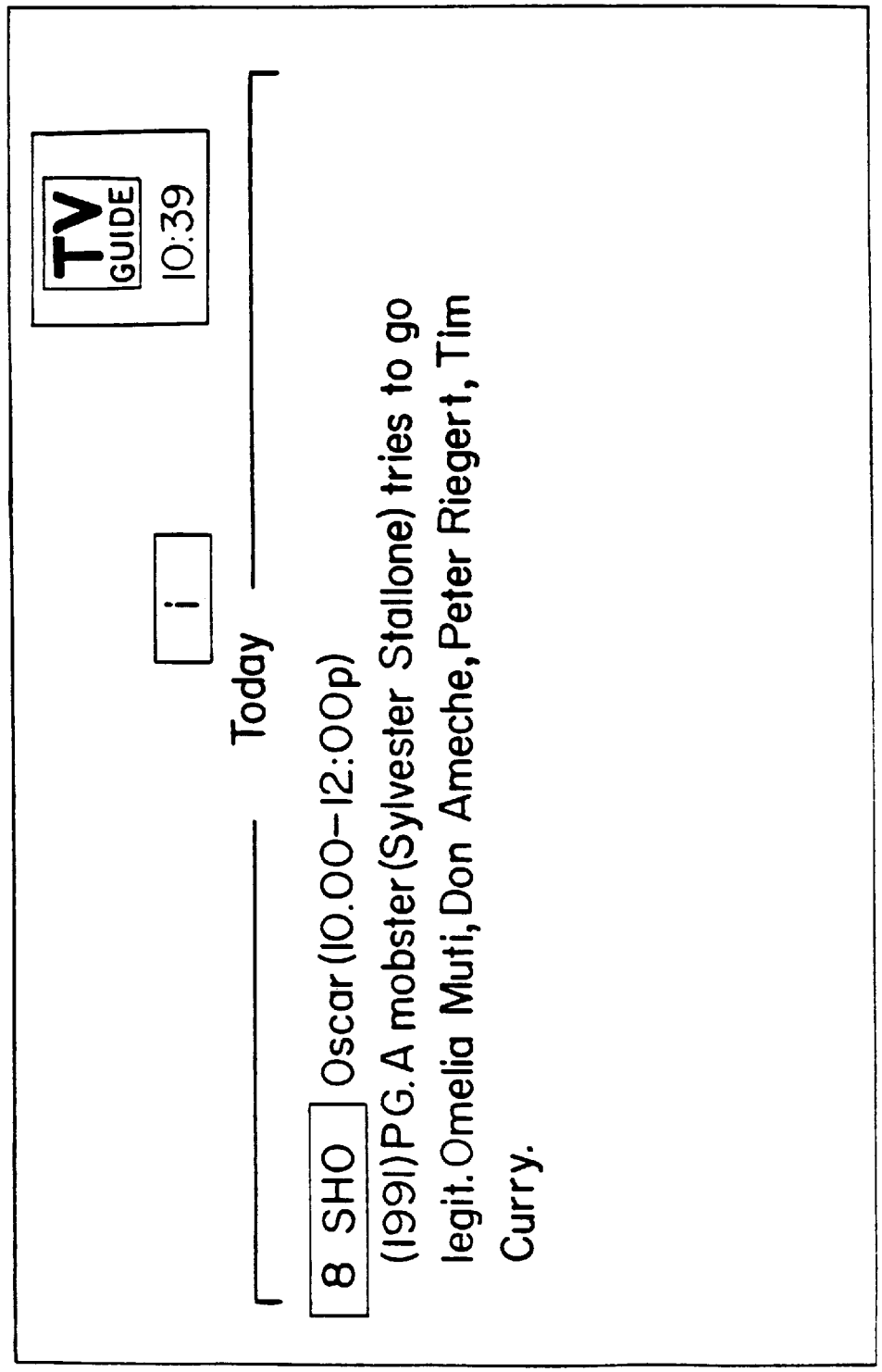
FIG. 21 shows information displayed in response to a user's request for supplemental programming information.
Figure 22:
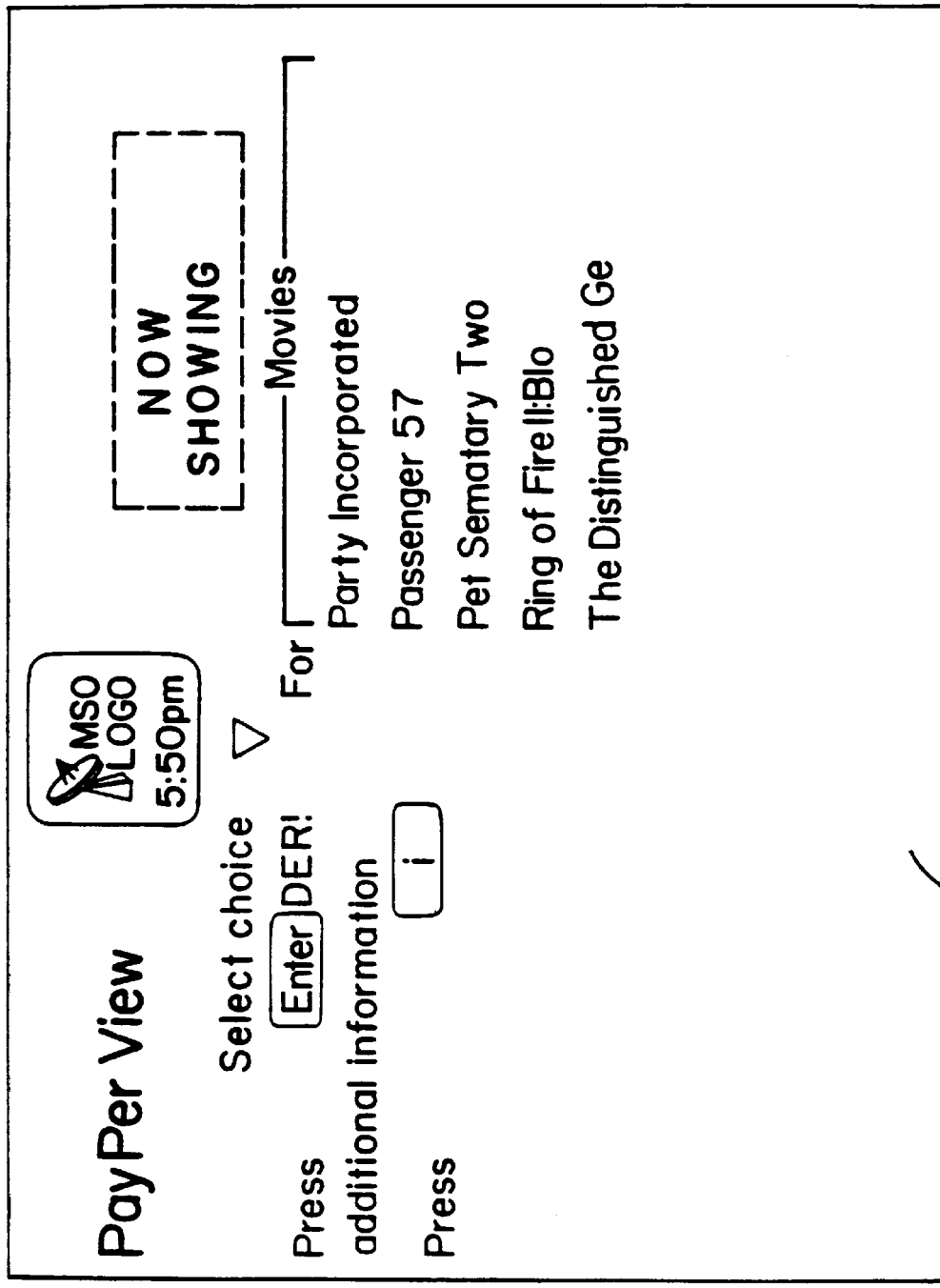
FIG. 22 shows programming, ordering and video promotional information displayed in a Pay-Per-View mode of operation of the preferred embodiment of the present invention.

In each of the FLIP, BROWSE and MENU modes, a lower case "i" icon appears at a number of occasions in connection with certain program listings, such as movies, such as the "i" 203 shown in FIG. 20. Any time this icon appears, the user can view additional programming information, generally comprising a textual description of program content and/or other information related to the program, such as the names of cast members and the like, by depressing the "i" key 48 on the remote controller 40. An example of a display of such additional information is shown in FIG. 21. The second horizontal bar 62 appearing on the screen in the MAIN MENU mode shown in FIG. 6 is the "Home Theater" Listing. It corresponds to Pay-Per-View events or services, specialized programming, and Premium Service programs. When this category is chosen by the user, the television receiver displays information as shown in FIG. 15. The first theater-ticket icon 150 that appears in this Home Theater bar identifies a format in which the Pay-Per-View events and premium services are displayed, as shown in FIG. 22. As with other modes, the user can manipulate the cursor to highlight and select any particular show. Also, the user can obtain additional information about the Pay-Per-View event or service by depressing the "i" key 48 on the remote controller 40. The Pay-Per-View menu screen display shown in FIG. 22 also includes a video display section 220 in which short promotional clips of current and future events and services can be shown to the user while the user is viewing the Pay-Per-View scheduling information. The display of FIG. 22 is bit mapped such that the advertising clips may be shown in the lower left quadrant of the screen. The clips may be shown randomly in the video display section 120 or, alternatively, the clip shown could correspond to the particular selected entry on the list of events, and would change automatically as the user navigated through the list.

Figure 23:
FIG. 23 shows an ordering submenu used in conjunction with the mode of operation shown in FIG. 22.
Figure 24:
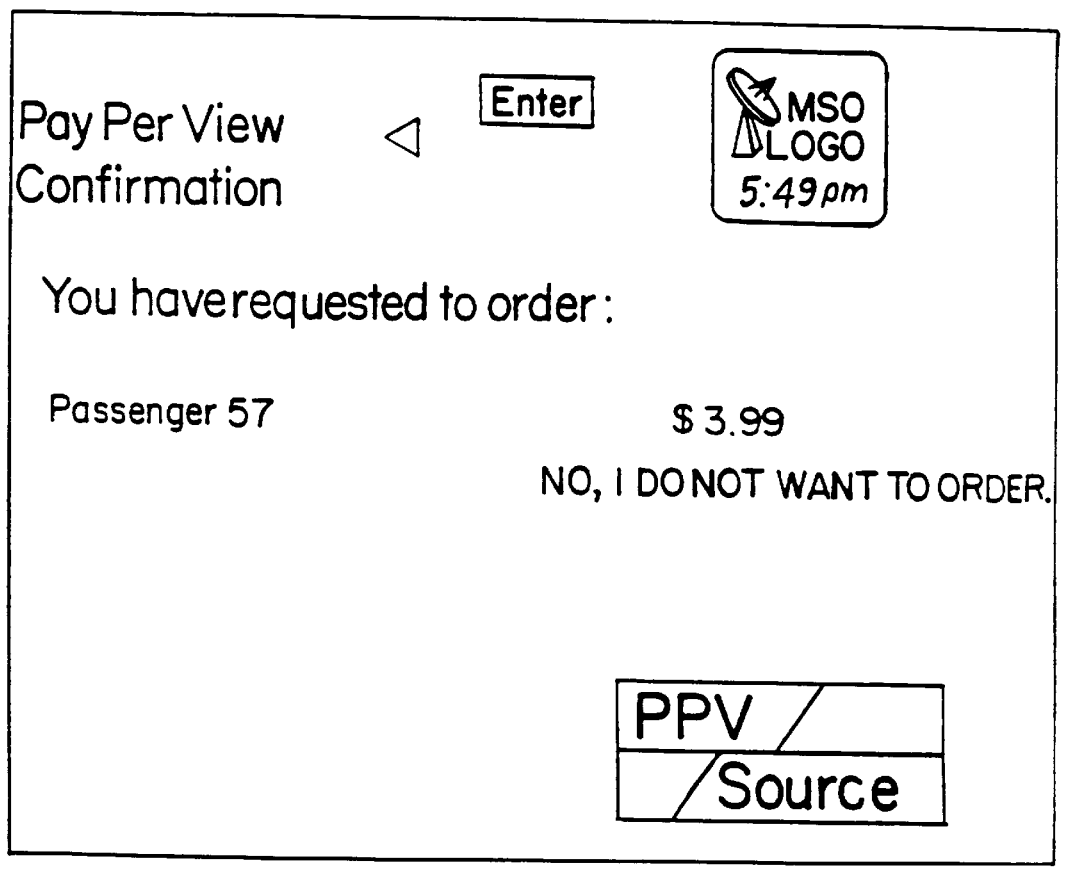
FIG. 24 shows yet another ordering submenu used in conjunction with the mode of operation shown in FIG. 22.
Figure 24A:
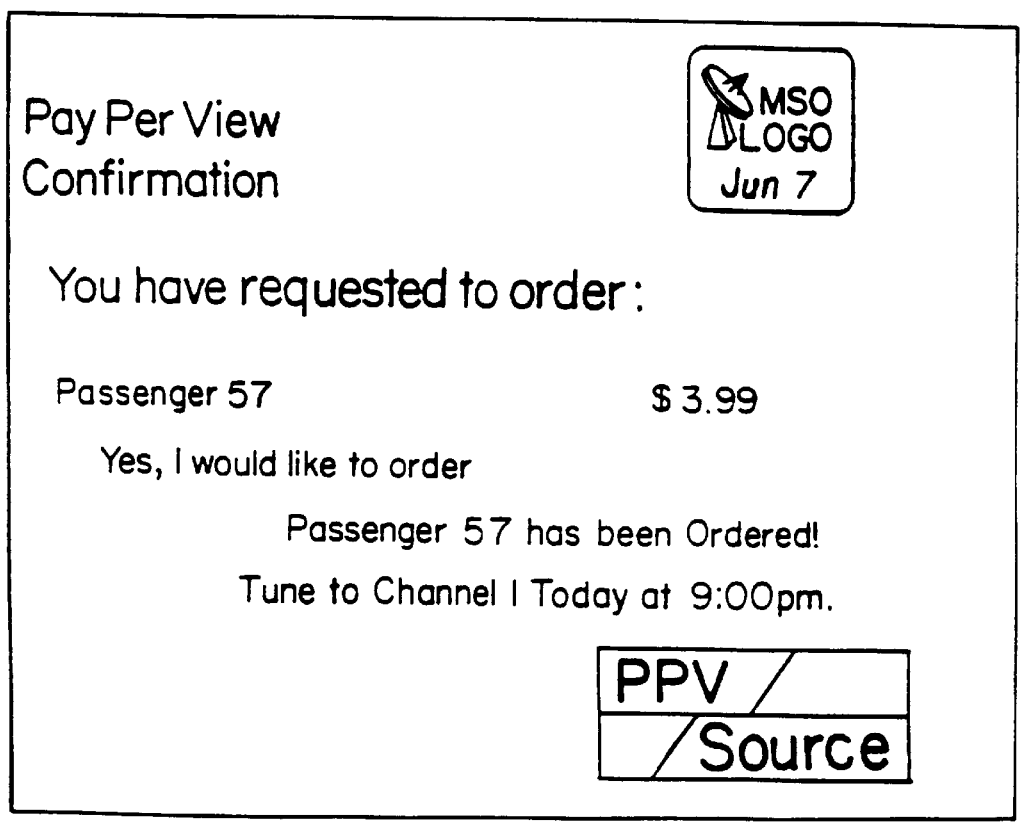
FIG. 24A shows yet another ordering submenu used in conjunction with the mode of operation shown in FIG. 22.

When a user highlights a Pay-Per-View event or service by manipulating the cursor to the desired event or service using the direction arrow keys on the remote controller 40, he can order the event or service by depressing the ENTER button on the remote controller, thus linking schedule, promotional and ordering functions. If the user selects a particular Pay-Per-View event or service in this manner, the programming schedule system will next present to the user a Pay-Per-View ordering screen such as that shown in FIG. 23. The display includes a figure representing the cost of the event or service. The display also asks the user to choose from among a plurality of scheduled airing times 230A–230C, as well as whether the user would like to see a REMINDER message prior to the start of the Pay-Per-View event or service. The user responds to these inquiries by using the direction keys on the remote controller 40 to manipulate the cursor to the proper response and then depressing the ENTER key. After the user has ordered a Pay-Per-View event or service, the program schedule system will present the user with two ordering confirmation submenus, such as shown in FIGS. 24 and 24A. In either of these submenus, the user can confirm or cancel the Pay-Per-View event or service.

If the user confirms the order, the microcontroller 16 stores the Pay-Per-View ordering information in a location in memory. The ordering information can then be transmitted to the cable operator by the microcontroller 16 either by phone line or on the cable line where the system has two-way communication or other such interactive capability. Alternatively, a computer at the cable operator location can interrogate the memory where the microcontroller stored the Pay-Per-View ordering information. At the appropriate time, the cable operator supplies the Pay-Per-View event or service and it is received by all users who have ordered the program.

The second icon 151 in the Pay-Per-View bar of FIG. 15 identifies a specialized broadcast, cable or satellite programming service to which the user has access via the electronic program guide. In this mode, the electronic program guide application software acts to connect the user, through an appropriate data transmission link, to the programming service, at which point the user interacts with the service. Alternatively, the electronic program guide provides the navigation software, including the menus and scheduling information, for the particular programming service. Such a service could be, for example, Your Choice TV ("YCTV"), a service offering reruns of highly rated broadcast and cable programs, in which case the icon may take a form suitable to identify YCTV. The programming available on YCTV is then supplied to the user via the programming guide system.

Figure 26:
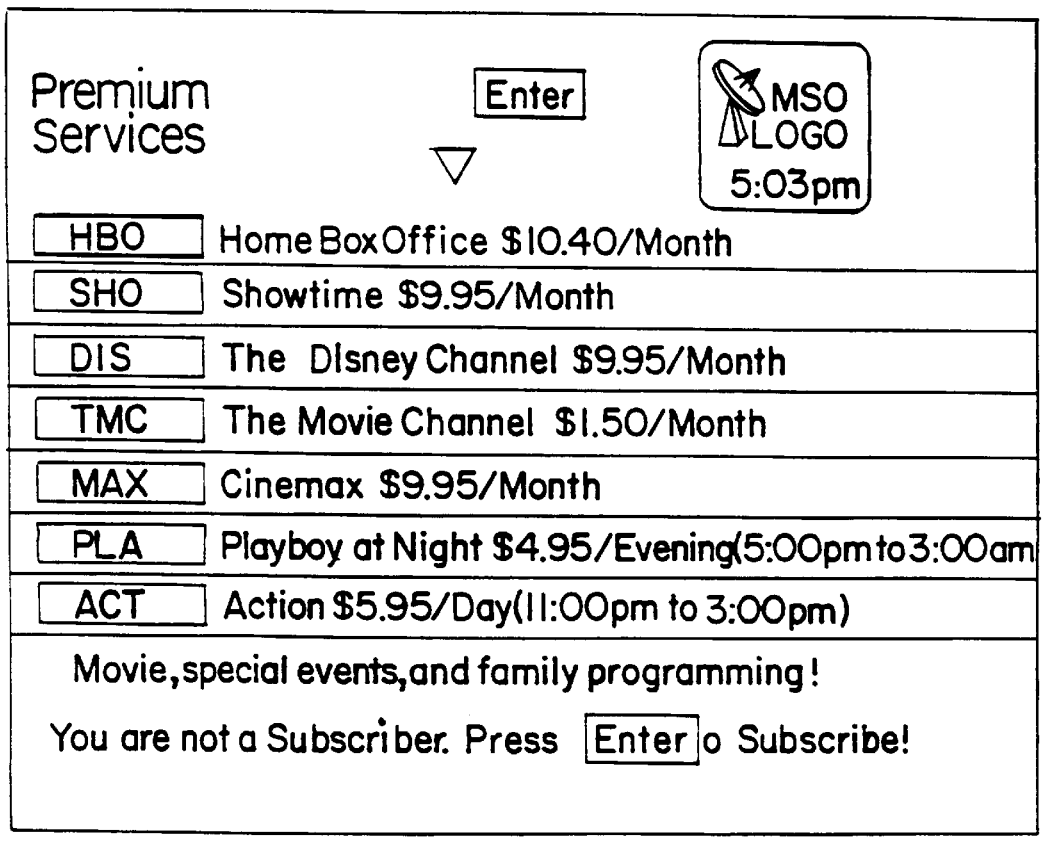
FIG. 26 shows a Premium Services submenu that appears in one mode of operation of the preferred embodiment of the present invention.

The last icon 152 appearing in the Pay-Per-View bar of FIG. 15 identifies a display format which lists all Premium Services offered by the cable operator, as shown in FIG. 26. In this mode, the user can select for impulse ordering any one of the premium services by manipulating the cursor using the direction arrow keys on the remote controller and depressing the ENTER key. Similar to Pay-Per-View ordering, the system will present the user with a series of ordering displays and, if a service is ordered by the user, it will confirm the user's request using another other submenu. If confirmed, the microcontroller 16 will store the ordering information or transmit it directly to the cable operator. Once the order has been confirmed, the microcontroller can immediately allow the user access to the ordered premium service. In this manner, the user can order premium events or services on demand.

Figure 9:
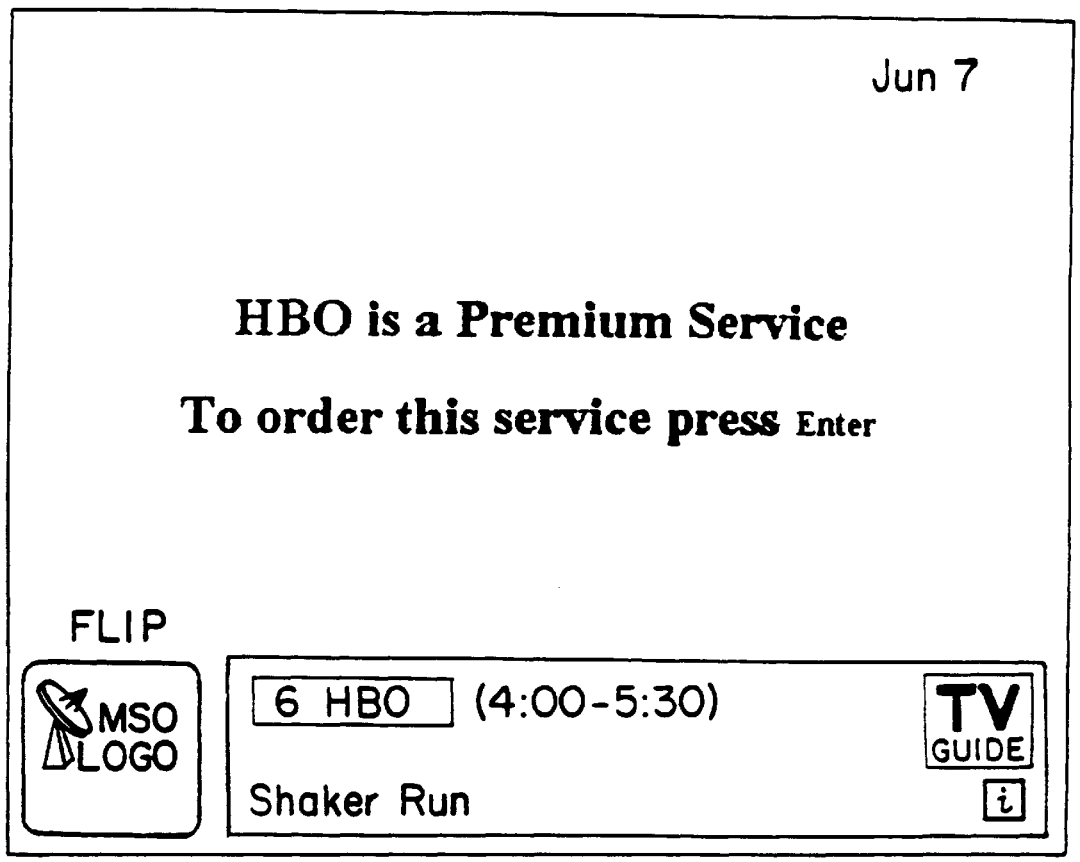
FIG. 9 shows an impulse ordering menu that appears on a television screen in one aspect of the preferred embodiment of the present invention.
Figure 10:
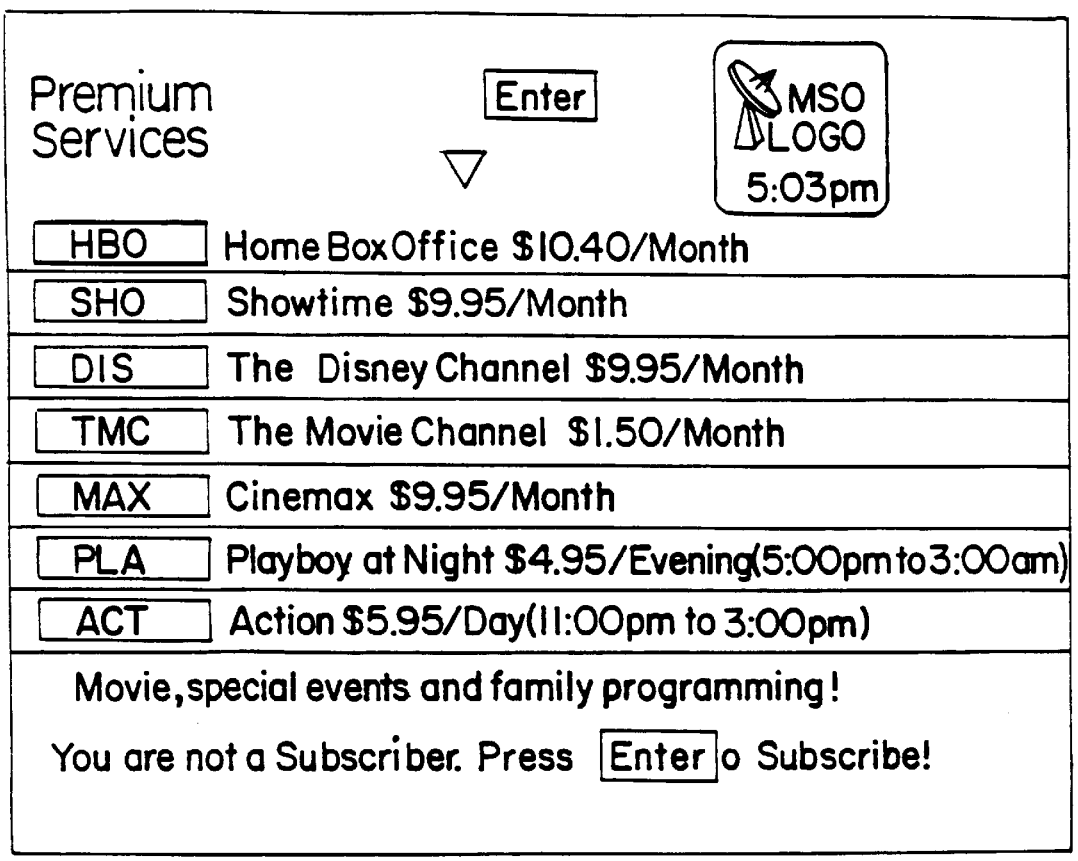
FIG. 10 shows a Premium Services submenu that appears in one mode of operation of the preferred embodiment of the present invention.

If, during FLIP or BROWSE modes, a user views a channel or schedule information for a service not subscribed to by the user, the microcontroller 16 causes an ordering submenu to appear instead of displaying a program signal along with the graphic overlay, as shown in FIG. 9. This submenu indicates to the user that she does not currently subscribe to the selected service, and then asks the user if she would like to order the service. If the user responds affirmatively, the program schedule system takes the user to the ordering submenu discussed above. In this manner, the user can order premium events or services on impulse. Many variations of this premium service ordering function are possible. For example, upon depressing the ENTER key while the screen shown in FIG. 9 is displayed, the user may be presented with the option to order the selected service or a package of programming services that includes the selected service. This feature may be implemented by receiving and storing information identifying packages of program services in the DRAM 18. When the user depresses the ENTER key while the screen in FIG. 19 is displayed, microcontroller 16 may then be programmed to check DRAM 18 to determine if the particular premium service is part of any package currently being offered and present the user with the option to purchase a programming package or the individual service.

Figure 27:
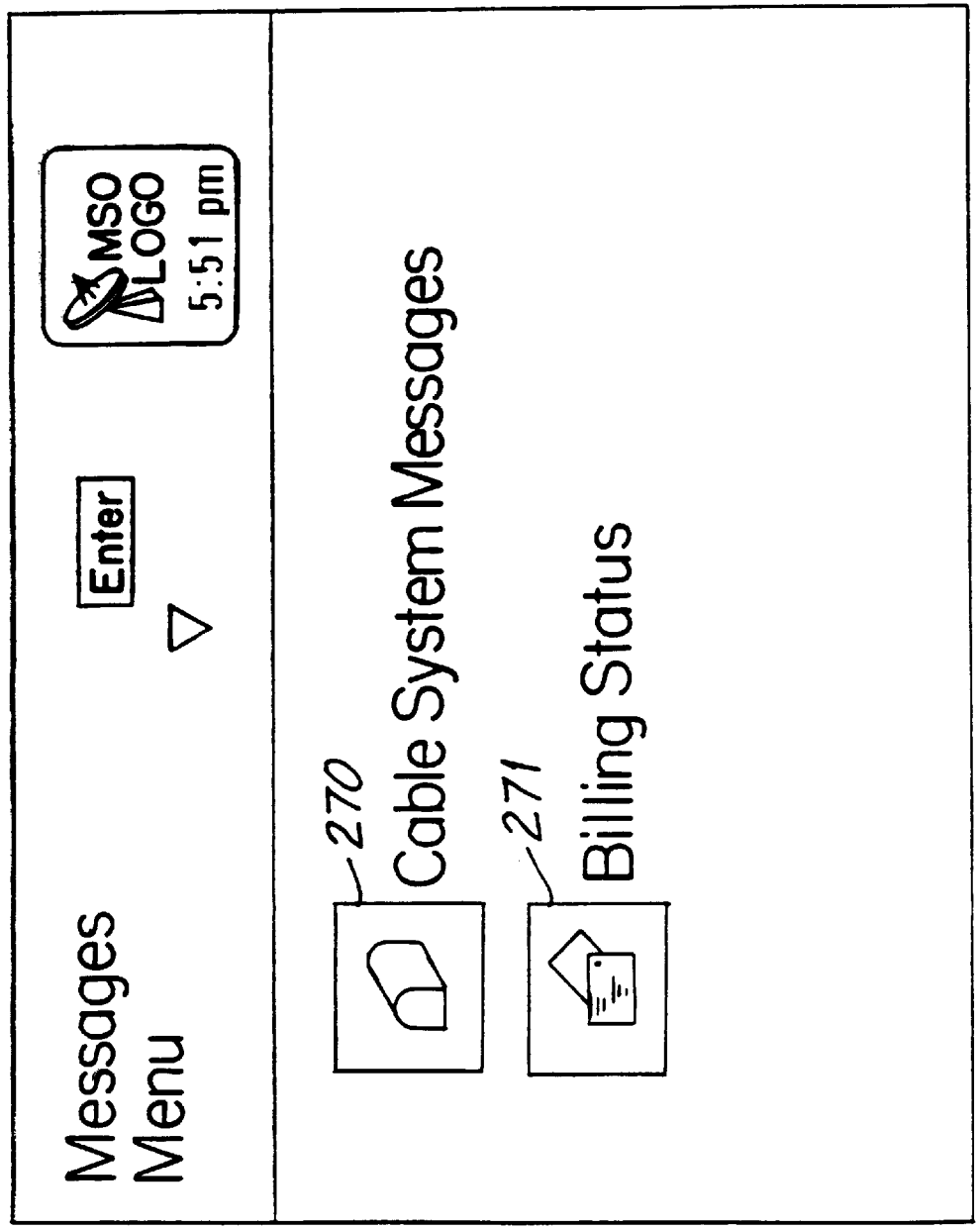
FIG. 27 shows a Messages menu that appears in one mode of operation of the preferred embodiment of the present invention.
Figure 28:
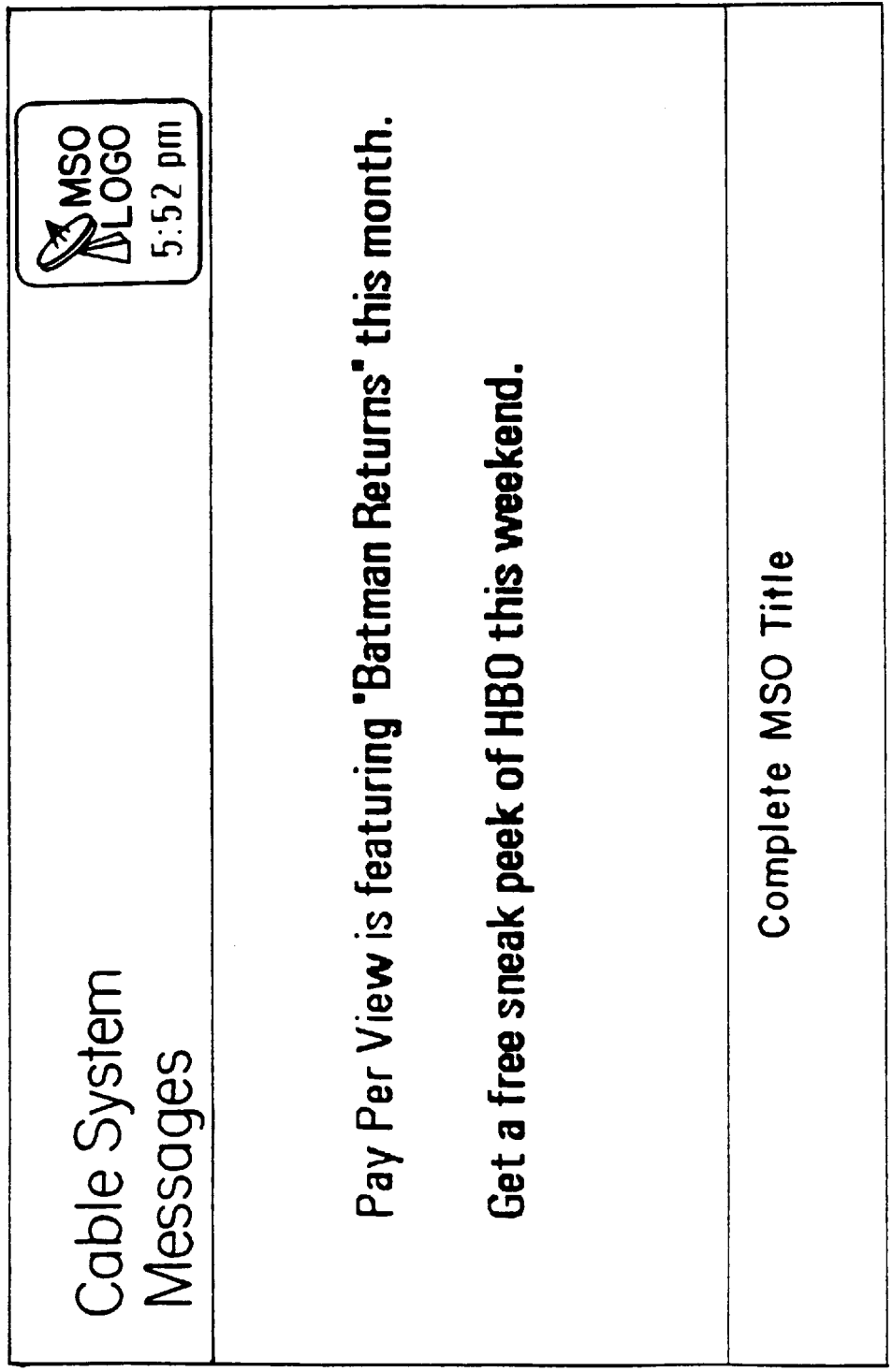
FIG. 28 shows exemplary messages used in connection with the menu of FIG. 27.
Figure 28A:
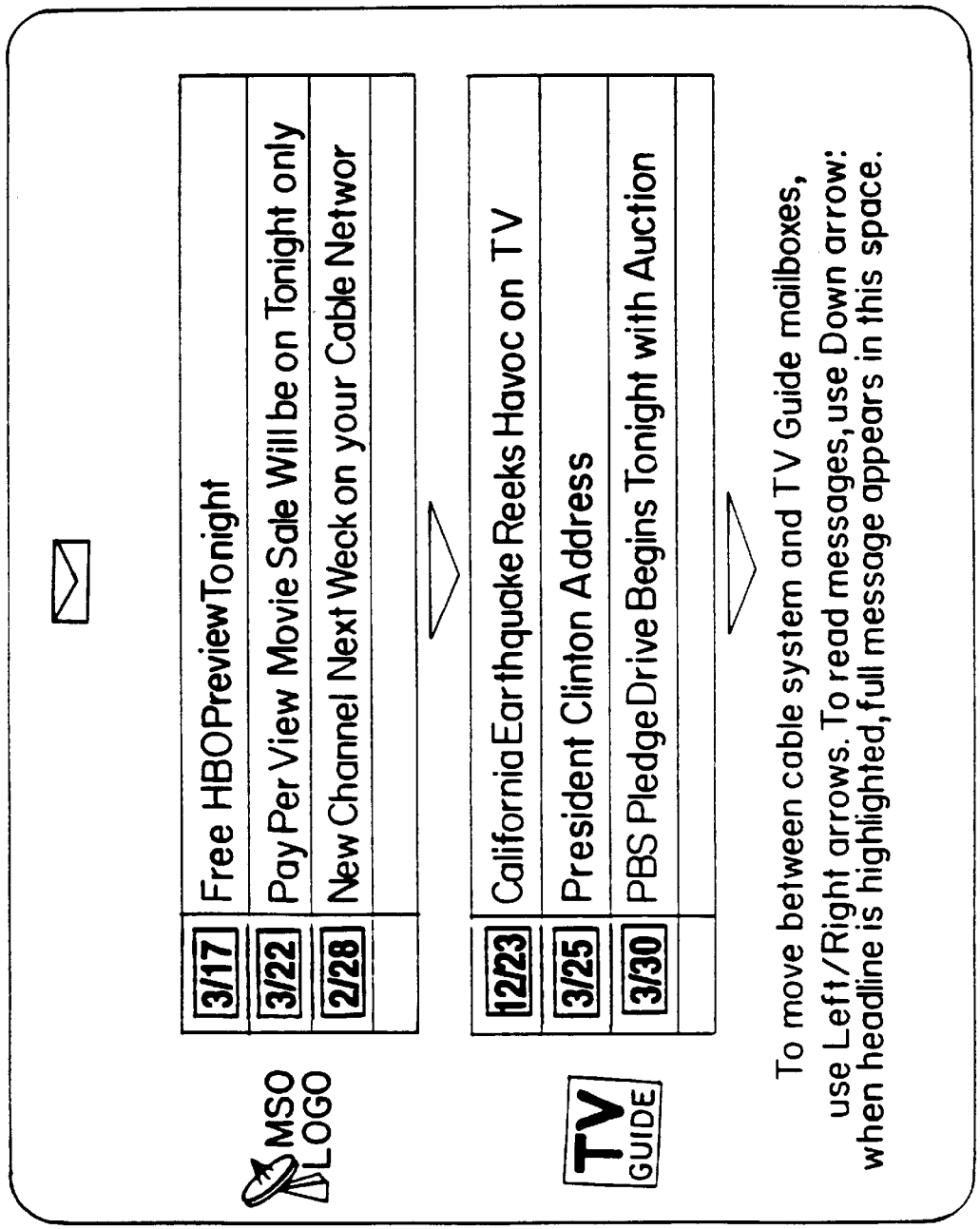
FIG. 28A is an alternative message menu.
Figure 29:
FIG. 29 shows billing information used in connection with the menu of FIG. 27.

The third horizontal bar 63 in the MENU mode shown in FIG. 6 is the "Messages" or "Customer Service" listing. As shown in FIG. 16, the first envelope icon 160 represents message information available from the cable operator. When the user selects the message icon, he is presented with a screen display of currently available messages, as shown in FIG. 27. The display shown in FIG. 27 includes cable system messages 270 and billing information 271. If the user selects the cable system messages option 270, she is presented with a message pertaining to the local cable operator, such as that shown in FIG. 28. If the user selects the billing status option 271 shown in FIG. 27, she is presented with a display of current billing information, such as that shown in FIG. 29. This information may include a history of purchases charged to the user, current balance information, pending orders, and, an indication of available credit, which can be an authorized debit limit previously arranged with the cable or other operator. Thus, a user could specify only a certain pre-set spending limit. Once the amount of charges from pay-per-view events reaches the limit, the microcontroller would not permit further ordering of events. An alternative messages menu is shown in FIG. 28A.

The next icon 161 in the Customer Service information bar 63 of FIG. 16 identifies a "Viewer Preference" mode, which allows the user to create or revise a number of program schedule system operating parameters. Once selected, this display presents the user with several preference options concerning certain operating parameters of the program schedule system, as well as the viewing of certain channels and/or certain content-specific programming, for example, those shown in FIG. 7.

Figure 7:
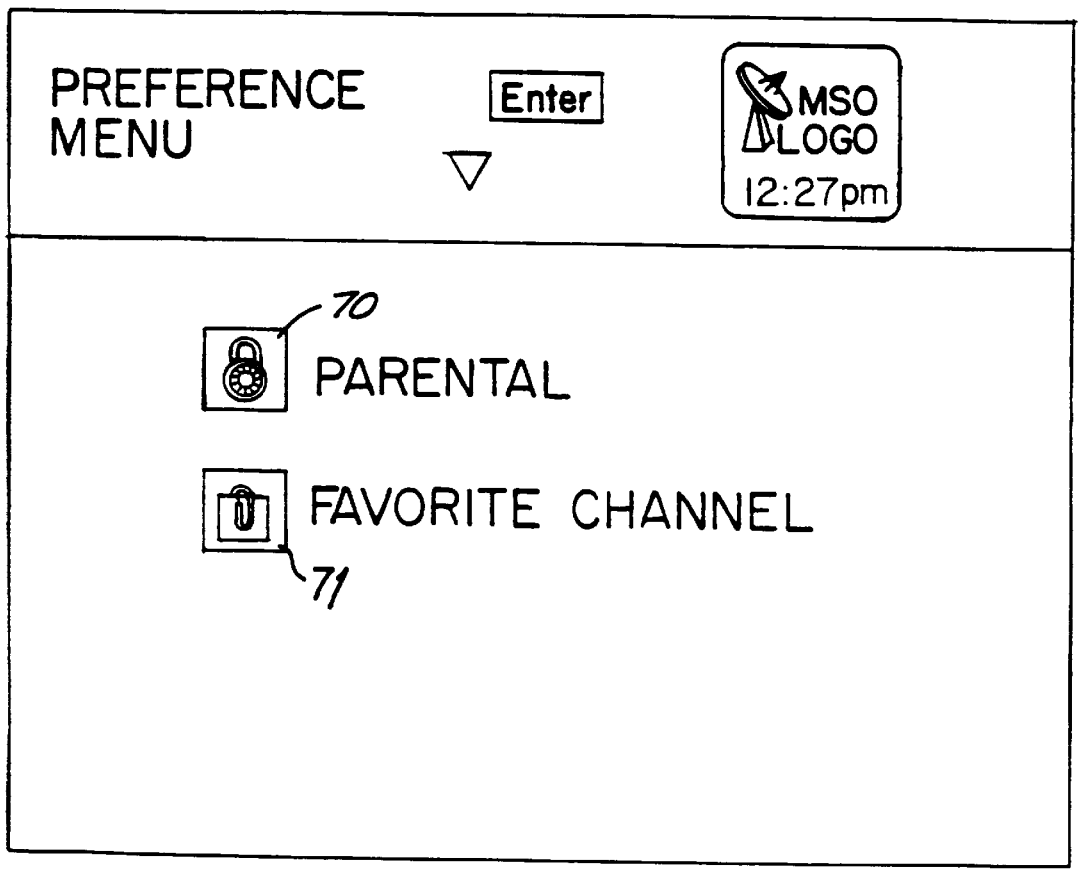
FIG. 7 depicts a Viewer Preference Menu that appears on a television screen in one aspect of the preferred embodiment of the present invention.

The first option shown in FIG. 7 is the "Parental" option 70, which can also be expressed as a "Key Lock Access" option. Once this option is initially selected by the user, the system displays a "Key Lock Access" submenu such as that shown in FIG. 30.

Figure 30:
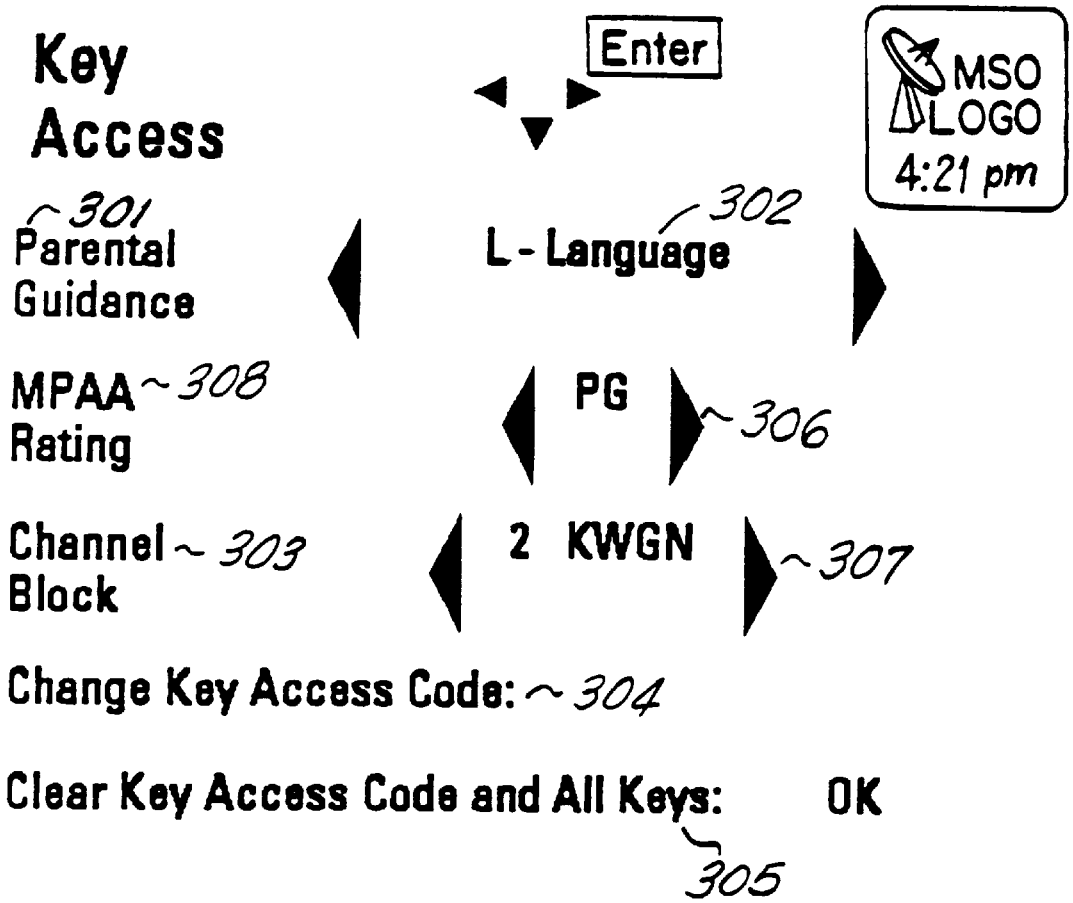
FIG. 30 shows a Key Lock Access menu that appears during one mode of operation of the preferred embodiment of the present invention.

The Key Lock Access menu shown in FIG. 30 allows the user to control access to individual channels and programs or events by requiring the user to enter an access code "key," consisting of a user-specified four digit code in the specific embodiment discussed herein, before ordering or viewing these pre-selected channels, programs or events. The menu display shown in FIG. 30 shows a series of subject categories that are entries in the vertical y-axis selectable by the user. A particular subject category is chosen by using the up or down direction arrow keys on the remote controller 40 to highlight the desired entry. Once the user selects a particular subject category, the left and right arrow keys are used to navigate within the chosen category.

The first subject entry shown in FIG. 30 is the "Parental Guidance" category 301. Once the user selects this category by manipulating the cursor to highlight the entry, the cursor can be then moved horizontally to an active window 302 which displays and selects one the five letter rating items in the category. The letter items represent ratings of program content as follows: "V" for violence, "N" for nudity, "L" for language, "AS" for adult situations and "PD" for parental discretion. Once the user selects a particular item, such as "L", by moving to the active window 302 using the right direction arrow key, depressing the ENTER key will indicate to the microcontroller 16 that a key lock access has been selected for programs rated with a "L" rating for violent or explicit language. The system indicates activation of a key lock access by displaying a key icon directly below the "L" category display. Once a key lock access is set, it can be deactivated by selecting the category letter and then depressing the ENTER key. This action causes the key icon to disappear. The user can change the rating category in the active window 302 by using the left or right direction arrow keys on the remote controller 40, images of which are displayed on the screen adjacent the active window as a reminder to the user. In this manner, the user can select other rating categories for setting a key lock access for any of the program content identifiers appearing in the Parental Guidance category.

The key lock access code itself consists of a four digit code, which the user can enter and modify at any time. To do so, the user highlights the fourth vertically selectable entry "Change Key Lock Access Code," 304 by manipulating the cursor to highlight it using the direction arrow keys on the remote controller. Once highlighted, the user enters a new four digit code or revises the then existing code and depresses the ENTER key. The microcontroller 16 then identifies the new four digit key lock access code and stores it in memory. The user can clear the key lock access code, as well as all other previously activated keys, by moving to the last entry in FIG. 30, "Clear Key Lock Access Code and All Keys," 305 which highlights the "OK" window, and then depressing the ENTER key. This action clears and deactivates all previously set keys, as well as the key lock access code.

The schedule information database record for each program contains a field that corresponds to the program content identifiers in the Parental Guidance category. During operation, the microcontroller checks this field in response to a user command to tune to or order a program, or to display its corresponding schedule information before carrying out the tuning, ordering or displaying function. If the parental guide identifier in the program schedule information database record matches any one of the activated parental guidance identifiers shown in FIG. 30, the user will be prompted to enter the four digit key lock access code before the system takes any further action. If the entered code matches the key lock access code previously entered and stored by the user as described above, the system will carry out the user request to tune to the program, to order it, or to display its corresponding schedule information. If the code is not recognized by the system, no further action will be taken and the user's request will be denied.

By manipulating the cursor using the direction arrow keys to highlight the second entry, "MPAA ratings," 308 the user can also set a key lock access for programs based on their MPAA rating code, as also shown in FIG. 30.

As with the Parental Guidance category, once the MPAA rating category has been selected, the user can move horizontally within the category to the active window 306 to select one the five rating codes, i.e., "G" for general audiences, "PG" for parental guidance, "PG-13" for suggested parental guidance, no one under 13 admitted without an adult, "R" for restricted and "X" for x-rated. As with the Parental Guidance category, by selecting a particular rating—by using the left or right direction arrow keys until the particular rating code appears in the active window—and then depressing the ENTER key, the user sets a key lock access for the rating, in which case a key icon appears below the rating code. And, as with the Parental Guidance category, once a key lock access is set, the system will prompt the user to enter the four digit key lock access code anytime a request is made to tune to, order or display schedule information for a particular program having a rating code which matches a rating code for which key lock access has been activated.

The Key Lock Access mode also includes a subject category 303 for controlling access to channels, which may be entitled, for example, "Channel Block" or "Channel Lock." As with the Parental Guidance 301 and MPAA 308 categories, the user navigates to the Channel Block category 303 by manipulating the cursor using the direction arrow keys on the remote controller and depressing the ENTER key. Once the Channel Block category 303 has been entered, the user can move horizontally to an active window 307, which in FIG. 30 indicates channel 2. Once the user highlights this window by manipulating the cursor using the direction arrow keys on the remote controller 40, a key lock access can be set for the channel appearing in the active window. This is done, as with the other subject categories in the Key Lock Access mode, by depressing the ENTER key, which again causes a key icon to appear below the channel number in the active window. The user can move to the prior channel or to the next channel in sequence by depressing either the left or right direction arrow key on the remote controller 40. In this manner, the user can activate a key lock access for any available channel.

As with the Parental Guidance 301 and MPAA 308 categories, once a key lock access is set for a particular channel, the system will prompt the user to input the key lock access code prior to carrying out an instruction to tune to or order that channel. If the input key lock access code matches the previously stored access code, the user's instruction is carried out. Otherwise, the user's instruction is ignored. Thus, the user can control access to the audio and video program content of any available channel. In this instance, the microcontroller 16 will not allow audio or video program signals to pass to the VDG, but it will allow schedule information to appear for the channel.

Figure 39:
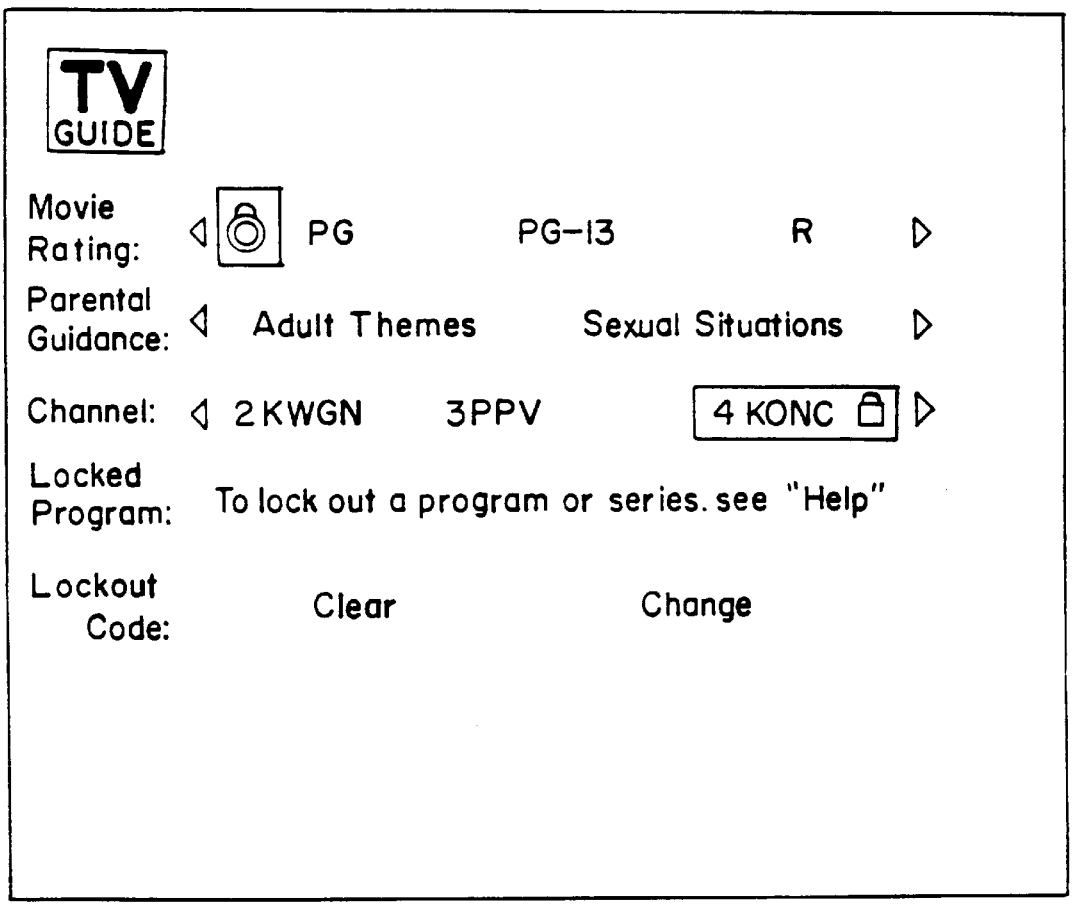
FIG. 39 is a Lockout menu that alternatively can be used for permitting or prohibiting access to certain programs.

An alternative method for effecting lockout of programs is accomplished using a "Lockout" screen, as shown in FIG. 39. In addition to limiting access to programs based on the Parental Guidance, MPAA and channel criteria, as discussed above, access may be limited on the basis of program title. FIG. 39 shows an alternative Lockout screen 250 that can be used to permit or limit access to programs based on program title, in addition to the aforementioned criteria. Other parameters also may be included, such as time of day, day of week, credit limit, and content category (e.g., talk shows).

To enter the Lockout screen 250 shown in FIG. 39, the user must enter a multi-digit lockout code using the numeric digit keys 42 and the enter key 44 on the remote controller 40. The lockout code is set initially when the system is first used or installed. To set a lockout code in the first instance, the user accesses a Setup screen 260, such as that shown in FIG. 40. The Setup screen 260 will automatically appear the first time the electronic program guide is installed and initialized. For access during normal operation of the electronic program guide, a suitable access path to the Setup screen 260 may be provided, such as from an appropriate icon in the MAIN MENU 215.

Figure 40:
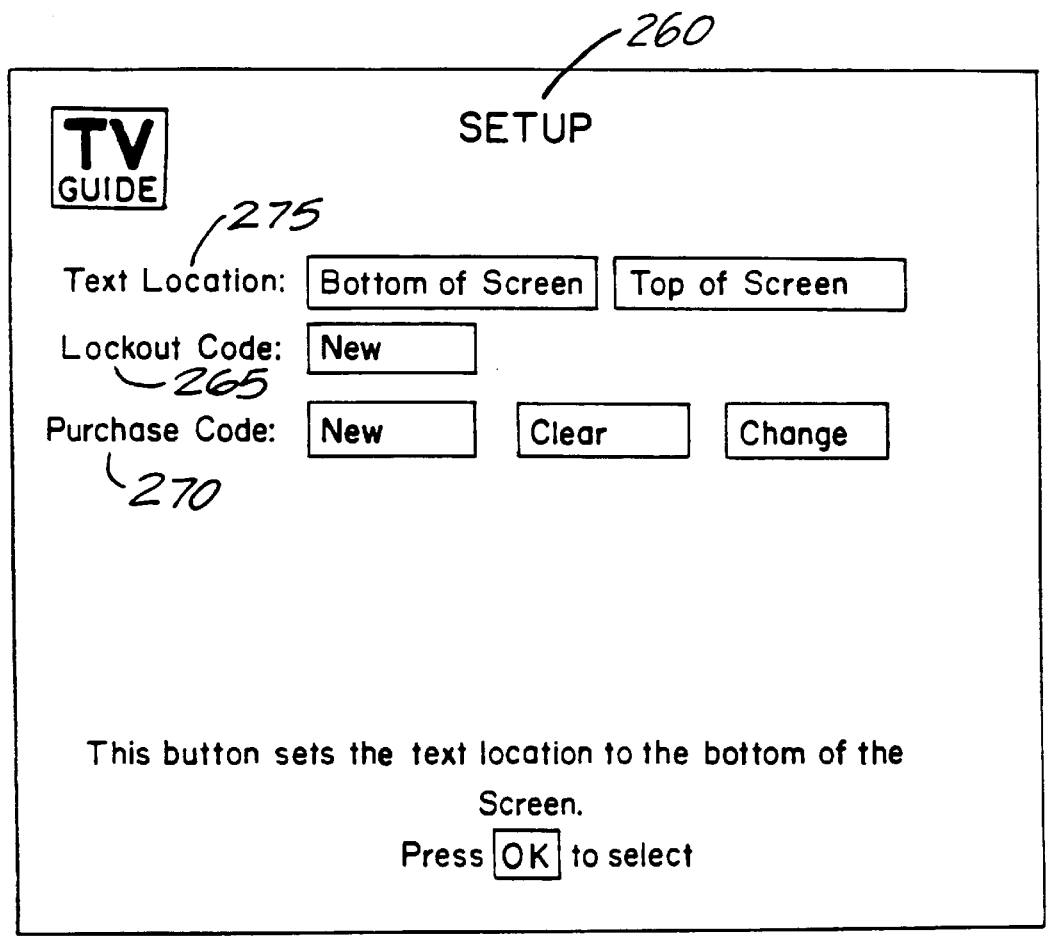
FIG. 40 is a Setup menu that can be used to set text location and a purchase code for premium and pay-per-view programming.
Figure 40A:
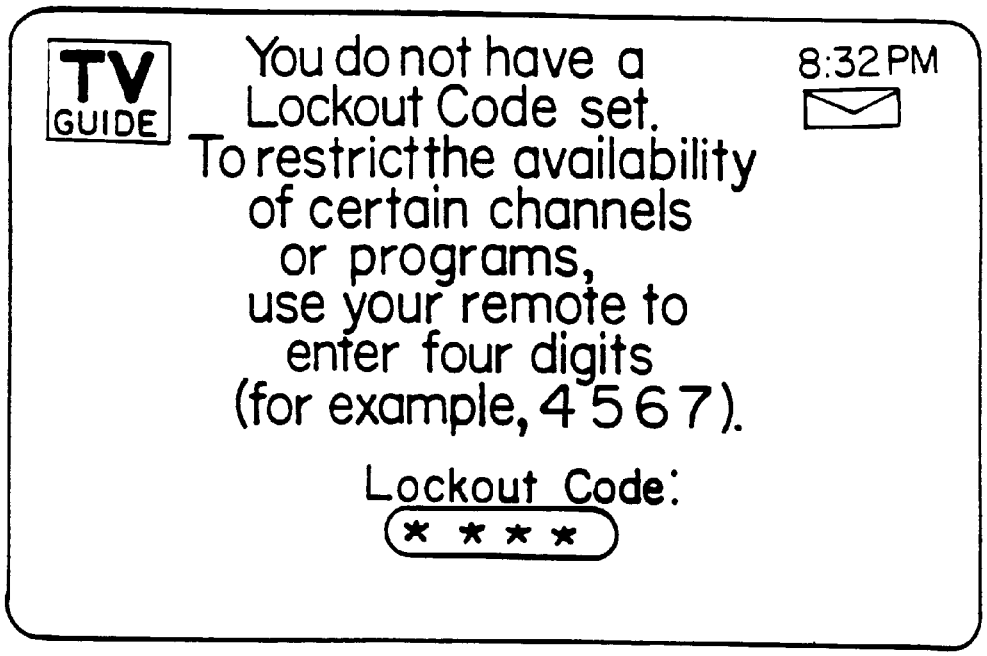
FIG. 40A shows an exemplary menu for inputting a lockout code.
Figure 40B:
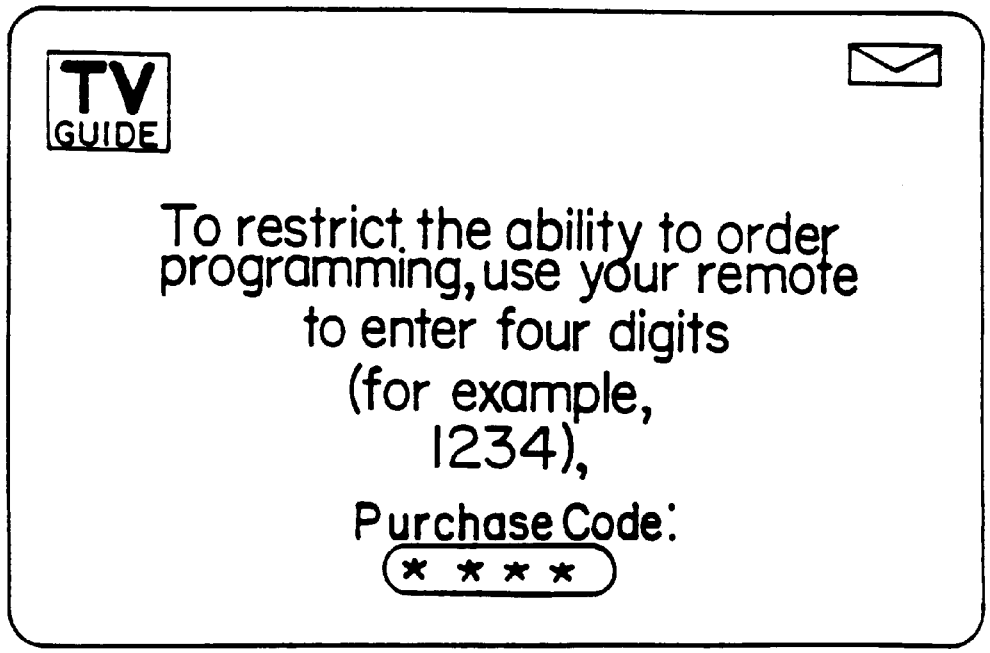
FIGS. 40B through 40E show, respectively, exemplary menus for entering, confirming, clearing or changing a purchase code.
Figure 40C:
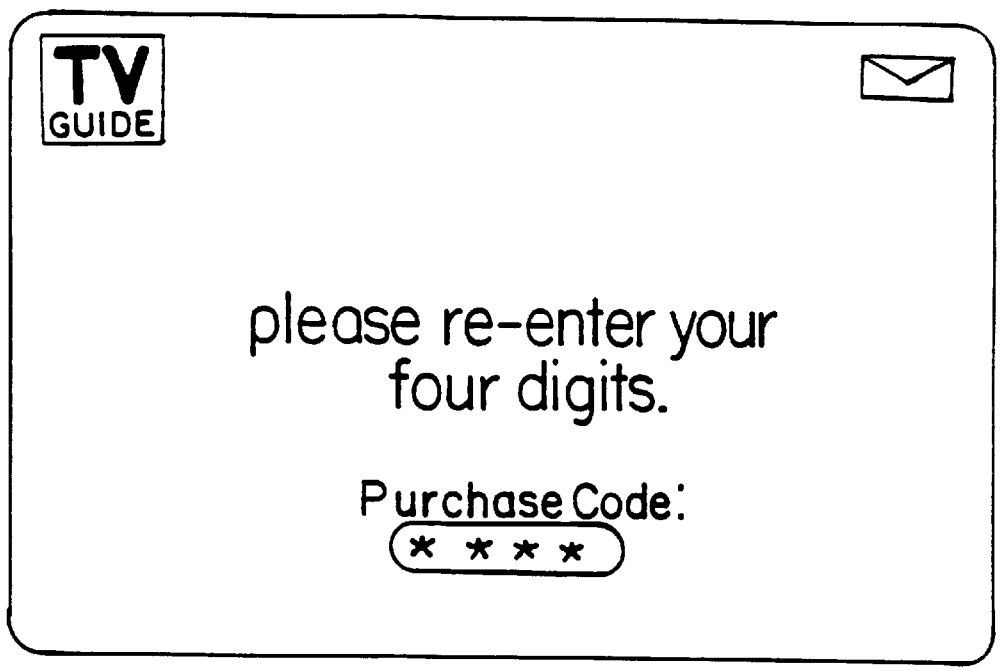
Figure 40D:
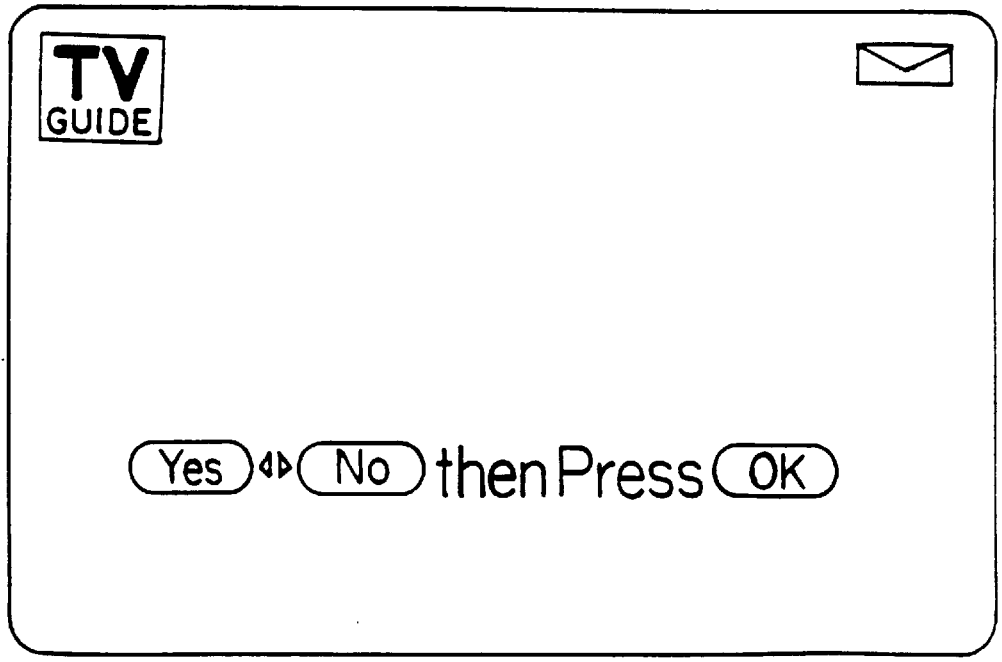
Figure 40E:
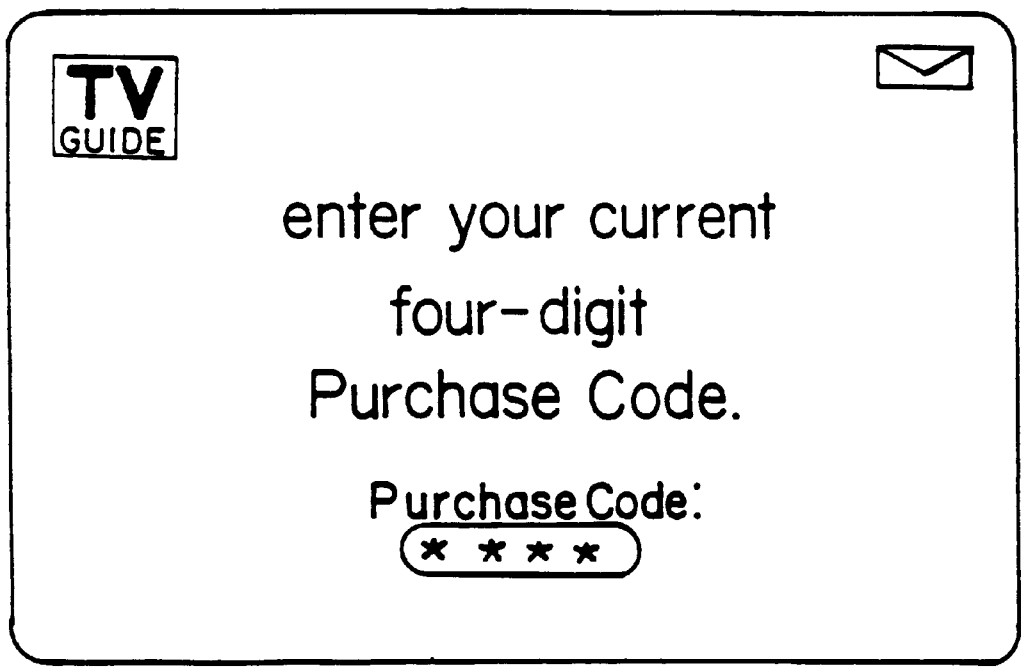

In the Setup screen 260 of FIG. 40, the user can navigate to the Lockout Code category 265 and set a new lockout code using the appropriate navigation and selection keys on the remote controller 40. A suitable menu for inputting the lockout code is shown in FIG. 40A. Once enabled, the lockout code must be used to set or modify locks, to view a previously locked program, or to clear or change the lockout code. The memory location of the stored lockout code also should be remotely accessible, such as by the local cable company, in case the user forgets the lockout code and it must be erased.

Once the lockout code is entered and the Lockout screen 250 of FIG. 39 is displayed, navigation within the screen is controlled by the direction keys 43A and 43B on the remote controller 40. Using the up and down direction keys 43A to move the selection cursor, either the Movie Rating 251, Parental Guidance 252, Channel 253, Locked Program 254 or Lockout Code 255 category can be selected. The left and right direction keys 43B are then used to navigate inside the selected category.

Clearing a previously set lockout code is accomplished by moving the selection cursor to the "Clear" entry 256 in the Lockout Code category 255 and depressing the enter key 44 on the remote controller 40. This causes the microcontroller to clear the lockout code stored in memory, as well as all locks previously set by the user. To change the current lockout code, the user navigates to the "Change" entry 257 in the Lockout Code category 255 and depresses the enter key 44 on the remote controller 40. The user is then prompted to enter a new lockout code, which is subsequently stored in memory by the microcontroller.

To set a lock in either the Movie Rating 251 or Parental Guidance 252 category, the user navigates to the selected entry in FIG. 39 by manipulating the selection cursor using the direction keys 43A and 43B on the remote controller 40, and then depresses a lockout key on the remote controller, such as the padlock key 45A shown in FIG. 4. The microcontroller will appropriately modify the display to indicate that a lock has been set, for example, by changing the color of the text or the background in the selected entry window, or by displaying an appropriate icon next to the text in the selected entry window. In FIG. 39, a padlock icon 258 appears in the window of the "PG" entry in the Movie Rating category 251. Toggling the lockout key while the selection cursor is positioned on a selected entry will alternately enable and disable the lockout function for that entry.

Similarly, to set a lock for a particular channel, the user selects the channel using the selection cursor and then depresses the lockout key. In FIG. 39, the channel "4 KCNC" entry in the Channel category 253 has been locked, which is indicated by the inverse video and padlock icon appearing in the window.

Program locks also may be set by title, which can be effected in several ways. For example, when the above-described FLIP or BROWSE mode of the electronic program guide is enabled, thereby causing the title of a program to be displayed along with other program schedule information in a window superimposed on the actual program signal then being received, the user can limit access to the program corresponding to the displayed program information by depressing the lockout key 45A on the remote controller 40. The user also may limit access to the currently tuned program by depressing the lockout key 45A on the remote controller 40 while viewing the program, regardless whether the FLIP or BROWSE modes are enabled. In this instance, the microcontroller first removes the program signal from the display and then accesses the schedule information database record for the program then appearing and sets an appropriate flag to indicate the program has been locked. Also, when viewing program schedule information in the grid or category listings, as discussed above and shown, for example, in FIGS. 18–20, the user also can tag a program for lockout by highlighting it with the selection cursor and then depressing the lockout key 45A on the remote controller 40.

In each of these instances, the microcontroller then stores the program title in a lockout title list stored in memory along with any other titles that previously have been locked out by the user. Individual items in the lockout title list are displayed in alphabetical order in the "Locked Program" window 259 shown in FIG. 39, and the user may scroll through the list by positioning the selection cursor on the Locked Program window 259 using the up and down direction keys 43A on the remote controller in FIG. 40 and then using the left and right direction keys 43B to scroll through the list one item at a time. In order to save memory space, alternatively, the microcontroller may be programmed to set a flag or otherwise mark the particular database record containing the program schedule information for the program that is to be locked out, and to thereafter access the database to retrieve the title information when it is to be displayed, such as when the viewer is reviewing the lockout title list in the Locked Program window 259.

Once an individual title has been locked out, the microcontroller can be programmed optionally to display an appropriate lockout icon, such as a padlock, whenever program schedule information for the locked program is to be displayed, such as in the window overlay of the FLIP or BROWSE mode, or in the various grid and category displays available in the MAIN MENU displays. The system also may display an appropriate text message if someone tries to access the program signal of a previously-locked program. Of course, once a program is locked, in all instances the microcontroller prevents access to the actual program signal (including both the audio and video portions of the program signal) until an appropriate code is entered or the lockout is removed.

Several methods can be used to block programs at their time of airing. For example, in the case of the Movie Rating, Parental Guidance and Channel categories, the schedule information database record for each program is provided with a field that corresponds to the rating, program content identifier or channel appearing, respectively, in the Movie Rating 251, Parental Guidance 256 and Channel 253 category of the Lockout screen 250 shown in FIG. 39.

During operation, the microcontroller checks the appropriate field in the database record in response to a user command to tune to or order a program before carrying out the tuning or ordering function. Additionally, the lockout code also may be used to restrict access to program schedule information. In this instance, the microcontroller also would check the appropriate field in the schedule information database record before displaying schedule information for a program.

Figure 41:
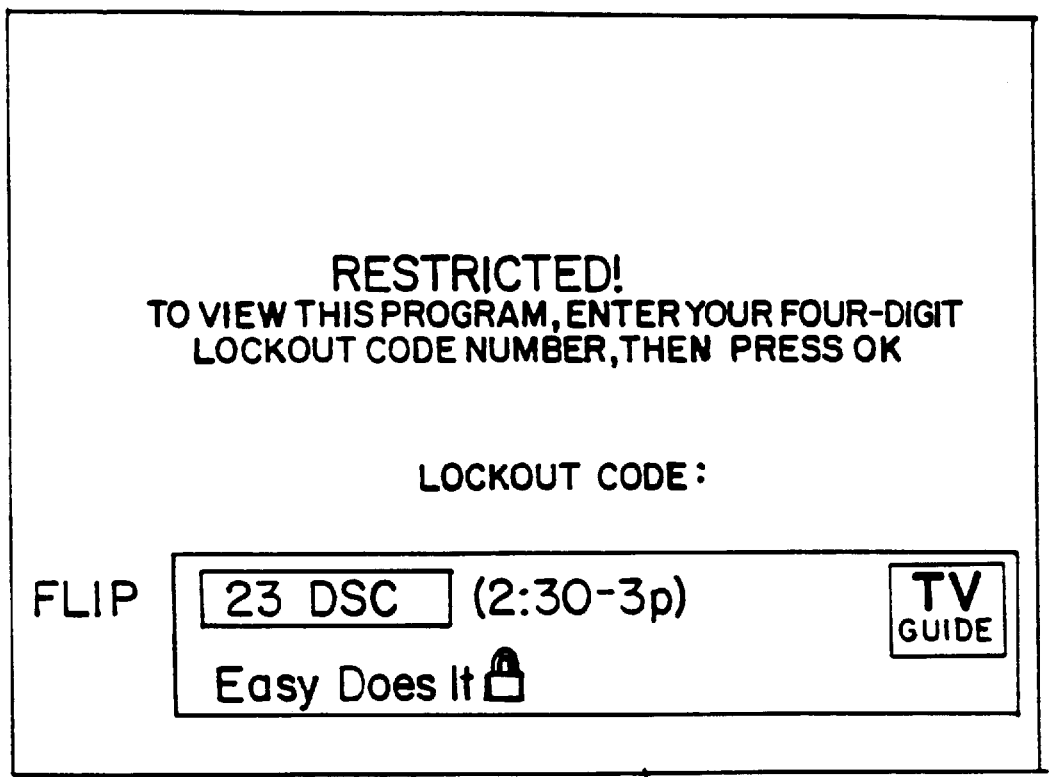
FIG. 41 is a Lockout Verify menu that is used in connection with the Lockout menu of FIG. 39.

If the movie rating, parental guidance or channel identifier in the program schedule information database record matches any one of the locked-out entries indicated in the Lockout screen 250, a Lockout Verify screen 300 is displayed in overlaying relationship with the video signal then being displayed on the television receiver, as shown in FIG. 41. The user will be prompted to enter the previously set lockout code before the system takes any further action. As an added security measure, asterisks will be displayed as the user enters the lockout code. If the entered code matches the lockout code previously entered and stored by the user as described above, the system will carry out the user request to tune to or order the program, or to display its corresponding schedule information. If the code is not recognized by the system, no further action will be taken and the user's request will be denied. In this case, the Lockout Verify screen 300 will remain displayed on the television receiver waiting for a correct code to be entered. If no action is taken by the user, the Lockout Verify screen 300 will be removed after a predetermined time-out period, such as one or two minutes.

Similarly, in the case of lockout by title, the microcontroller also could check the title field in the schedule information database record and compare it with the list of program titles for which the user previously set a lock. If, as described above, the microcontroller does not maintain a list of the actual titles of programs locked by title, a suitable identifier can be set in a field in the database record to indicate that a program has been locked by title when the user first sets the lock, and, thereafter, the microcontroller could check that field in response to a user request to tune to or order a program, or display schedule information.

An alternative method for effecting lockout involves the use of a portion of the real-time program signal being received by the television receiver. With this method, codes corresponding to a program's rating, parental guidance category, title or channel are inserted into and transmitted along with the program signal, such as in the vertical or horizontal blanking intervals, or on raster scan lines that are not visible on the television receiver. When the program signal is received, these codes are stripped from the program signal and stored in memory. Methods and apparatus for the insertion transmission and reception of digital codes carried on a program signal are known in the art.

After the transmitted codes have been separated from the program signal and stored in memory, the microcontroller can compare them with the lockout criteria set by the user in the Lockout screen and take appropriate action, as described above.

The Setup screen 260 shown in FIG. 40 also contains a Purchase Code category 270, which allows the user to set a numeric purchase code that must be entered before any premium channels or pay-per-view programs can be ordered. The Setup screen 260 shown in FIG. 40 includes entries for setting a new purchase code and for clearing or changing a previously set password. Appropriate menus for setting, confirming, clearing or changing the purchase code are shown in FIGS. 40B through 40E. Once a user sets a purchase code, the microcontroller thereafter will display a Purchase Code Verify screen in response to a user request to tune to or order a premium services channel or pay-per-view program. The Purchase Code Verify screen works in a manner similar to the Lockout Verify screen 300 in that the user is prompted to enter the previously set purchase code password before the microcontroller will tune to or order the requested program. If the correct purchase code is not entered, the microcontroller will take no further action and the Purchase Code Verify screen will remain displayed waiting for input of the correct code. If no action is taken within a predetermined time-out period, the Purchase Code Verify screen will be removed.

The next option shown in FIG. 7 is the Channel Preference or "Favorite Channel" list option 71. By highlighting this icon and depressing the ENTER key on the remote controller 40, the user is presented with a submenu on the screen such as that shown in FIG. 8.

In normal operation, the program guide system presents channels to the user in numerical order in response to an up or down change-channel command issued by the user using one of the direction arrow keys on the remote controller. The channel number presentation sequence includes all channels offered by the cable company in the order of which they are modulated onto the channel by the operator.

The program guide system also provides the capability of selecting from among several user-defined channel presentation sequences, which are activated using one of the three "check mark" icon keys 48A, 48B or 48C on the remote controller 40 shown in FIG. 4. Each of these keys represents a preferred particular list of channels which a particular user selects and which the microcontroller stores in memory as a "Channel Preference" list, as discussed in detail below. To activate one of these preferred channel lists, the user depresses the corresponding check-mark icon key, in which case the microcontroller may display the chosen icon on the screen in the graphic overlays and full screen displays to remind the user that a particular channel preference list is being used by the system. Once a preference list is activated, the system will limit the tuning of the television receiver and the display of schedule information only to those channels that are designated in the activated viewer preference list.

To revise the content and/or sequential order of the channels in the Channel Preference list, the user enters the MENU mode of the programming guide system. To enter the MENU mode from the FLIP mode, the user twice depresses the MODE key 38 when using the remote controller 31 of FIG. 3. To enter the MENU mode when using the alternative embodiment of the remote controller 40 of FIG. 4, the user simply depresses the MENU icon key 47B.

When first entered, the MENU mode has a screen display such as shown in FIG. 6. To select the submenu for editing the Channel Preference list, the user first selects the third horizontal bar 63, which can be titled, for example, "Messages" or "Customer Service," by manipulating the cursor using the down direction arrow key, as shown in FIG. 7. The screen of FIG. 6A is thereby displayed. The user then selects the second icon 161 appearing in that bar, indicated with a check mark, which corresponds to a "Viewer Preference" mode, by highlighting the icon using the direction arrow keys and again depressing the ENTER key. This action will cause the microcontroller 16 to display a Viewer Preference submenu such as that shown in FIG. 7. By selecting the Channel Preference or "Favorite Channel" entry 71, the user enters the Channel Preference submenu, shown in FIG. 8. If the user has not already done so, he would then depress the particular check-mark icon key on the remote controller 40 of FIG. 4 to create or revise the particular channel preference list.

Figure 8:
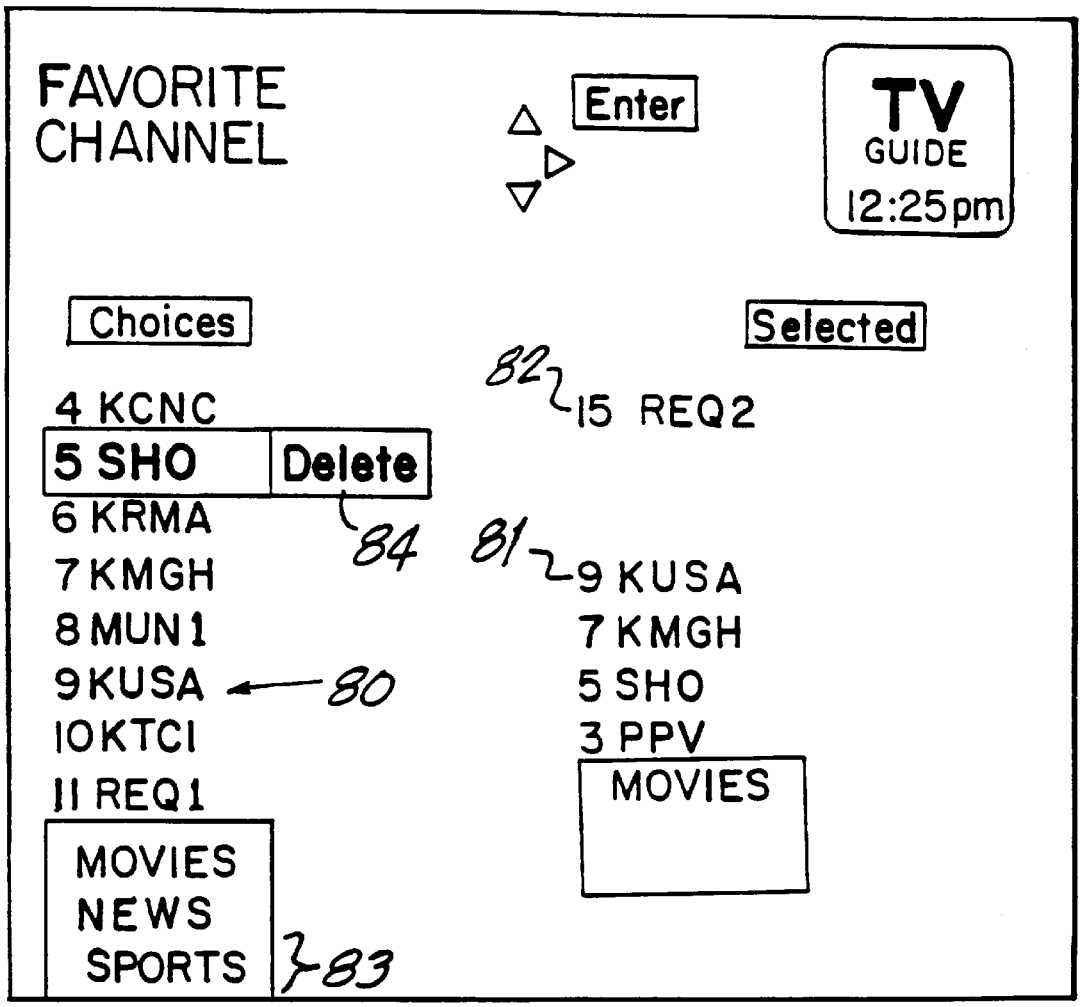
FIG. 8 shows a Preferred Channel selection submenu.

In the Channel Preference menu shown in FIG. 8, a list 80 of all channels available on the particular cable system is displayed on the left side of the television receiver screen, labeled "Choices" in FIG. 8, and the viewer's preferred list 81, designated "Selected" in FIG. 8, is displayed on the right side. If a particular code, such as an END or "−1" symbol appears in the first (uppermost) position 82 of the viewer preference list 81, the system displays information for all channels in numerical order in all modes of operation. This is the default mode of the system.

By selecting channels in sequence from the available list 80 and placing them in the desired order in the preference list 81, the user can select a subset of channels and/or rearrange the default sequence in response to a channel up or channel down command from the user. This is accomplished by highlighting a channel in the available list 80 using the up and down direction arrow keys on the remote controller 40 and depressing the ENTER key 44, which stores the entry temporarily in a buffer.

The microcontroller 16 stores a list of all channels previously entered in the viewer preference list 81. As a particular channel is highlighted by the user when navigating through the available channel list 80 displayed on the left side of the television screen, a window 84 appears adjacent to the particular channel highlighted by the user. If the particular channel already appears in the viewer preference list 81, the system displays a "DELETE" message in the window 84 as a reminder that the channel was previously selected from the available channel list 80 and can only be deleted from the list 81, which is accomplished by depressing the ENTER key 44. If the particular highlighted channel in the list 80 was not previously selected, the system displays a "SELECT" message in the window 84 as a reminder that the particular channel will be selected for addition to the viewer preference list 81 if the user depresses the ENTER key 44. The microcontroller 16 inserts a selected channel at the bottom of the list 81. In this manner, the user can select or delete channels from the viewer preference list in any desired order.

The available channel list 80 may also be provided with categorical entries 83, such as movies, news, sports or children's shows. The user may also highlight any of these entries and put them into the viewer preference list 81. If the user does include a category in his viewer preference list 81, when the user issues channel up or down commands, the system will display, in sequence, first the user's selected preferred channels in numerical order and then all channels having a program whose content corresponds to the selected category or categories at the time.

Once the user has revised the channel preference list 81 in the described manner, the microcontroller 16 will follow the stored user-specified channel sequence in response to a change-channel command made by the user employing one of the direction arrow keys. To activate the viewer preference list, the user depresses one of the three check-mark icon keys 48A, 48B or 48C on the top of the remote controller shown in FIG. 4. The viewer preference list can be used to selectively limit tuning of the television receiver or display of schedule information in any of the operating modes of the electronic program guide. In the present embodiment, once a preference list is activated, the system will limit the tuning of the television receiver and the display of schedule information in the FLIP, and BROWSE modes, as well as in the grid category and channel listings in the MENU mode, only to those channels designated in the activated viewer preference list. The tuner can not be tuned to, and no corresponding schedule information can be displayed for, any channel not entered in the viewer preference list when it is activated. In this regard, it should be noted that setting a key lock access in the Parental Guidance 301, MPAA 308 or Channel Block 303 categories produces a different result than when using other display criteria, such as the Channel Preference List of preferred channels discussed above. Thus, while a key lock access will prevent audio and video program information, but not schedule information, from being displayed or ordered absent entry of an authorization code, if a particular channel is included in the Channel Preference list and also has a key lock access activated in the Channel Block category 303 of the Key Lock Access mode, that channel or its corresponding schedule information will not be displayed at any time.

To deactivate a previously selected viewer preference list, the user toggles the appropriate check-mark icon key on the remote controller 40 of FIG. 4. Once deactivated, the system defaults to displaying and tuning all available channels, as well as displaying schedule information for all available channels.

Alternatively, the viewer preference list 81, if activated, can be used to control tuning and display of schedule information only in selected modes, such as only in the FLIP mode, thus allowing the user to tune and view corresponding schedule information only for those channels entered in the preference list 81 in the FLIP mode, while viewing all channels and corresponding schedule information in all other modes.

In this latter configuration, as well as in the instance where no channel preference list is activated and the system is in default mode, if a channel appears in the viewer preference list 81 that corresponds to a service not subscribed to by the user, the microcontroller 16 causes an ordering submenu to appear instead of displaying a program signal along with the graphic overlay, as shown in FIG. 9. This submenu indicates to the user that he does not currently subscribe to the selected service, and then asks the user if he would like to order the service. If the user responds affirmatively, the program schedule system takes the user to another ordering submenu to confirm the user's request, as with impulse ordering.

Figure 37:
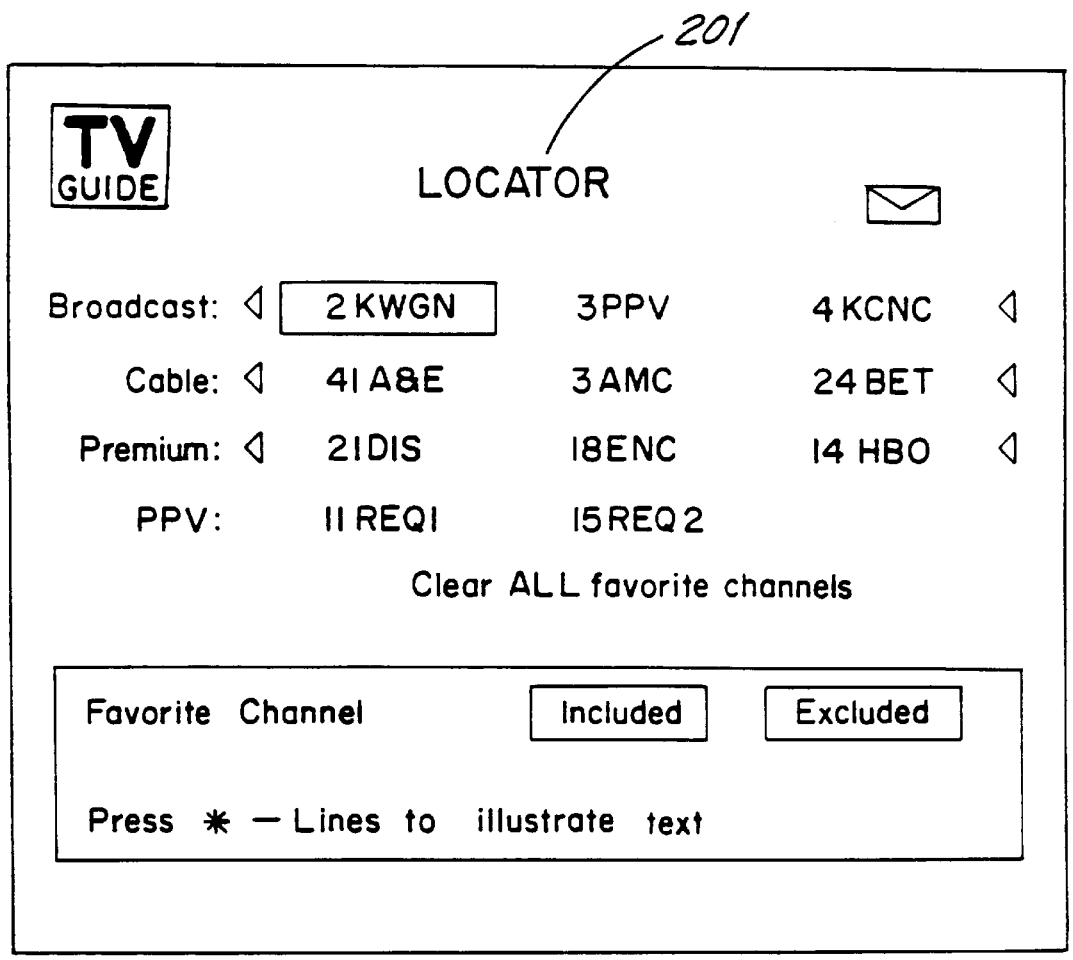
FIG. 37 is a menu showing a Locator screen for locating channel numbers and defining favorite channel lists.

The program guide also may be configured with a Locator screen 201, as shown in FIG. 37, which aids the viewer in channel selection and definition of a favorite channel list. The Locator screen 201 displays all available channel numbers grouped according to the source of the program information appearing on any particular channel at any particular time, e.g., broadcast, cablecast, pay-per-view, near video on demand, satellite, or other source of program material. Thus, the Locator screen 101 can be used to locate any particular channel or service because the groupings provide a quick and efficient method for scrolling through the list of available channels. The channel numbers also may be grouped according to other criteria, such as program category, program content, program rating or other content-based standard, time of availability, numerical order, or other logical grouping.

In the example shown in FIG. 37, the user navigates within the Locator screen 201 using the direction keys 43A and 43B on the remote controller 40. The right and left direction keys 43B move the selection cursor within the category rows, while the up and down direction keys 43A are used to select a particular category. From the Locator screen 201, any particular channel can be selected for viewing by positioning the selection cursor on the desired channel and depressing either the enter key 44 or an optional tune key (not shown) on the remote controller 40.

In addition to aiding in channel selection, the Locator screen 201 also provides the user with the ability to conveniently define favorite channel lists. To do so, the user first moves the selection cursor to the desired channel by using the direction keys 43A and 43B or numeric digit keys 42 on the remote controller 40, and then depresses a favorite channel key 46A provided on the remote controller 40, which causes the display to change in some manner or characteristic as an indication that the channel has been selected as a favorite channel, such as by changing the color of the channel identification text or the text background, by displaying an appropriate icon or by some other appropriate identification scheme. In the remote controller 40 shown in FIG. 4, the pound key "#" can function as the favorite channel key.

Also, if multiple favorite channel lists are being used, the user would depress the appropriate favorite channel key on the remote controller to select a particular list before depressing the favorite channel key. For example, as discussed above, the remote controller 40 shown in FIG. 4, has three colorcoded check-mark favorite channel keys 48A, 48B and 48C, which provide for at least three individual favorite channel lists for three individual users. Different identification characteristics could be displayed on the Locator screen 201 to indicate that a particular favorite channel list is selected. For example, the icon or image used to enable a favorite channel list on the remote controller, such as the check mark key 48A used on the remote controller 40 shown in FIG. 4, could be displayed on the Locator screen 201, as well as other screens of the program guide, when a favorite channel list is enabled. Alternatively, the color of the displayed text or background could be changed to match the color of the selected favorite channel key.

The Locator screen 201 may be accessed via several paths. For example, it may be included as a virtual channel that is conveniently positioned in the channel-tuning sequence, such as between the highest and lowest available channel numbers—for example, a virtual channel 0. To the user, such a virtual channel appears to be a conventional channel. However, it requires no additional bandwidth as a carrier. For example, it can be digitally produced at the subscriber station or included in an appropriate blanking interval in existing bandwidth frequencies. In this manner, the virtual channel is accessible either by entering the corresponding channel number using the numeric digit keys 42 on the remote controller, or by using the up and down direction keys 43A to wrap around from the highest to the lowest channel number, or vice versa. As shown in FIG. 38, it also may be desirable to provide a suitable identifier, such as an icon or text message 210, in the MAIN MENU display 215, from which the user could access the Locator screen 201 simply by highlighting the identifier 210 with the selection cursor and depressing the enter key 44 on the remote controller 40. Alternatively, the remote controller may be provided with a key corresponding to the Locator screen 201 which would cause the microcontroller to display the Locator screen 201 when the user depressed it.

Virtual channels may be positioned at any other desired location in the channel-tuning sequence, and may be used to provide a variety of functions in addition to, or as alternatives to, the Locator screen 201. As examples, the user could access a near-video-on-demand (NVOD) service, a text- or graphics-based information retrieval service, or a digital music service (DMX) through the virtual channel interface. As with the Locator screen, these virtual channels can be accessed as a channel by sequencing with the direction arrow keys, direct digit entry, or by using a last channel function. They also can be accessed as a menu in the menu mode. When accessed as a channel, these virtual channels have the functionality of a channel, and when accessed as a menu, they function as a Menu feature—i.e., whatever channel was tuned prior to accessing the Menu screen shall remain the currently tuned channel.

Ordinarily, each of these services comprises a plurality of channels. For example, an NVOD service may function by staggering the start times of one movie across several channels, such that the user of a hypothetical eight-channel-per-video NVOD service would wait, at most, 15 minutes for a two-hour film to begin. As another example, a ten-channel video game service may function by delivering ten video games, one per channel.

In the past, this multiple-channels-per-service approach has resulted in user inconvenience. As an example, when provided with a package of services including television channels 1–39, DMX channels 40–46, NVOD channels 47–55, and information retrieval channels 56–70, a television-viewing user surfing through the channels using the remote controller 40 UP key 43A would be faced, at channel 39, with pressing the UP key 43A 36 times to return to channel 1 at the beginning of the television channel sequence.

That inconvenience is ameliorated by the use of virtual channels. A virtual channel that identifies the channels available in each particular service could be positioned in the channel tuning sequence at the location of the first channel in the service or, alternatively, could be assigned the channel number that immediately precedes the first channel in the service. In the previous example, virtual channel 40 would provide access to the DMX service, virtual channel 47 would provide access to the NVOD service, and virtual channel 56 would provide access to the information retrieval service. As explained more fully below, a user tuned to channel 39 in such a system would press the remote controller 40 UP key 43A only five times to arrive at channel 1, intermediately arriving at channels 40, 47, 56, and 71.

In one embodiment, a user may not directly select the individual channels comprising a service accessed via a virtual channel; instead, the user must first tune to the virtual channel and then affirmatively choose to enter the service associated with the virtual channel, for example, by pressing an OK or ENTER key on a remote controller. As a result, virtual channels, and not the individual channels comprising the services, are adjacent to one another in the channel tuning sequence. In this case, the system operates to display the corresponding virtual channel in response to a user command to tune to any channel offering a particular service. Thus, in the above example, in response to a user command to tune to any of channels 47 through 55, the system would display the virtual channel 47 associated with the NVOD service. Alternatively, the system could be configured to allow the user to access any channel directly without having to enter the virtual channel. In yet another embodiment, once the user enters the virtual channel for a service and selects a channel, he is thereafter permitted to access each channel in the service by using the up and down keys on the remote controller 40 as he would do in a normal tuning sequence. However, the system will automatically limit the tuning sequence only to those channels in the service, including the virtual channel. Thus, where the virtual channel is 40 and the service channels are 41, 42, 43, 44, 45 and 46, once the user selects and tunes to a service channel through the virtual channel, e.g. channel 42, subsequent use of the up and down keys will allow the user to sequence through the channels. Pressing the UP key seven times would change the channels as follows: 43, 44, 45, 46, 40, 41, 42. The user exits the service by selecting the virtual channel 40 and then selecting the EXIT function.

Virtual channels also provide a convenient means for accessing information provided to users in the form of data feeds. As discussed more fully below, in addition to program schedule information, users may also be provided access to data feeds containing information on various topics such as news, weather, sports, stock quotes, etc. Each of these topics may be divided into categories for convenient access. For example, a virtual channel may be provided indicating the different categories of sports information available and the channel number to enter to access each category. In addition to using virtual channels to access different services, virtual channels may be used to provide convenient access to multiple services grouped according to category of information. For example, FIG. 55, discussed more fully below, illustrates a virtual channel for sports information that provides access to both real channels such as ESPN and other virtual channels used to provide access to sports related data feed information. In addition, it is also possible to provide access to sports video games received through the SEGA channel using virtual channels. By incorporating the SEGA game hardware into the EPG system of the present invention, the current user interface for the SEGA channel may be replaced with multiple virtual channels for the different games available. In this manner, the different SEGA games available at any given time through the SEGA channel may be distributed throughout the EPG based on the category of the game.

In addition to Channel Preference or Favorite Channel keys, the remote controller 40 can also be supplied with a number of user-activated category preference icon keys, e.g., movies, sports, or children's programming. The system can be adapted to present to the user only those programs meeting particular preference category when it is activated by the user. As with the Channel Preference icons, the microcontroller may display the icon corresponding to the activated preference category to remind the user of the currently activated mode of system operation.

The question mark icon 162 at the far right of the third horizontal bar in the menu of FIG. 16 identifies a program guide system "Help" mode in which information explaining the operation of the system is displayed for the user. Again, by manipulating the cursor using the appropriate keys on the remote controller, the user can select this mode. Once selected, the next submenu appearing in the Help mode asks the user to identify the particular portion of the system about which the user would like to view Help information.

The icons appearing in the last horizontal bar of the MENU mode identify certain interactive and/or other types of information services which the programming system, acting as a gateway, makes available to the user as shown in FIG. 17. By manipulating the cursor, the user can select any one of the identified services, as shown in FIGS. 31–35.

Figure 31:
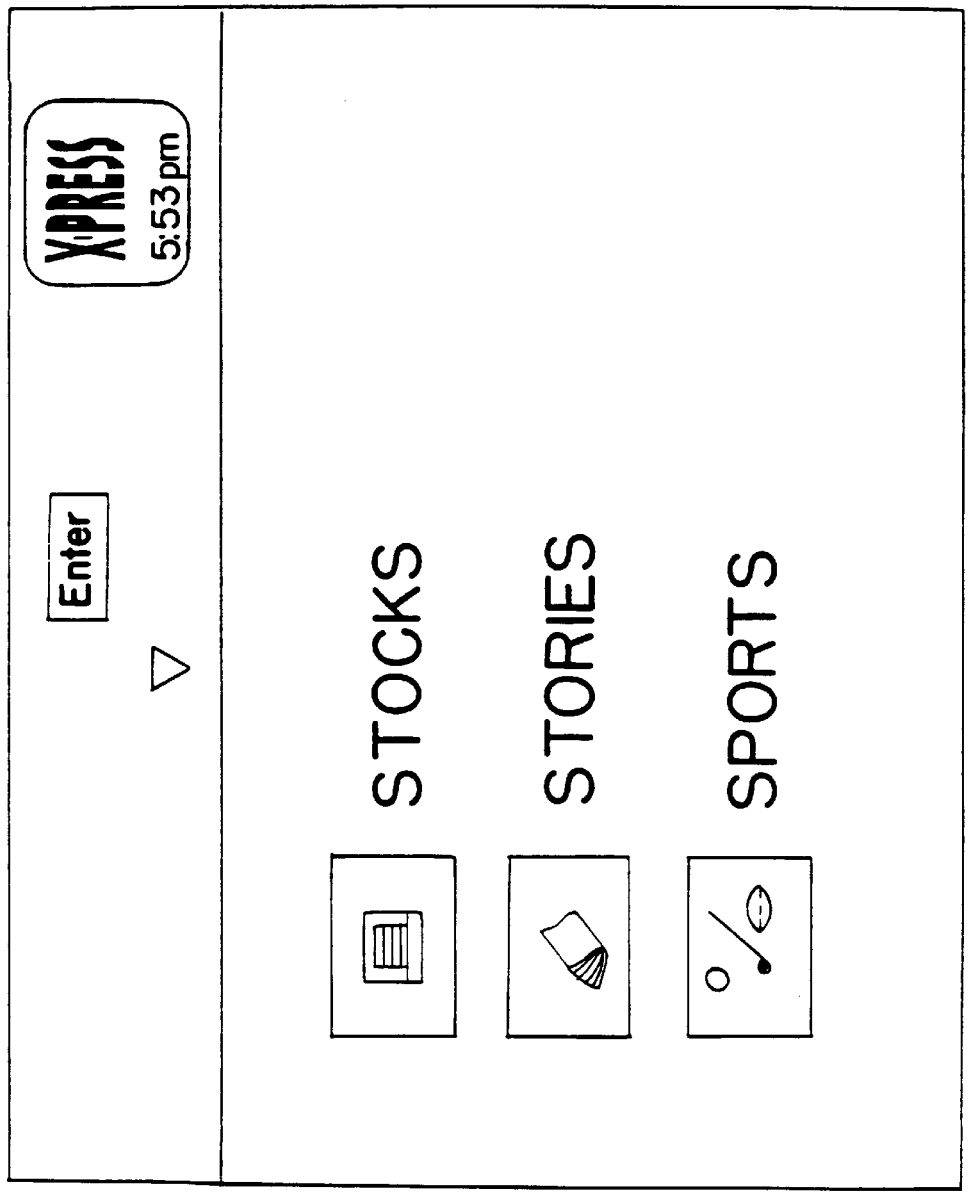
FIG. 31 shows a menu appearing in connection with an Interactive Television mode of operation of the preferred embodiment of the present invention.
Figure 33:
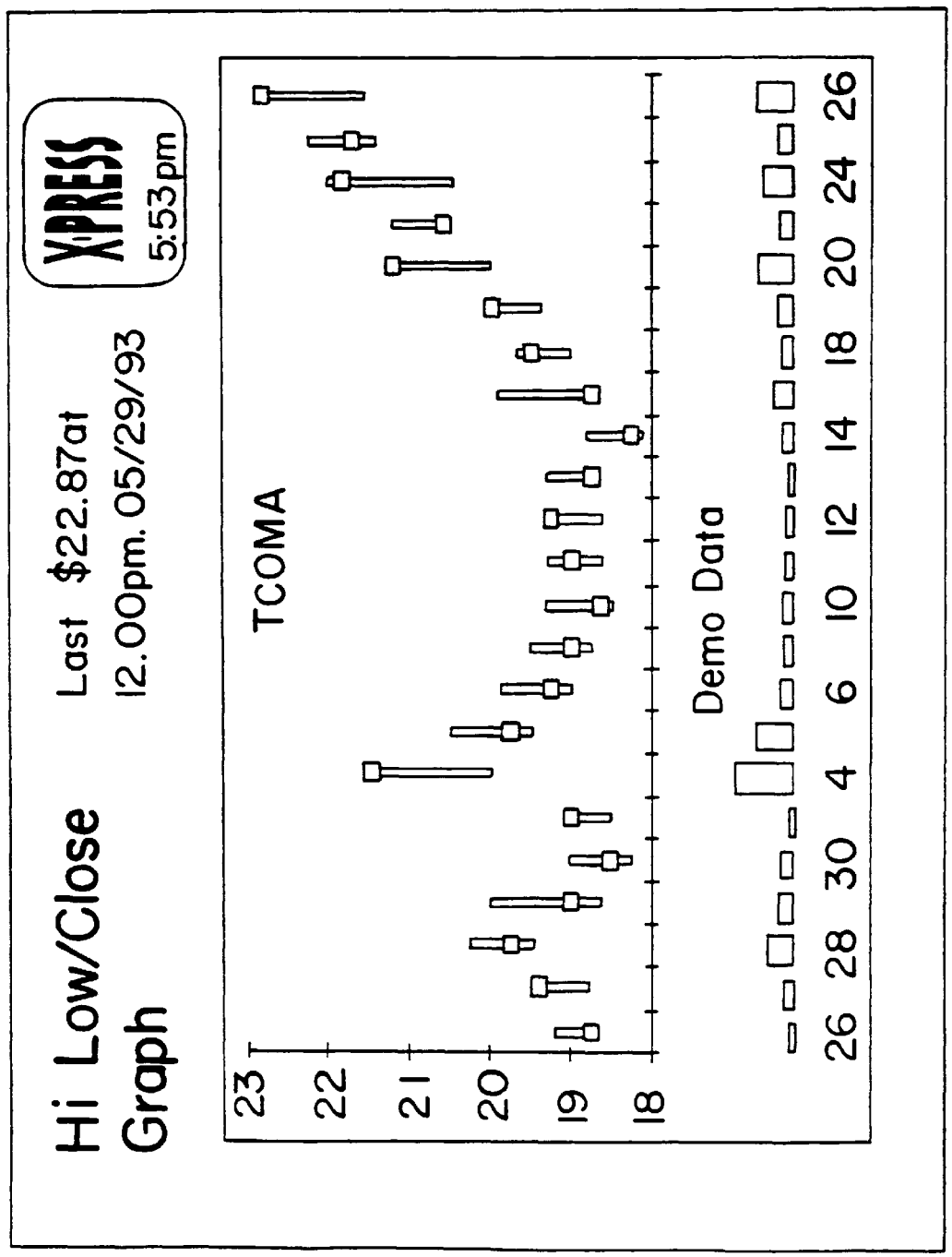
FIG. 33 shows other information that appears in connection with the Interactive Television mode of operation shown in FIG. 31.
Figure 35:
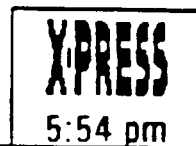
FIG. 35 is a menu showing information that appears in a sports display in the Interactive Television mode of operation of the preferred embodiment of the present invention.
Figure 36A:
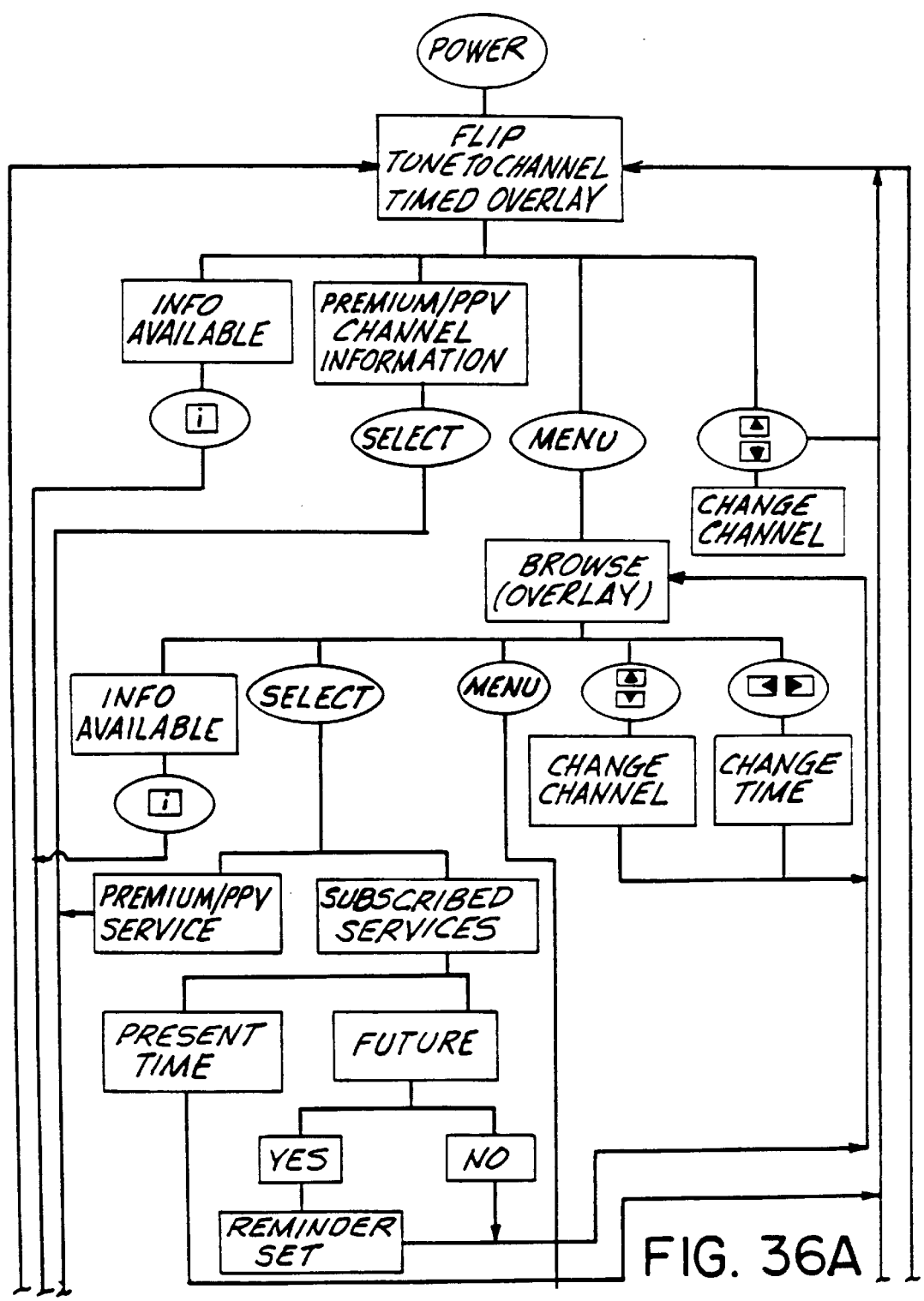
FIG. 36a–d is a flow chart showing the operation logic required for implementation of a computer program for the electronic program guide.
Figure 36B:
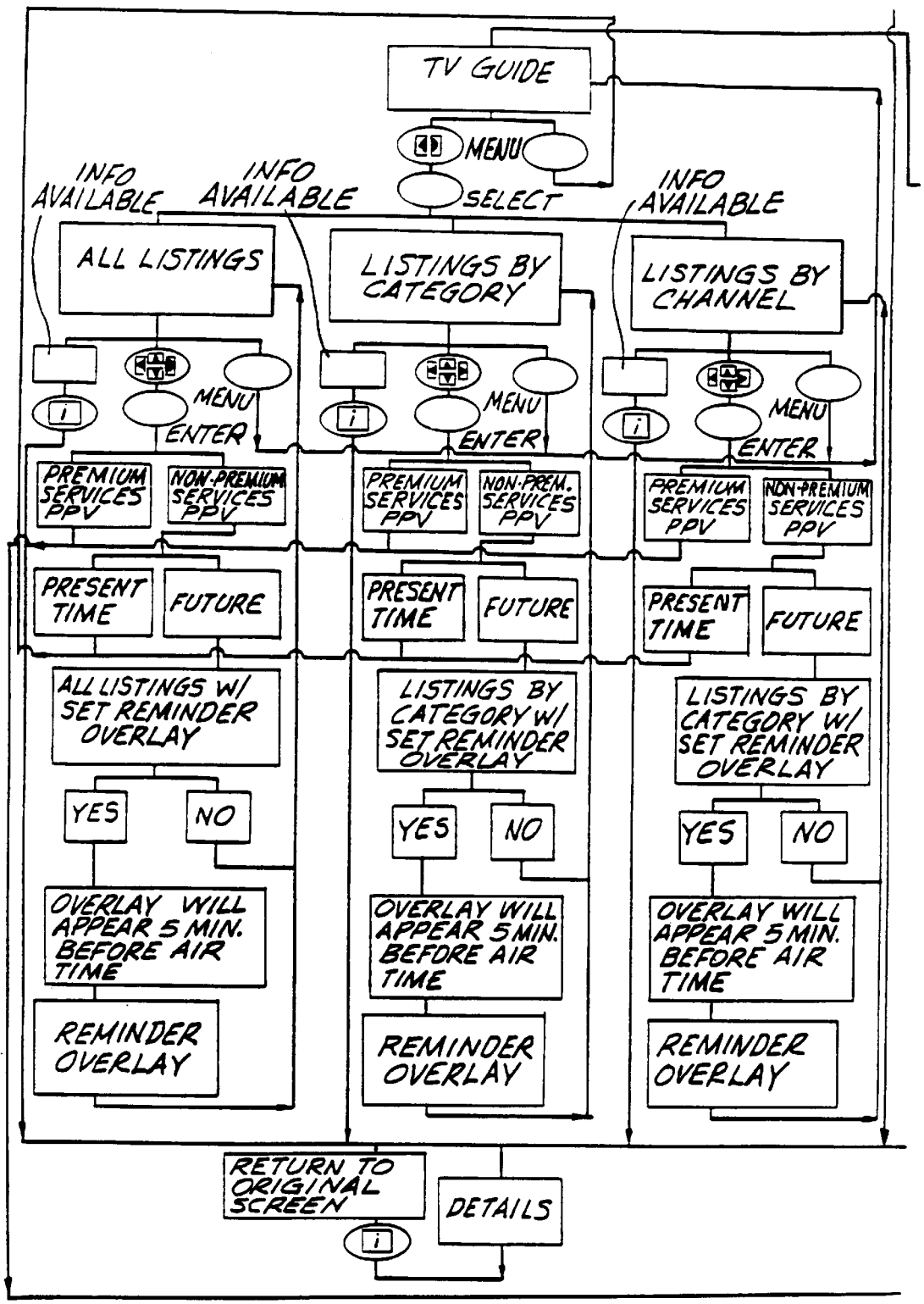
Figure 36C:
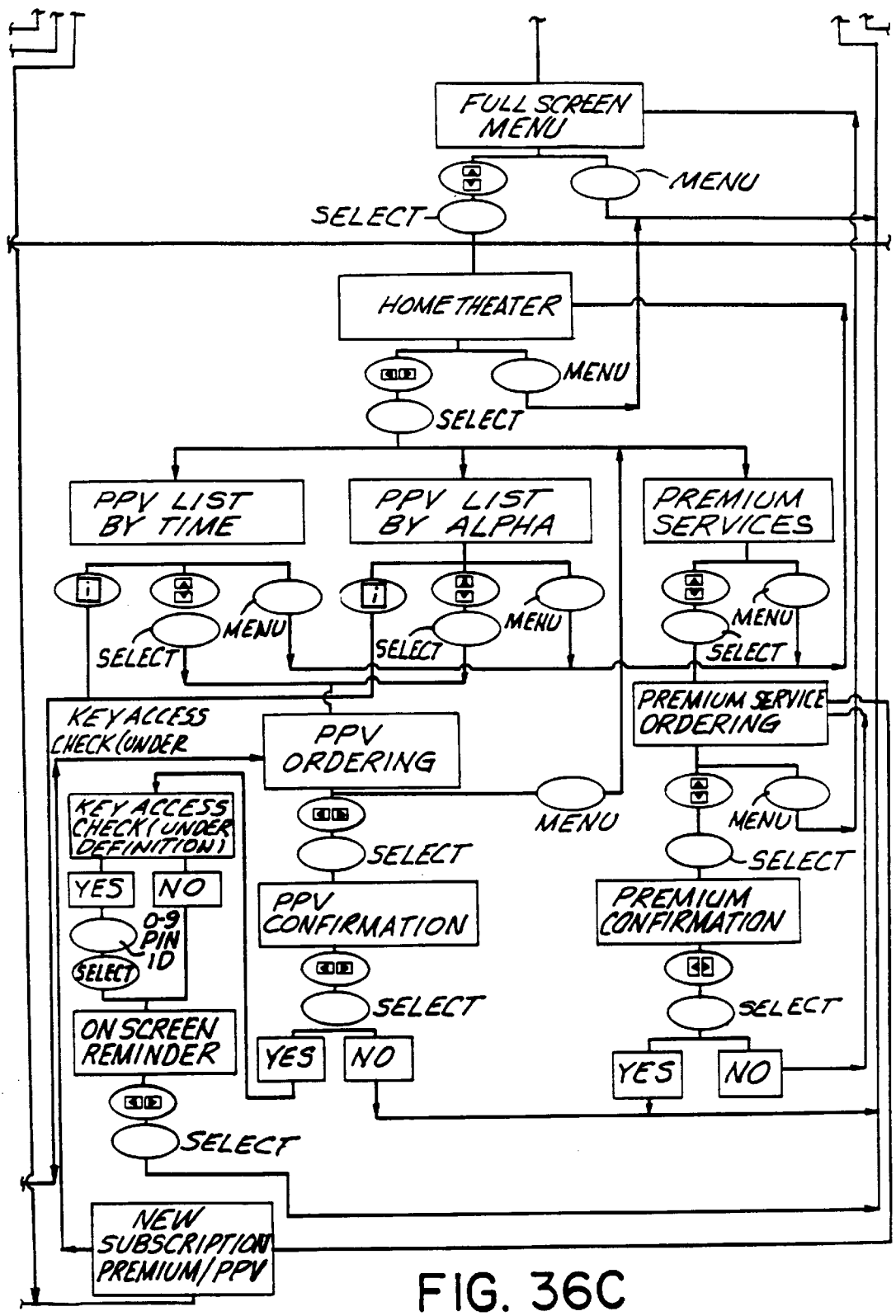
Figure 36D:
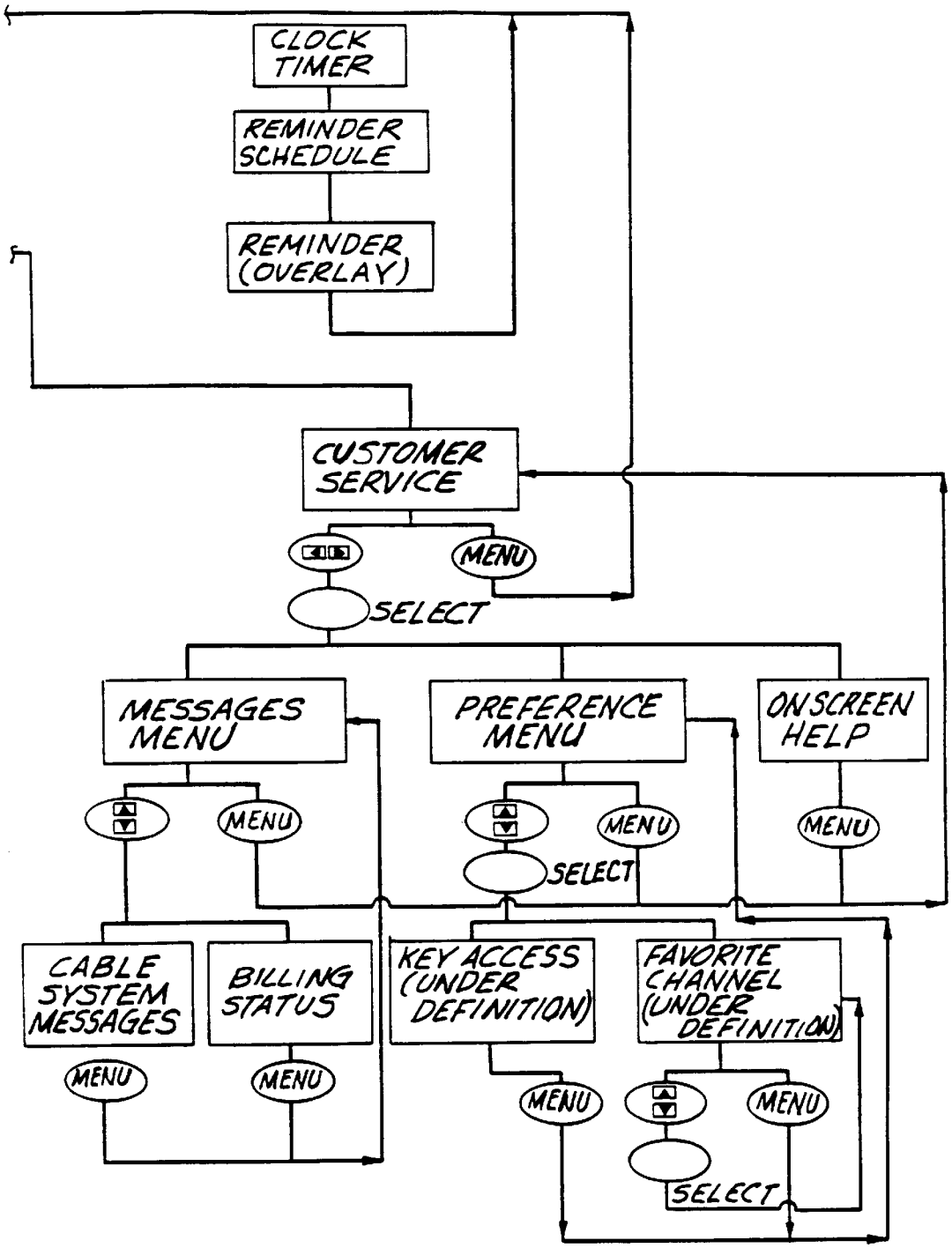

For example, if the user initially selects the "X*PRESS" icon appearing in the last horizontal bar, he is presented with a submenu such as that shown in FIG. 31. Using the direction arrow and enter keys on the remote controller, the user selects one of the three entries appearing in the display of FIG. 31. Once a particular entry is selected, the electronic program guide connects the user to the selected service and passes control to the particular service application software, as shown in FIGS. 32–35.

Alternatively, the remote controller 40 can be supplied with a plurality of content-specific keys corresponding to a plurality of content-specific categories of programming, e.g., a Sports key, News key, Movie key, etc. When the user depresses a content-specific key, a content-specific mode is initiated. In FIG. 4, the remote controller is equipped with a Sports key 49. If the user depresses the Sports key 49, the microcontroller will limit the display of programs and/or program schedule information to those that are sports-related. The microcontroller will block all other programming or schedule information from appearing on the television receiver. The microcontroller can be adapted to distinguish programs and schedule information that are sports-related by examining an appropriate code associated with the program or schedule information.

As discussed above, coding can be accomplished using any number of methods, such as by including an appropriate code in the vertical blanking interval of the program signal, or in an appropriate memory location in the database record of the program schedule information, or if the schedule information is being received on a broadband network, by including it in an appropriate blanking interval. The user activates a content-specific mode by depressing the appropriate content-specific key in any mode of operation of the electronic programming guide, including the aforedescribed FLIP, BROWSE or MAIN MENU modes, as well as when no schedule information is being displayed and only a program signal is visible on the television receiver. Once a content-specific mode is requested by the user, the microcontroller immediately and directly enables the content-specific programming criteria, and maintains it for all operating modes of the guide until disabled, which can be accomplished, for example, by toggling the Sports key 49.

Instead of a dedicated content-specific key, such as Sports key 49, the system may be configured with a single, generic content-specific key, which, when activated, would cause the microcontroller to display a content-specific menu containing a list of all content-specific categories available to the user. The user then could highlight a particular category by manipulating the selection cursor using the direction arrow keys on the remote controller and select it by depressing the ENTER or OK key 44. As an alternative to using a content-specific key on the remote controller, access to the content-specific menu can be effected by providing an appropriate identifier in another menu screen of the electronic guide, such as in the LOCATOR, SETUP or MAIN MENU screens.

In addition to blocking all non-selected content-specific programming when a particular content-specific category has been selected, the microcontroller can be programmed to enable all added-value programming or services that are specially related to the selected content-specific category. For example, if the user activates a Sports content-specific mode, the microcontroller, in addition to allowing only sports programming or schedule information related to sports programming to be displayed, will proactively seek out and enable all sports related added-value services, such as related trivia or video games, up-to-date scores while a game is in progress, team schedules, replays of prior games of the selected teams or players, ticket or souvenir purchasing, etc. Thus, the information available from the programming or service can be integrated into the environment of the electronic program guide. Rather than simply passing control to another service as described above, in this manner the electronic program guide would function as a system integrator or interface to combine the available added-value information into a package within the electronic guide environment, thus essentially creating a series of modular electronic program applications corresponding to a variety of available content-specific categories.

The Setup screen shown in FIG. 40 also includes a Text Location category 275, which contains the textual entries "Bottom of Screen" and "Top of Screen." By navigating to the Text Location category 275 using the up and down direction keys 43A on the remote controller 40, and to either the "Top" or "Bottom" entries in that category using the left and right direction keys 43B on the remote controller, and then depressing the enter or select key 44, the user can control the position of the overlay windows used to display information in various operating modes of the electronic program guide. The Setup screen of FIG. 40 provides the user with two positional choices: the top or bottom of the screen. Depending on the modes of operation of the program guide, it may be desirable to provide the user with more positional choices in viewing area of the television receiver, or to provide the user with the ability to choose a different position for information displayed different operating modes.

One of the novel features of the disclosed invention is the textfit system. The preferred embodiment of the text fit system includes an interactive computer program used to edit the program listings data before it is transmitted to the user and stored in memory. The interactive system operates as follows: unedited (or partially edited) program listings information is loaded into data a processor. The data includes program titles, program schedule times, duration, category, as well as additional descriptive information dependent on the type of program. For example, for movies the data includes the MPAA rating, year of the movie, whether it is in black and white, and a list of starring actors and actresses.

The data processor extracts only the program title data which includes television program titles as well as movie titles, sporting events and titles for other special events.

Based on the duration of the program, the data processor first analyzes the listings data to determine what grid size listings are needed for each title. Thus, a two hour movie could require four different edited titles to fit into each of the four different size grid cells (30, 60, 90, 120 minutes). The data processor then determines how much space is required to display the title based on its character length. If the title is to be displayed in the program schedule grid using a proportional font and character to character kerning, the data processor may also account for these factors in determining the space required to display a title. The determination would than be based on the number of pixels required for the particular combination of characters in the title. The amount of space available for display of a title depends on the size of the grid cell and the space required for display of icons, when activated.

If the data processor determines that a full title requires too much space to fit into one or more grid cells, the title is then presented to the editor using a suitable display device connected to the data processor, such as a CRT. The editor is then queried to alter the title so that it will fit in the allotted space. If the title must be edited for more than one cell size, the editor is queried to edit each of these separately. In the preferred embodiment of the interactive program, the editor is shown in real time whether the edited title will fit in the designated grid cell.

In the preferred embodiment, two lines of text are displayed in each grid cell of the program listings. The title, as edited, appears on the first line, and if necessary, continues onto the second line. The decision to wrap-around to the second line is based on whether natural breaks exist in the title such as spaces between words, commas, periods, hyphens, etc. These are standard techniques used in word processing software routines. The editor may also be queried to edit a title in the situation where the full title will fit on the allotted two lines, but a hyphen is required because there are no natural breaks in the title.

Prior to querying the editor to shorten a title, the data processor compares the title with a stored library of shortened titles to determine if the title had previously been shortened while editing another listings database. Each time changes are made by the editor to a title, the shortened title is added to the library. It is apparent that this process of building a library of shortened titles greatly reduces the manual input required.

Figure 42:
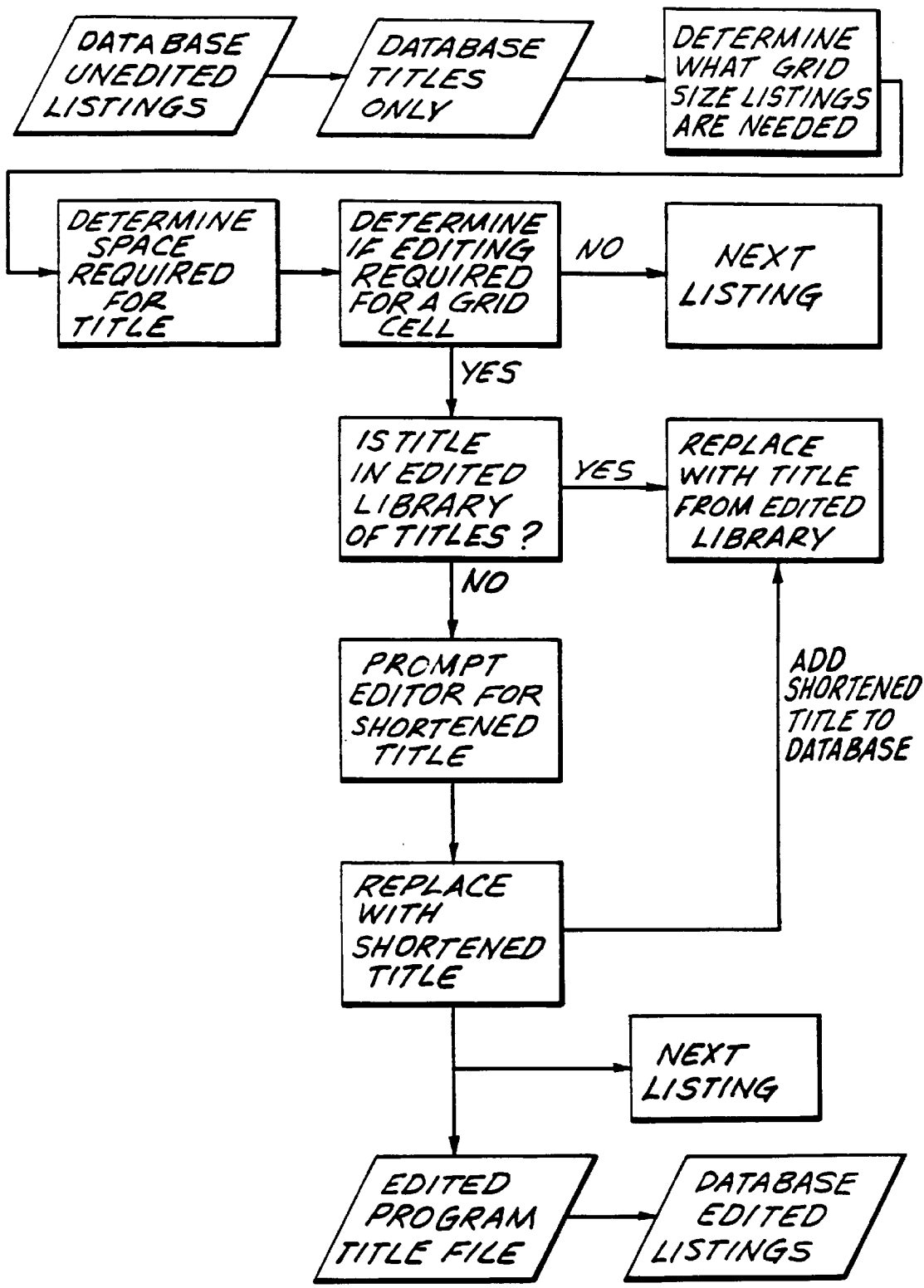
FIG. 42 is a flow chart showing the operation of the preferred embodiment of the textfit system of the invention herein.

A flow chart illustrating the process by which the text fit system operates is shown in FIG. 42. The chart illustrates the operation of editing a listing for display in a program grid for a single platform, but operation is the same for all platforms.

Text editing may be necessary in other situations besides that where multiple size grid cells are used for display of the same title. For example, the disclosed program guide may run on several different platforms, with each one having different constraints and grid cell space availability. Some may not display the text in proportional fonts and some may have other limitations reducing the available space. Thus, in the preferred embodiment the interactive program would request edits for all platforms for which they required at the same time. In addition, editing of text may be required for display modes other than a grid of program listings. For example, in the "Listings by Channel" display of FIG. 20, programs are listed on an entire, fixed-length line, but the length of the line may vary from platform to platform, so that the text fit system may be employed for the purpose of editing listings for the different platforms in this display mode as well. The space available for the display of text will also depend on how much space is reserved for icon display. The same process as that shown in FIG. 42 would apply, except that there would be no need to determine what grid sizes are needed because a fixed length line is used for display rather than multiple sized grid cells.

It will be apparent to those of skill in the art that the disclosed text fit system has applications beyond that of title editing alone. The system may be easily modified to provide editing of messages, "i" screen storylines, pay-per-view promotional copy, and similar text messages so that they will fit into the designated space available for display of the text. In fact, the system may be used to edit any text for display in the disclosed program schedule system.

The computer program for the microcontroller 16 may also include a schedule for the display of varying background views upon which the program schedule information is overlaid either partially or in a full screen display. The background views may be stored as bit maps in memory or in another storage medium, such as an optical storage device. For example, the microcontroller 16 may be programmed to issue a command to the VDG every morning at 6:00 AM to display a sunrise in the background. The background may then be changed accordingly throughout the day to, for example, a blue sky or a nighttime view. It also may vary, e.g., by time of day, day of week, month, year or season. The mood background also could change depending on the particular category of programming that the user is watching or to which selected schedule information pertains. The mood background also may be adapted to display scenes that reflect the particular viewing area in which the user is situated, like the Rocky Mountains, or Mt. Rainier, etc. It also may be possible to display standard scenes, such as an ocean or forest scene. Moreover, the audio background also could be adjusted to relate to the particular mood background then being displayed. In addition, different background views may be used for holidays and special events, such as Christmas, Fourth of July, Superbowl Sunday, etc. The purpose of the background views is to help ease the monotony of viewing program listings. The microcontroller 16 could be adapted automatically to coordinate the display of the mood background. The user also could be given the ability to choose from among various mood background displays by adapting the microcontroller to display an appropriate mood option menu that lists the mood background options available to the user and allows the user to select one or more by manipulating the selection cursor. Access to such a mood option menu could be achieved by supplying an appropriate identifier, textual or visual, in an appropriate menu of the system, such as the LOCATOR or SETUP screen.

Additionally, the electronic program guide could be configured to store a unique digital identifier for each program along with its schedule information and later use the identifier—e.g., by transmitting it—to indicate to a recording or storage device, such as a video recorder, that the user wishes to record the program. The program guide could also use the identifier to automatically control operation of the video recorder. The electronic program guide could also be configured to use other stored schedule information for this purpose.

Operation of the interactive home shopping feature of the present invention may be explained with reference to FIG. 43. FIG. 43*a* illustrates a "by time" screen of the EPG listing the different programs scheduled to air at a particular time on the different channels. As shown in FIG. 43*a*, certain listings are provided with an asterisk or "star" icon 401 indicating that a product or service associated with each of the listings is available and may be ordered remotely by the user. The remote control unit 40 discussed above may be further configured with a star button used to order products and services. Alternatively, the existing star key on the keypad 42 may be used. The particular icon used to designate that the indicated listing has an associated product or service available for purchase is not part of the invention—any convenient symbol may be used.

Figure 43A:
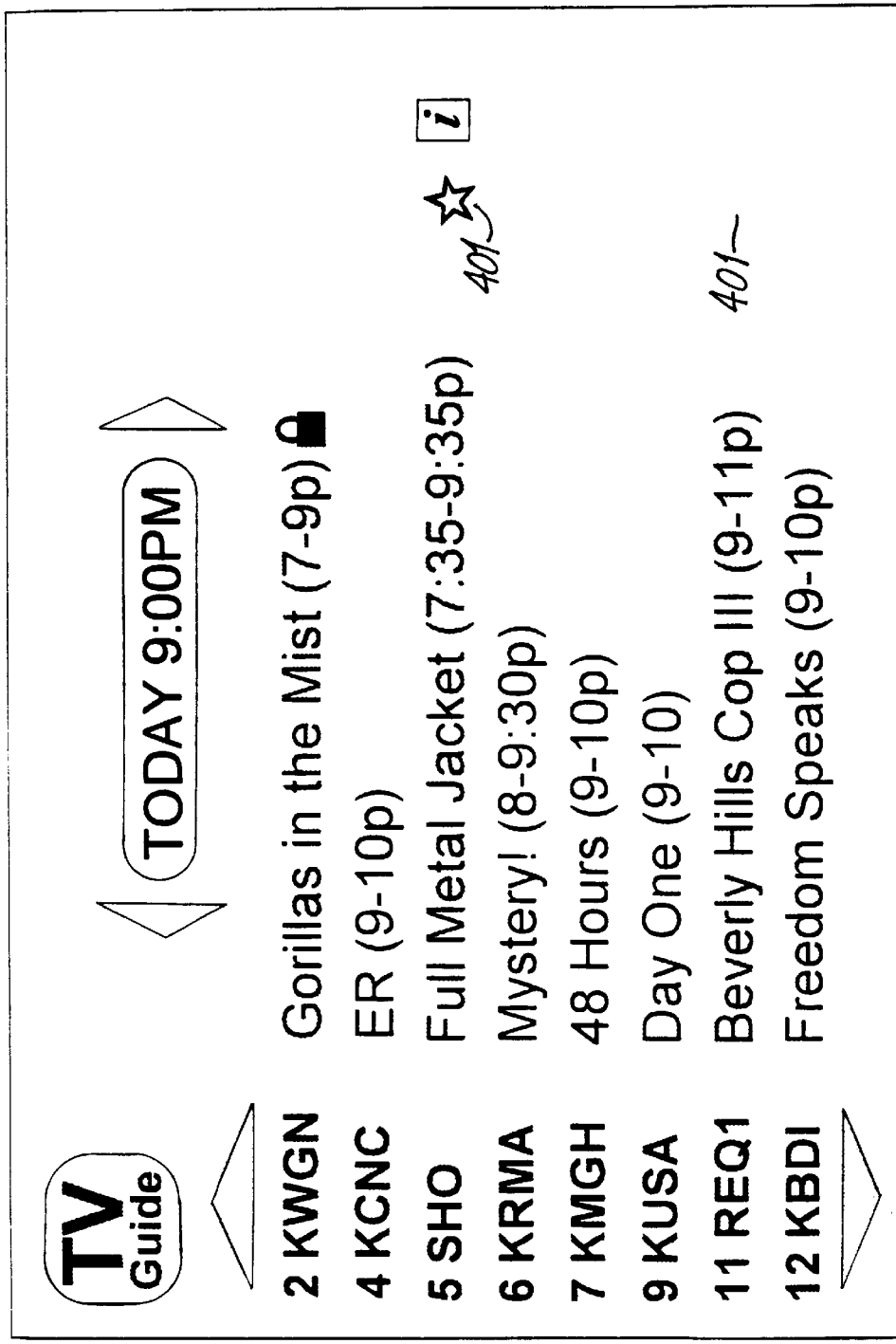
Figures 43D, 43E:
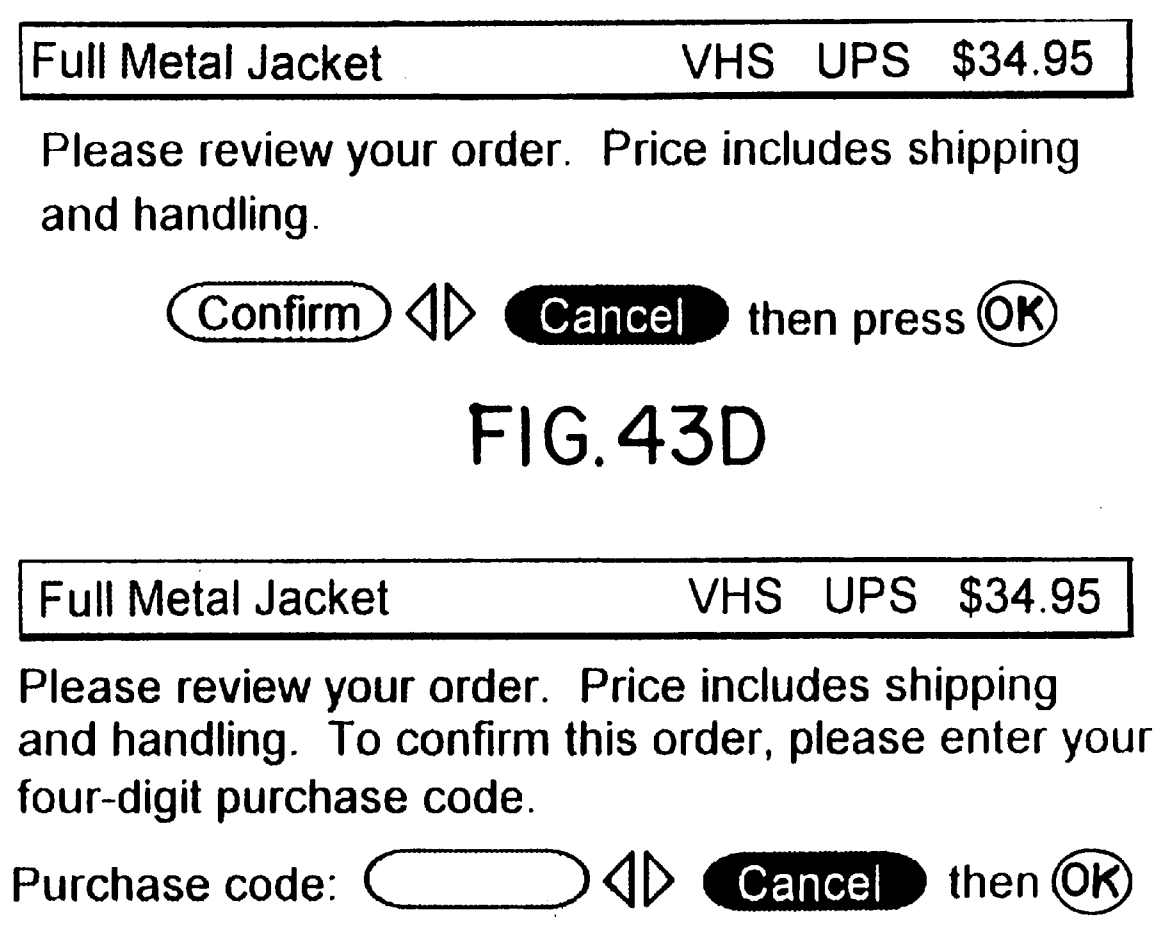

The screen shown in FIG. 43*a* indicates that two listings, "Full Metal Jacket," and "Beverly Hills Cop III," include associated products or services. Upon depressing the star button on the remote control while the cursor is highlighting the program listing for "Full Metal Jacket," the format selection screen shown in FIG. 43*b* is displayed. This screen informs the user of the particular product or service available and the various options and/or formats available, as well as the price of the different options and formats. As shown in FIG. 43*b*, the left and right arrow buttons 43B on the remote control unit 40 are used to scroll throughout the different formats. As the user scrolls, the price displayed automatically changes to reflect the price for the currently selected format. Upon selection of the particular product format (by depressing the "OK" or enter key 44 on the remote control unit 40), i.e., a VHS format cassette, the user is presented with the screen shown in FIG. 43*c* to select the payment method and method of shipment. The user may scroll through the different payment methods which may include various credit cards as well as the option to add the purchase price to the user's bill for program services. At the bottom of the screen, the user enters his credit card number and expiration date. The user may also scroll through various methods of shipment, and the total price changes accordingly based on the different shipment methods. Upon selection of the payment and shipment methods, the user is presented with the screen in FIG. 43*d* to review and confirm the order. A purchase code may be used to prevent unauthorized persons from ordering products or services as shown in FIG. 43*e*. The purchase code may be selected in advance in the same manner as program lockout code discussed above.

The screen in FIG. 43*d* may be used where the user has previously entered his address and phone number. The user may have previously entered this information in advance using a set-up screen to input all the necessary information upon first use of the product ordering service. The setup information may also include one or more credit card numbers so that when a product is ordered, the user need only select a credit card from a list previously entered. Alternatively, the user's address and phone number may be extracted from the program services billing system.

Figure 44:
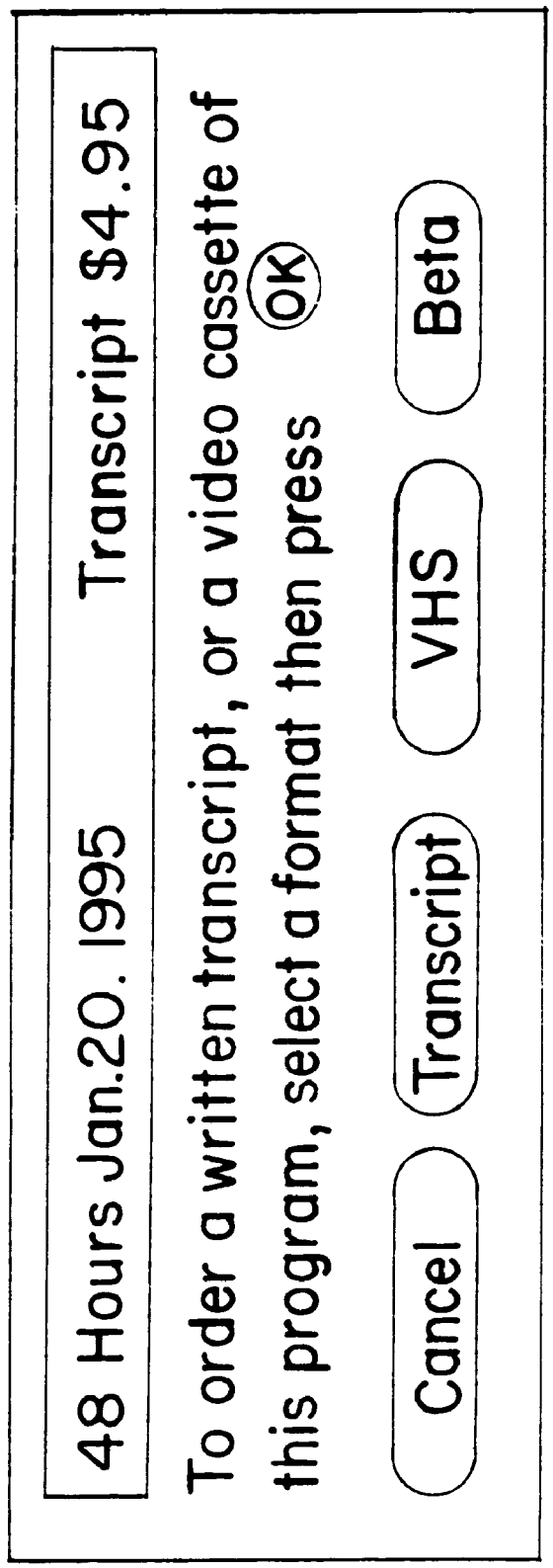
FIG. 44 illustrates one embodiment of a screen that may be presented to the user upon user activation of the ordering process while the cursor is highlighting a program listing for which a product or service is available.

The star icon may also be used to indicate that more than one product or service associated with the television program is available. FIG. 44 illustrates one embodiment of a screen that may be presented to the user upon depressing the star button while the cursor is highlighting the program "48 Hours." As shown in FIG. 44, both a transcript and tape (VHS or Beta format) are available. Using the arrow buttons 43B on the remote control unit 40, the user highlights the desired product and depresses the "OK" button to order the product.

Figure 45:
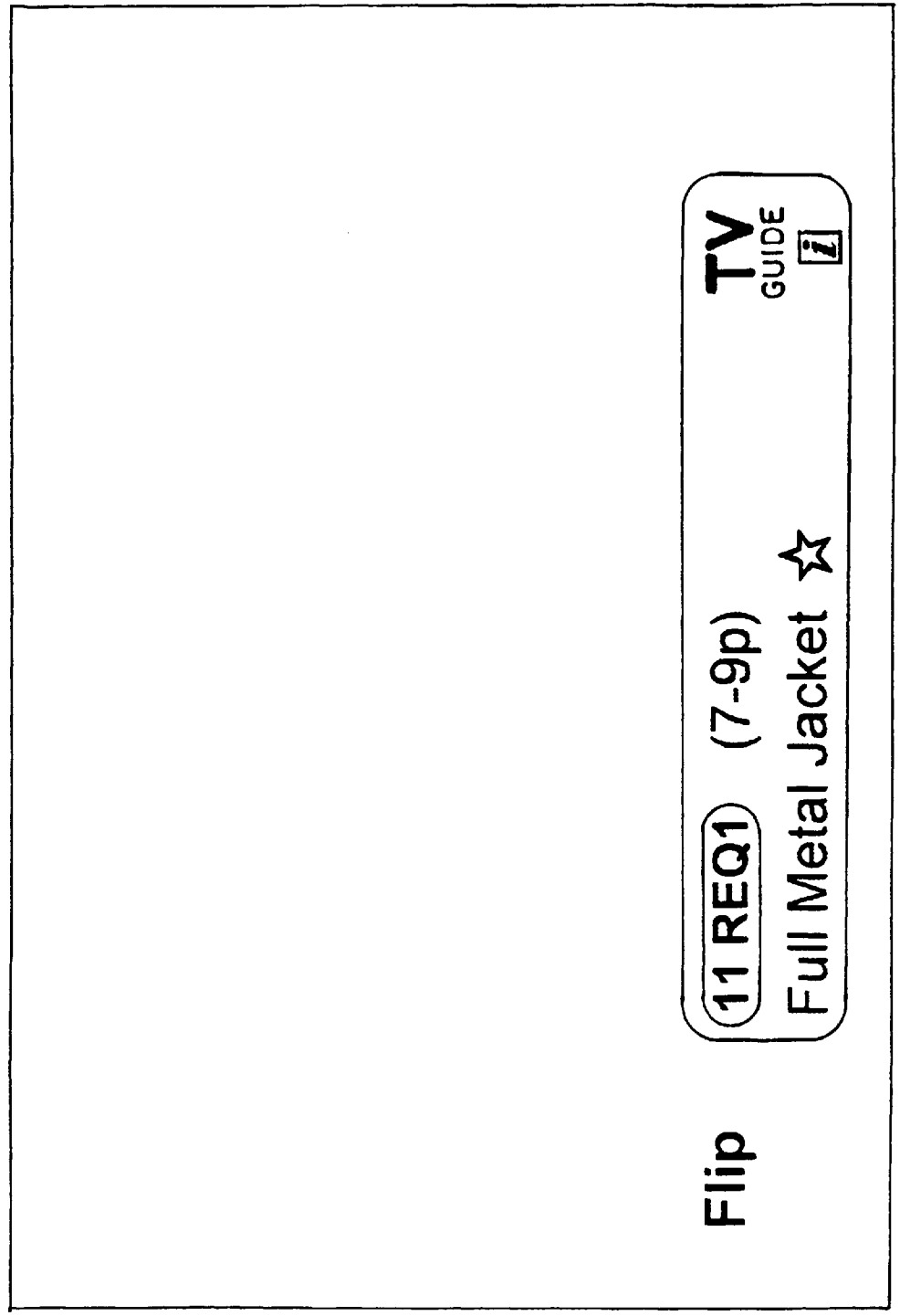
FIG. 45 illustrates the product or service ordering feature in conjunction with the flip mode of the system of the present invention.

Products and services may be ordered from any of the different modes of the EPG by including the star icon in the program schedule display in each of the different modes of the system. FIG. 45 illustrates use of the star icon in connection with the flip mode of the system discussed above.

There are many potential applications for this type of product ordering service. In addition to ordering a video-cassette or transcript of a program, various ancillary products may similarly be ordered, such as tee shirts and other apparel, books, movie soundtracks, toys, etc. The disclosed product ordering system is especially useful in conjunction with programs that are copy-protected, such as PPV movies. These programs cannot be recorded using a VCR so that the disclosed product ordering service presents a powerful marketing tool and permits users to order their own, professionally produced, licensed copy of, e.g., a PPV movie simply by depressing a button on their remote control device. One example of a service that can be provided is the ordering of tickets for television programs with live audiences. Program listings for such programs as game shows and talk shows could utilize the star icon to order audience or participant tickets for the show. The star icon may also be used with the program listings for local sporting events to order tickets for the listed event as well as future events.

The use of the disclosed product and service ordering capability need not be limited to television programs. For example, if the cable system operator or other program provider provides music as well as television channels, products and services associated with music programs may also be ordered through the guide. FIG. 46 illustrates one embodiment of a screen that may be used for ordering a product or service associated with a music program. Products that may be ordered include a CD or cassette tape of the song or album. The ordering service may also be used to order tickets to an upcoming concert of the artist that performs the selected music program.

The use of the EPG thus presents a new vehicle for marketing program-related products and services capable of reaching a very large audience, including those who would not normally tune to existing home shopping channels.

Product and service ordering may be readily implemented in the EPG of the present invention. The different display screens that comprise the EPG are controlled by the microcontroller 16, which accesses the program listings data for each of the programs. If the data indicates that a product or service associated with a particular program is available, the microcontroller 16 will display the star icon whenever the particular program listing is displayed in the different modes of the EPG. The microcontroller 16 also controls the display of user-selected options in the EPG so that when a particular listing is highlighted by the user, the microcontroller 16 displays appropriate ordering information when the user depresses the star key on the remote control unit 40 so that correct product or service information is displayed.

The ordering of services is discussed above in connection with FIG. 9 regarding the ordering of premium services and pay-per-view events. Products may be ordered in a similar manner using either a telephone line, coaxial cable, optical fiber, or wireless transmission as the return path for placing user orders. There are many techniques known in the art that may be used for providing information on products and services ordered by a subscriber to a cable television service at a remote location for processing at a central location. For example, the same techniques used for billing subscribers for pay-per-view events may be applied to product ordering as well. In one embodiment, the microcontroller 16 stores subscriber orders in memory for subsequent transmission using the subscriber's telephone lines. The microcontroller 16 is programmed to dial the central ordering location to place subscriber orders. Typically, a toll free "800" number is utilized for this purpose and calls are placed at times when the subscriber is not likely to be using the telephone. The microcontroller 16 may be programmed so that orders are accumulated throughout the day and a call is placed once per day to transmit all the accumulated orders.

Another possible technique for placing orders is to use the cable itself. This technique may be used in both one-way and two-way cable plants. In a one-way cable plant system, orders may be stored at the user location in a set-top box provided by a local cable system. The set-top box may then be polled by the cable head-end using techniques known in the art to determine if any orders are stored for transmission to the cable head-end. If orders are present, they are provided to the cable head-end for processing.

A two-way cable plant is most advantageous if real-time ordering capability is desired. Using the return channel, orders may be placed and immediately transmitted upstream to the cable head-end where they can be processed or forwarded to a separate processing center. In this manner, orders may readily be processed the same day and shipped to the user via overnight courier.

Another possible technique is to control the call-in of orders from subscribers from the central location. For example, the cable head-end could poll the subscribers and program the set-top boxes to call the central location at a particular time so as to stagger the call-in times and avoid overloading the processing center. Finally, it is also possible for the cable head-end to connect to each user's set top box via telephone lines and call-out to each viewer sequentially to determine if any orders are pending.

It is also possible to maintain the product ordering feature entirely separate from the cable system or other program provider operations. The entity providing the EPG may maintain its own processing equipment at the cable system head-end or other program provider location so as to receive order requests directly from users without the need for any pre-processing by the cable head-end. User requests identified as product orders may then be diverted directly to the EPG provider's processing equipment. This type of system architecture allows for more centralized management of a nationwide product ordering system.

The information on each of the products and services available may be provided to the users in any of a number of ways. In one embodiment, the database of program schedule information stored at each user location may include all the information for each product and service—a description of the product(s) or service(s), price, and any other information required. The disadvantage of this method, however, is that if a large number of programs include products and services available for ordering, the demands on the system memory are great. Another method is to standardize the products and services available so as to include in the database only a minimal amount of information necessary to identify the type of product or service. For example, if only videocassettes and transcripts are available, the database need only include a flag for each listing indicating whether a videocassette, transcript, or both are available. Further simplification is possible if all transcripts and all videocassettes are priced the same. The screens illustrated in FIGS. 43–46 may then be standardized screens for all products so as to conserve memory space.

It will be recognized by those of ordinary skill in the art that many variations are possible. To provide more flexibility, different categories of products and services may be established for different types of programs, such as movies, news programs, sports, pay-per-view, etc. The microcontroller 16 may then be configured to select the product or service information displayed to the user based on the type of program. In this manner, when the user depresses the product ordering icon on the remote control, the microcontroller 16 determines the type of program displayed in the program guide and selects the appropriate ordering screens for display. Similarly, with regard to price, different categories of prices may be set. The microcontroller 16 may then read the price category for the product from the database and display the appropriate price for the product in the screens 43–46.

An alternate embodiment of the disclosed product ordering system may be implemented as follows. Rather than indicating the availability of a product or service only in association with the program listings stored at the user location, product availability may be indicated when the user is not in one of the program schedule display modes by overlaying the star icon on a program display signal if there is a product or service associated with that program. In this manner, products and services associated with programs not included in the program schedule information database stored in DRAM 18 may also be made available to users. This embodiment is especially useful in connection with commercial advertisements and permits the user to place an order for the product or service being advertised using the remote control device 40. Alternatively, the user may simply request to be placed on a mailing list to receive additional information about the product or service being advertised as well as other related products and services.

This alternate embodiment (which may be used in conjunction with the above-described embodiment) may be implemented as follows. The received program signal for the commercial or other program may include the information about the product or service associated with the program. The information may be included in the vertical blanking interval (VBI) of a standard analog television signal, a technique well known to those of ordinary skill in the art. Similarly, the information may be included in an in-band digital channel for programs delivered in digital form. One advantage of including the information in the VBI or an in-band digital channel is that it eliminates the need to consume memory space at the user location to store product and service information.

Figure 47:
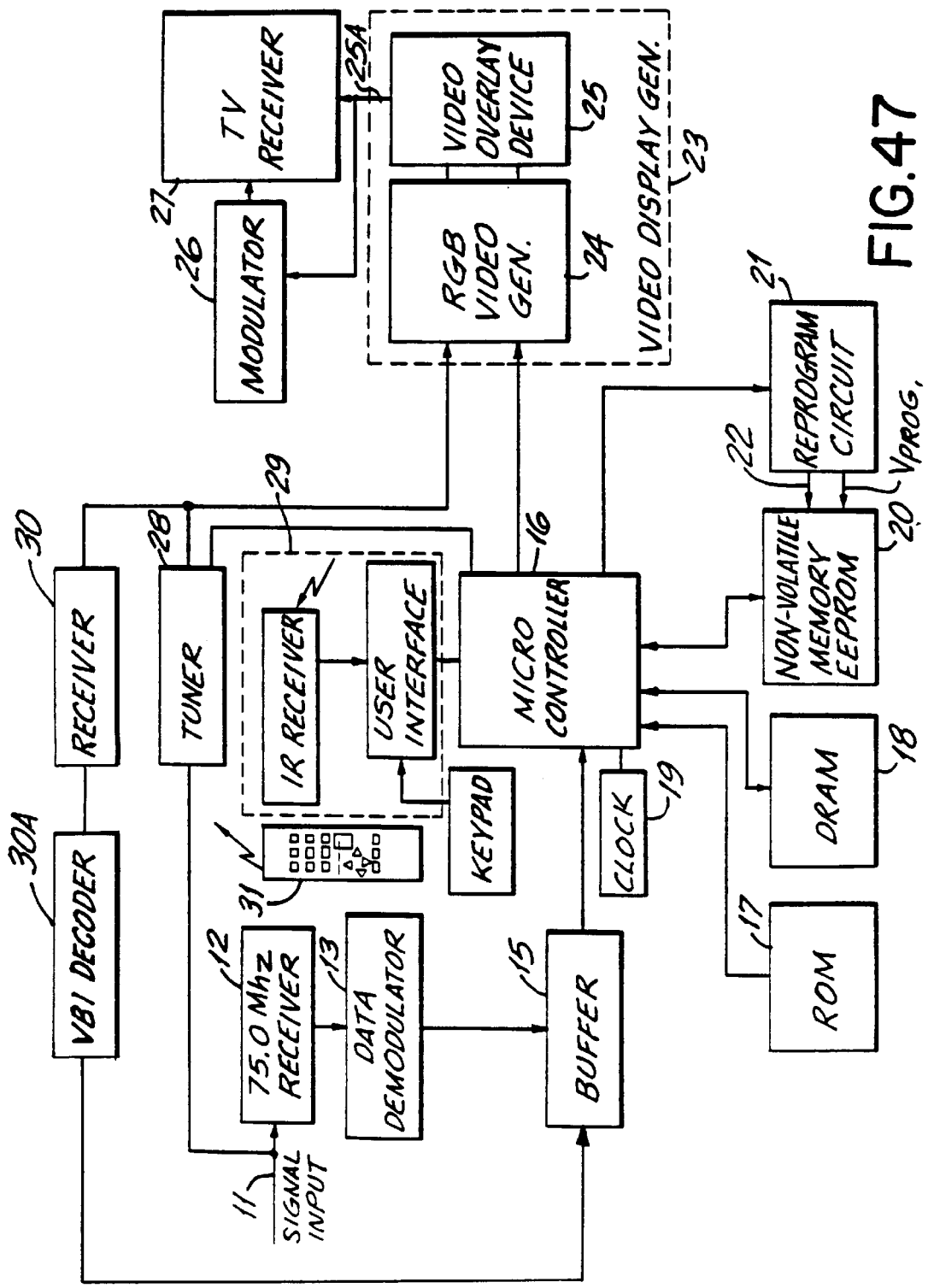
FIG. 47 is a block diagram of an alternate embodiment of the system of the present invention.

The modified system illustrated in the block diagram of FIG. 47 is one embodiment of a system that incorporates a product ordering system using the VBI into the program schedule system of the present invention. In this modified system, a second receiver 30 is used to receive the television channel signal tuned by tuner 28 under control of microcontroller 16. The signal is then provided to a VBI decoder 30A which decodes the data contained in the VBI of the received television signal. This data is then provided to buffer 15 and microcontroller 16 in the manner described above for the program schedule information. The microcontroller 16 then determines whether the currently-tuned channel is displaying a program for which a product or service is available as indicated by the data in the VBI. If there is a product or service available, microcontroller 16 causes the product availability icon to be overlaid on the television signal. In a preferred embodiment, the currently-tuned television signal comprises a commercial advertisement and the product or service available is associated with the commercial. Either a one-step or multi-step ordering process may be utilized. For example, in the simplest embodiment, only a single product, i.e., a product brochure, may be available. In this case, the microcontroller 16 may be configured to cause the video overlay device 25 to display a standard on-screen message such as "Press * to receive a brochure describing this product." This embodiment assumes that the user has previously provided his name and address or that the information is extracted from the program services billing system as discussed above. Alternatively, a multi-step process similar to that described above may be implemented. Upon depressing the ordering icon key, the microcontroller 16 may extract additional information from the VBI describing the product or service and cause the video overlay device 25 to display it on the receiver. The microcontroller may then present a series of screens to the user similar to those shown in FIG. 43 to obtain the information required from the user. In this case, however, the information for composing the screens is obtained from the program signal rather than the stored program schedule information. It is also possible to store the screen formats as bit maps in memory and use the information from the VBI to complete the information in the screens.

If the user chooses to order the product or service, the microcontroller receives the request and may process it as follows. In the simplest embodiment, the microcontroller may simply time and channel stamp the request. By providing the time of the request and the channel tuned by the user at the time of the request, the system operator may determine the commercial or other program the viewer was watching at the time the product or service was ordered and thus provide the correct product or service to the user. Alternatively, in a more sophisticated system, the microcontroller 16 may extract from the VBI or in-band digital channel product identification information and include the information with the user's request to identify the product or service ordered. The user's request may then be provided to the cable head-end and processed in any of the manners described above in connection with products and services associated with a program listing.

Operation of the on-demand information access feature of the EPG may be described with reference to FIGS. 48–58. These figures illustrate how data feeds may be used in an embodiment of the sports category mode of the present invention. The addition of data feeds to the EPG of the present invention greatly increases the value of the television as an information source because it permits users to obtain on-demand access to selected categories of updated information. The data feed information may also be combined with program schedule information, television program signals, and remote product ordering capability to provide a multimedia informational and merchandising system. The use of data feeds, e.g., data received in the VBI of a television program signal, in conjunction with the remote product ordering feature has already been discussed above. The description that follows provides another particularly useful application of data feeds—sports information—and particularly updated information on the status of sporting events in progress.

The sports mode described in the following paragraphs differs from that previously described which provides information only on sports related television programs from the database of program schedule information stored in DRAM 18. In contrast, the improved sports mode described in the following paragraphs provides access to sports related program schedule information, updated game scores, detailed team-specific and other sports information, and interactive services such as the purchase of sports merchandise and access to sports video games. Rather than providing the user with unwanted program schedule information on programs not of interest, the user is instead provided with a content specific user interface that provides access not just to television programs but also to other services within the same content category.

For example, rather than providing a menu that presents only program schedule information on sports programs, a menu may be provided to users consisting of the following: a list of the channels dedicated to sports programming and the current and upcoming programs on these channels, a list of current and upcoming sports programs on other channels, virtual channels for access to data feed information on specific sports, teams, scores, late-breaking sports headlines, etc., virtual channels for access to interactive games, and a home shopping service for access to sports related merchandise. As discussed below, vast amounts of information are available on any given topic. Much of the information is not suited for distribution in the form of a television program due to the expense of producing television programs and the limited interest in such information. Through the use of virtual channels, however, content not of interest to the viewer (i.e., non-sports television programming) may be replaced with virtual channels for detailed information on e.g., each professional sports team and other content provided by different services. By aggregating content on a subject basis rather than a service basis, the utility of the television as an information terminal may be greatly enhanced. The present invention relates to an improved EPG that provides viewers access to these additional, non-program services in the same manner as television program services in order to facilitate navigation through the additional content. The following discussion illustrates one embodiment of an improved EPG of the present invention that provides subject-based aggregation of content. Sports information is used as an example, but content-based aggregation may be used for any category of television programs and other types of information provided.

Figure 48:
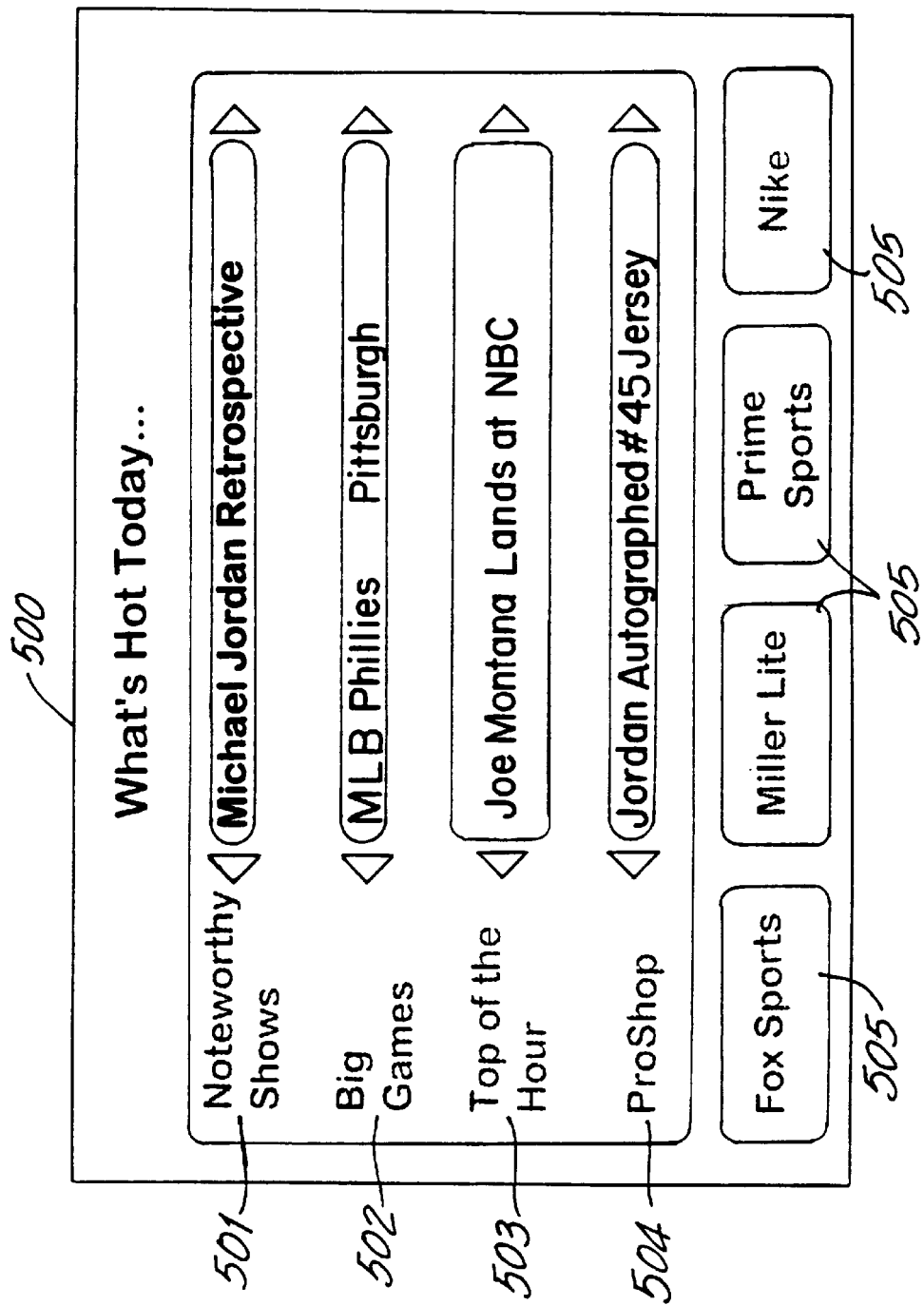
FIG. 48 illustrates one embodiment of a menu screen in the sports mode of the present invention.

FIG. 48 illustrates a "What's Hot Today.." screen 500 of one embodiment of the improved sports category mode. The screen provides the user with easy access to several different sources of sports related information. Line 501 displays program schedule information for sports related programs. Line 502 displays information on important games and line 503 displays information on news items of particular interest. Finally, line 504 is used for displaying information on products available for remote ordering. For each of the lines 501–504, the user can view additional information by depressing the left and right arrow keys 43B of the remote control unit 40 as indicated by the left and right arrows on either end of each line. The information for lines 501 and 504 is obtained from locally stored program schedule and product information while the information for lines 502 and 503 (and optionally 504) are obtained from data feeds received at the user location as discussed in greater detail below. In this manner, up-to-date information may be immediately presented to the user. For example, if the Phillies v. Pirates game were in progress or concluded, the line may additionally include the current score and inning. The boxes 505 at the bottom of screen 500 indicate that promotional information concerning each of the identified companies or products is available through the EPG. Using the up/down and left/right arrow keys 43A and 43B, the user may navigate to each box and access the information.

Screen 500 may be used as the default screen upon entering the sports mode of the EPG of the present invention. The default screen may be configured by selecting information according to user preferences. For example, the user may be requested to set his preferences for different sports and different teams by assigning numerical rankings for, e.g., professional baseball, professional football, professional hockey, professional basketball, college football, and college basketball. Each of the lines for the default screen 500 may then be selected by comparing the relative user rankings of the different information available for display in each display line. For example, the Phillies v. Pirates game displayed in line 502 may have been chosen because the user designated professional baseball as his favorite sport and the Phillies as his favorite team. It will be recognized by those of ordinary skill in the art that a screen such as that illustrated in FIG. 48 may be configured according to user preferences by implementing any of a number of techniques known in the art such as the use of software agents to intelligently extract information of interest to the user. One way to configure a default or "home page" screen is to keep track of the channels viewed and other services accessed through virtual channels and to provide more content for those channels and services more frequently accessed. In this manner, each viewer is provided with more information tailored to his/her particular preferences rather than presenting each viewer with the same screen.

Figure 49:
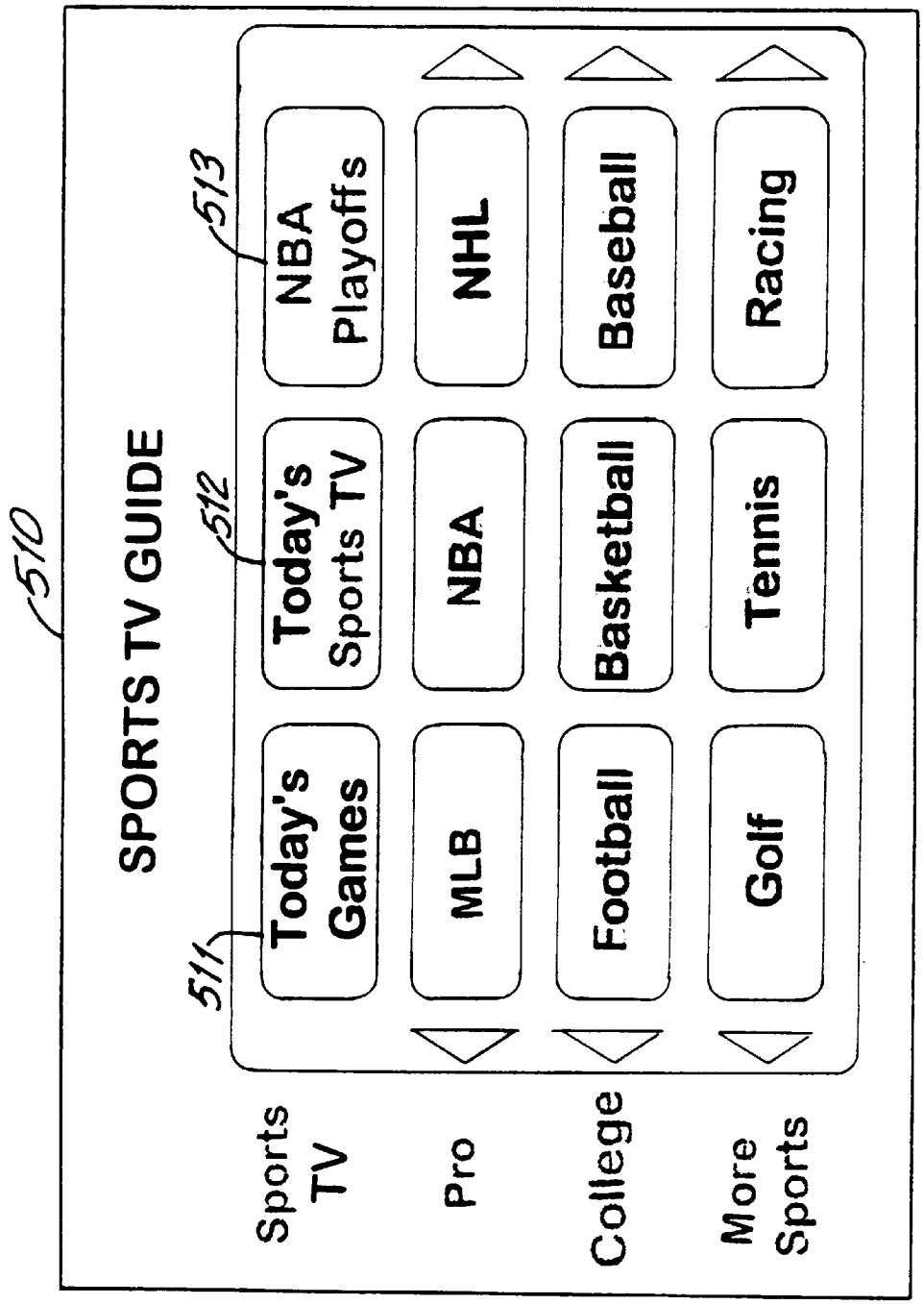
FIG. 49 illustrates a second embodiment of a menu screen in the sports mode of the present invention.

FIG. 49 illustrates an alternate embodiment of a Sports mode screen 510 which may also be used as the default screen when the sports mode is entered. Screen 510 also provides easy access to both locally stored program schedule information and information from a received data feed. The "Today's Games" feature 511 provides access to screen 520 in FIG. 50 which lists all the games for various sports, the channel on which the game may be viewed, if it is televised, the current score and time remaining if the game is in progress, or the scheduled time if the game has not yet begun. In addition, the "i" icon is used to indicate additional information concerning the particular game is available, such as score by quarters (for a basketball or football game), score by inning (for a baseball game), high scorers, etc.

By combining stored program schedule information with information obtained from a data feed to compose screen 520, information on games not being televised and games that were televised but have ended may be presented in addition to the televised games still in progress. For example, the Pistons at Hornets game shown in FIG. 50 is not televised because there is no channel indicated. If the system were able to access only locally stored program schedule information from DRAM 18, the game would not appear in screen 520. However, because the system is also accessing a received data feed, the game is listed together with an updated score. Similarly, the Knicks at Pacers game shown in screen 520 may or may not have been televised, but because it is concluded, no channel is indicated. By accessing the data feed, the system is able to display the final score. In addition, for televised games, such as the Nets at Hawks and Bulls at Celtics as shown in screen 520, game status information not available in the program guide data may similarly be obtained from a data feed and displayed. In the screen 520 of FIG. 50, the information is sorted by sport and time, but may readily be sorted by other criteria, such as user selected criteria.

Figure 51:
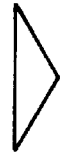
FIG. 51 illustrates an exemplary screen of the sports mode of the present invention.

The "Today's Sports TV" feature 512 shown in FIG. 49 provides access to screen 530 in FIG. 51 which lists the televised sports programs for the day in chronological order. The program listed at line 531, "Michael Jordan Retrospective," includes the star icon to indicate that a videocassette of the program may be purchased by the user. The "NBA Playoffs" feature 513 of screen 510 provides convenient access to information for all of the day's NBA playoff games. The particular configuration of the Sports TV Guide screen 510 may be changed according to the editorial discretion of the EPG provider. For example, rather than including the NBA Playoffs feature 513 in the fall, this feature could be replaced with MLB Playoffs to provide access to information on baseball playoff games. Similarly, the "Big Games" line 502 may be changed on a daily or weekly basis to highlight an upcoming game or sports event of particular significance, such as the Superbowl, Olympics, a big fight, etc.

In the improved sports mode of the EPG of the present invention, the flip feature discussed above is automatically configured to display information for sports programs only when the up/down arrow keys 43A are depressed. Channels not presently broadcasting a sports program are automatically skipped. The same is true when using the browse feature—channels and time slots not scheduled to broadcast a sports program are automatically skipped as the user scans through the program schedule information for programs other than the one currently being displayed.

Figure 52:
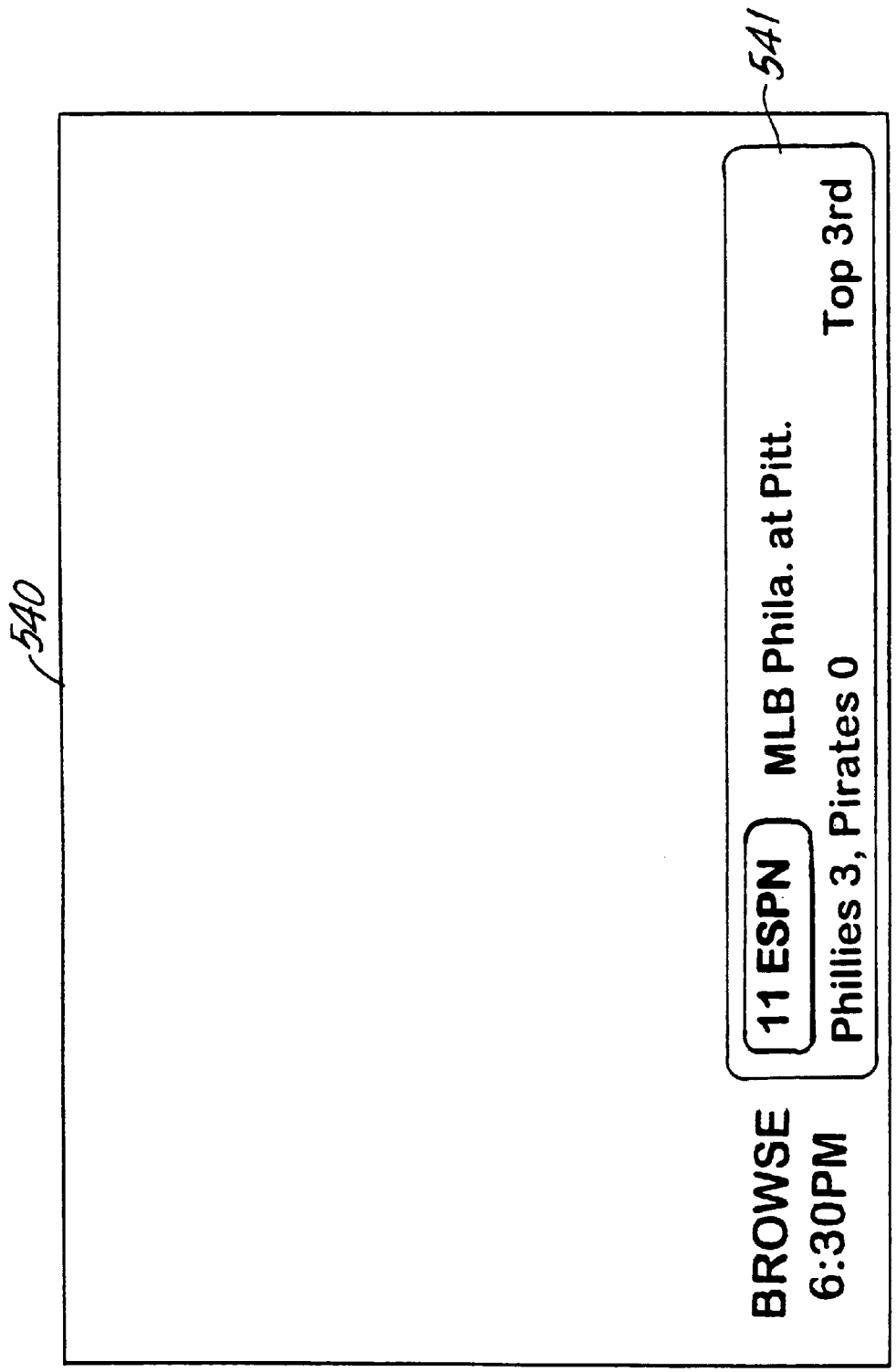
FIG. 52 illustrates a browse screen combining information from stored program schedule data with information obtained from a received data feed.
Figure 53:
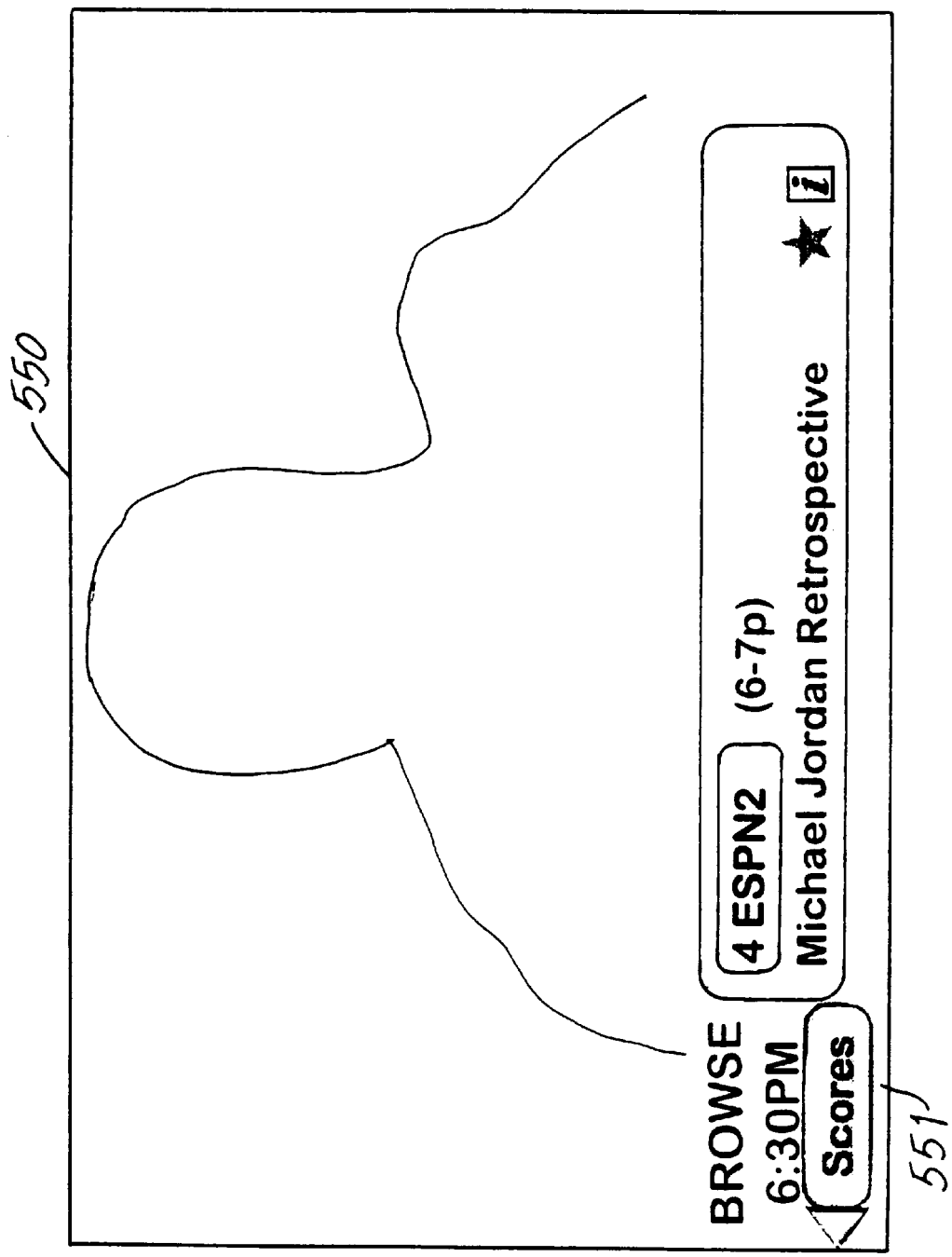
FIG. 53 illustrates one embodiment of a screen for accessing additional information from a received data feed.

The access to information contained in data feeds is a novel feature of the EPG of the present invention that greatly enhances its utility. An additional example of how such data feed information may be used is shown in FIG. 52. Screen 540 of FIG. 52 illustrates an embodiment of the browse mode of the EPG. The browse information 541 at the bottom of the screen includes information identifying the program and channel, as described above. In this case, the program is a baseball game and by accessing information in a received data feed, the microcontroller 16 may be programmed to cause the VDG 23 to also display the current score and inning of the game (or time remaining if a football, basketball, or hockey game). In this manner, users may not only browse through program listings but also the scores of games in progress. The "i" icon may be used to indicate that additional information about the game may be displayed, such as quarter summary, half-time statistics, leading scorers, key injuries, etc.

It may be the case that there are games in progress that are not being carried by the user's cable operator or other program distributer and thus not televised at the user location. In addition, it is also desirable to provide information on televised and non-televised games that are concluded and thus no longer being broadcast. FIG. 550 illustrates one embodiment of a screen that may be used to provide access to scores of these non-televised and concluded games. The "Scores" feature 551 indicates that information on these games is available by depressing the left arrow key. The user then enters the "Browse Scores" mode shown in screen 560 of FIG. 54. In screen 560, the browse information identifies the game, score, and inning, but no channel information is provided as the game is not available for viewing. FIG. 55 illustrates an example of a channel manager virtual channel screen 570 that may be used in one embodiment of the present invention. The channel manager permits users to set favorite channels selected from both broadcast channels and data feeds. Broadcast channels 571 are indicated by the station call letters. The left hand column also indicates the channel number the user enters to tune to the station. Data feeds are accessed through virtual channels 572 and identified by the information accesinble through the virtual channel. For example, as shown in screen 570, channel 82 provides access to information in a data feed concerning the Arizona Cardinals professional football team. In addition, the user's favorite channel tuning sequence may be used to control the sequence in which program schedule and data feed information is displayed in the flip and browse modes. Thus, the user may utilize the flip and browse modes to review the information currently in data feeds (accessed through virtual channels) as well as program schedule information for real channels.

The virtual channels containing the data feeds are accessed in the same manner as broadcast channels. For example, to tune to National Football League information, the user may enter the digits 8–0 on the numeric keypad.

Figure 56:
FIG. 56 illustrates information contained in a virtual channel of one embodiment of the present invention.

Alternatively, the user may use the up/down arrow keys 43A and 43B while displaying the virtual channel screen 570 and depress the OK or ENTER key 44 to tune to the information. Upon accessing channel 82 as shown in FIG. 570, screen 580 of FIG. 56 is displayed. Additional screens of information may be accessed using the down arrow key 43B. In addition to providing access to information in data feeds, additional information may also be provided in the stored program schedule information in an improved sports mode of the present invention. For example, rather than storing program schedule information for only a few days, the database may include the entire season schedule for e.g., the professional sports teams in the user's viewing area. This team schedule information may also be accessed through one or more virtual channels.

FIG. 57 illustrates one example of how the product ordering feature described above may be utilized in conjunction with an on-demand data feed information service. Screen 590 illustrates information accessed through NHL channel 192. The two lines at the bottom indicate that two products are available for purchase. These products may be ordered by depressing the star key and inputting the information as described above.

Although the disclosed combined program guide/information service has been described herein using sports information as an example, it will be apparent to those of ordinary skill in the art that the disclosed system is not limited to sports information and has application for any type of information. The on-demand access to data feeds provided by the EPG of the present invention may be used, e.g., to provide information on late-breaking news stories, up-to-date weather information, stock quotations, etc. Screens such as those illustrated in FIGS. 48 and 49 may be provided for any category of information or theme. For example, a business data feed may be provided that permits the user to browse through stock quotes provided in a data feed while watching CNBC. The use of data feeds provides an especially powerful tool in conjunction with the aforedescribed product ordering feature. For example, in addition to receiving stock quotes, it is also possible to provide a system to execute trades using the remote control device or other user control means using the same techniques as for ordering products. Although screen 570 in FIG. 55 illustrates the use of a channel manager virtual channel for only the sports mode, it is apparent that the system may be configured to permit users to customize a favorite channel list or multiple favorite channel lists by combining broadcast channels and virtual channels that cross a range of categories. In addition to establishing a favorite channel list from the channels shown in screen 570, the user may select a favorite channel list comprising, e.g., news broadcast channels and virtual channels comprising news data feeds, weather channels, etc. In short, the access to data feeds provided by the present invention greatly enhances the utility of the EPG and, through the use of virtual channels, in effect converts it into a personalized multimedia information system with a convenient and highly flexible user interface.

The use of data feeds thus provide program distributors such as cable head-ends and DBS providers the flexibility to provide access to a wide variety of information. Information for the data feeds may be obtained from any of a number of sources. For example, near real time information on sports events in progress is provided by services including, but not limited to, SportsTicker, The Sports Network, Stats Inc., and the Associated Press. This information is then used to populate the sports data feed provided to users. Another possible information source is the Internet, which is a source of vast amounts of information on practically any topic imaginable. The provider of the EPG can receive information from the Internet and edit it to populate the data feeds in addition to information obtained directly from an information provider.

Figure 58:
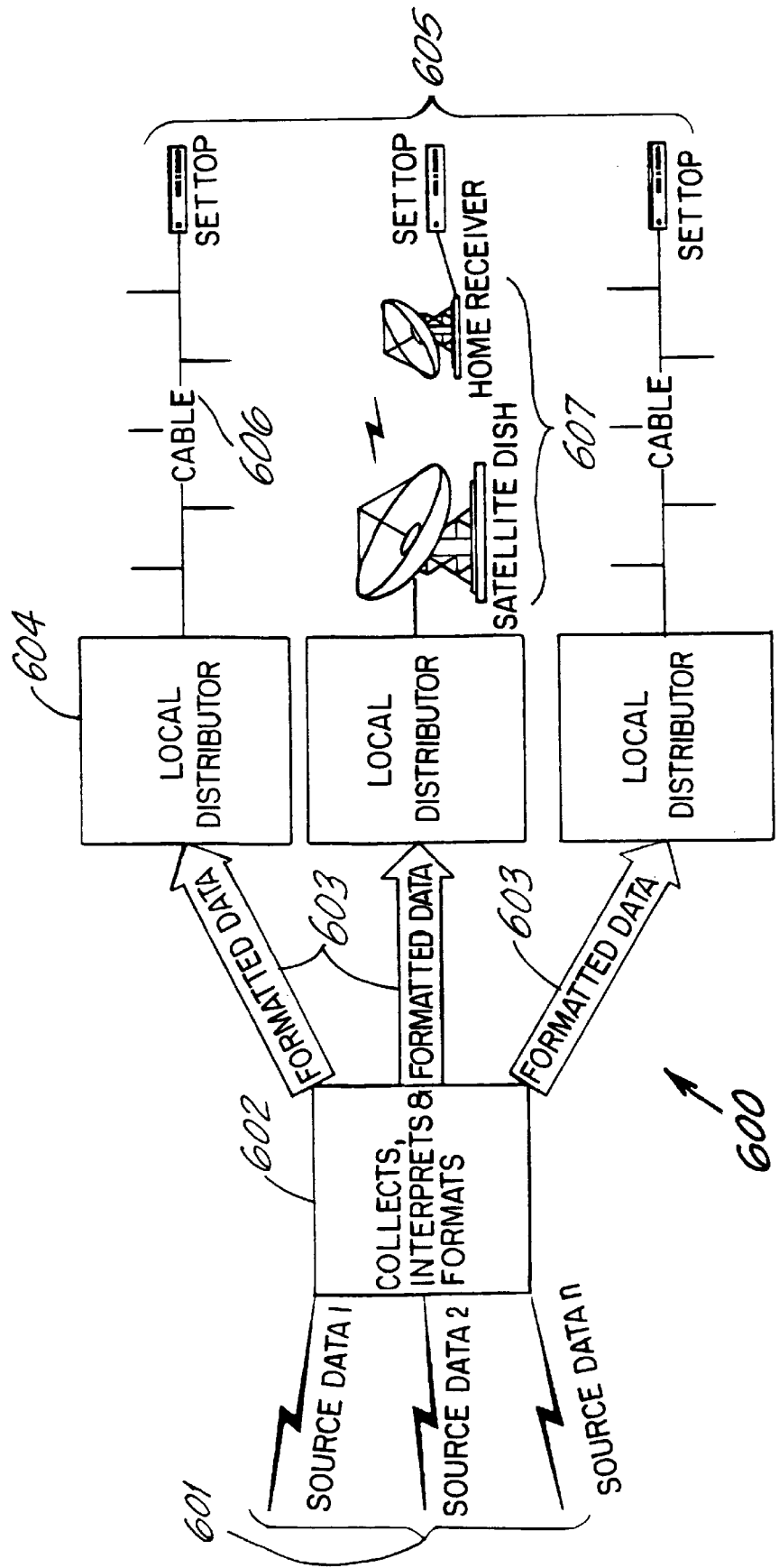
FIG. 58 is a schematic diagram of one embodiment of a system for receiving and distributing data feeds.

FIG. 58 is a schematic diagram of one embodiment of a receipt and distribution system for the data feeds of the present invention. Data feeds 601 from multiple sources are received by a central data management system 602 which collects, interprets, and formats the received data into data streams or feeds 603. Different data streams may be composed from different types of information. For example, one stream may contain exclusively sports information while another only business information. In this manner, local program distributors 604 may elect to carry only certain of the data streams. Alternatively, a single data stream containing all types of data may be used. The local program distributors provide the data streams, as well as the television programs and EPG to users' set top boxes 605. As shown in FIG. 58, the transmission path between local distributors and users' set top boxes may be coaxial cable 606 or a satellite transmitter and receiver 607. Other transmission paths may also be used, such as optical fiber.

There are numerous ways in which the data feeds may be provided to the users' set-top boxes or other processing equipment. The same principles discussed above in connection with transmission and reception of additional information relating to products available for purchase apply to the present discussion as well. For example, data streams may be transmitted in the VBI of one or several of the television signals transmitted to subscribers. The VBI is especially appropriate where the data feeds consist of textual data that does not require significant bandwidth for transmission. The modified system shown in FIG. 47 including the VBI decoder may then be used in order to receive the data streams. Rather than using the VBI, the full bandwidth of a real television channel may be used for carrying multiple data feeds rather than a single television signal. Alternatively, for digital distribution systems, an in-band or out-of-band digital channel may be used. It is expected that in the future, information in the data feeds will comprise digital audio and video, thereby further enhancing the value of the television as an information tool.

In order to implement the sports browser feature illustrated in e.g., FIG. 52 and the "Today's Games" feature illustrated in FIG. 50, it is necessary to correlate EPG data obtained from DRAM 18 with data from a received data feed. This is because in the browse box 541 of FIG. 52, the information concerning the program itself (the program title, channel, and time) is obtained from the stored program listings while the information concerning the status of the game (score and inning) is obtained from a received data feed.

In one embodiment of the present invention, the EPG data may be correlated with data from the data feed as follows. The data feed containing updated sports scores received at the cable head-end or other program distributor includes a unique identifying code for each sporting event. Updated information (i.e., score and inning or time remaining) in the data feed is preceded by the unique code for that game. In addition, the provider of the information feed assigns the unique codes in advance and provides the code for each upcoming sporting event to the EPG provider. The EPG provider then includes a field in the database of program schedule information for the unique code. Thus, for sporting events, the database of program schedule information stored in DRAM 18 includes the unique identifier for each event.

When program schedule information for a live sports event is displayed such as in the browse mode shown in FIG. 52, microcontroller 16 accesses the record for channel 11 for display on the user's television receiver and also reads the unique code associated with the game currently being broadcast on channel 11. The microcontroller 16 then accesses the data in a sports information feed and searches the data for the appropriate identifying code. When the appropriate code is identified, the updated information on the status of the sporting event is extracted from the data feed. The information extracted from the data feed is then provided to VDG 23 for display on the television receiver 27 in the manner described above in connection with the stored program schedule information. In this manner, displays such as that illustrated in 541 of FIG. 52 are possible.

It will be recognized by those of ordinary skill in the art that there are many other ways to correlate the program schedule data stored in the DRAM 18 with information on an incoming data stream. In an alternate embodiment, rather than identifying each individual sporting event with a code, team identifiers could be used to identify each game in which a particular team is a participant. Program schedule information would then be correlated with information in the data feed in the same manner described above, but on the basis of the team identifier rather than a program identifier. Team identification codes are particularly useful for information in data feeds that does not relate to a particular game. For example, in the screen shown in FIG. 570, where a virtual channel is used for information on individual teams, team identifiers in the received data feed may be used so that the microcontroller can extract the information concerning, e.g., the Arizona Cardinals, when channel 82 is accessed by the user.

Figure 54:
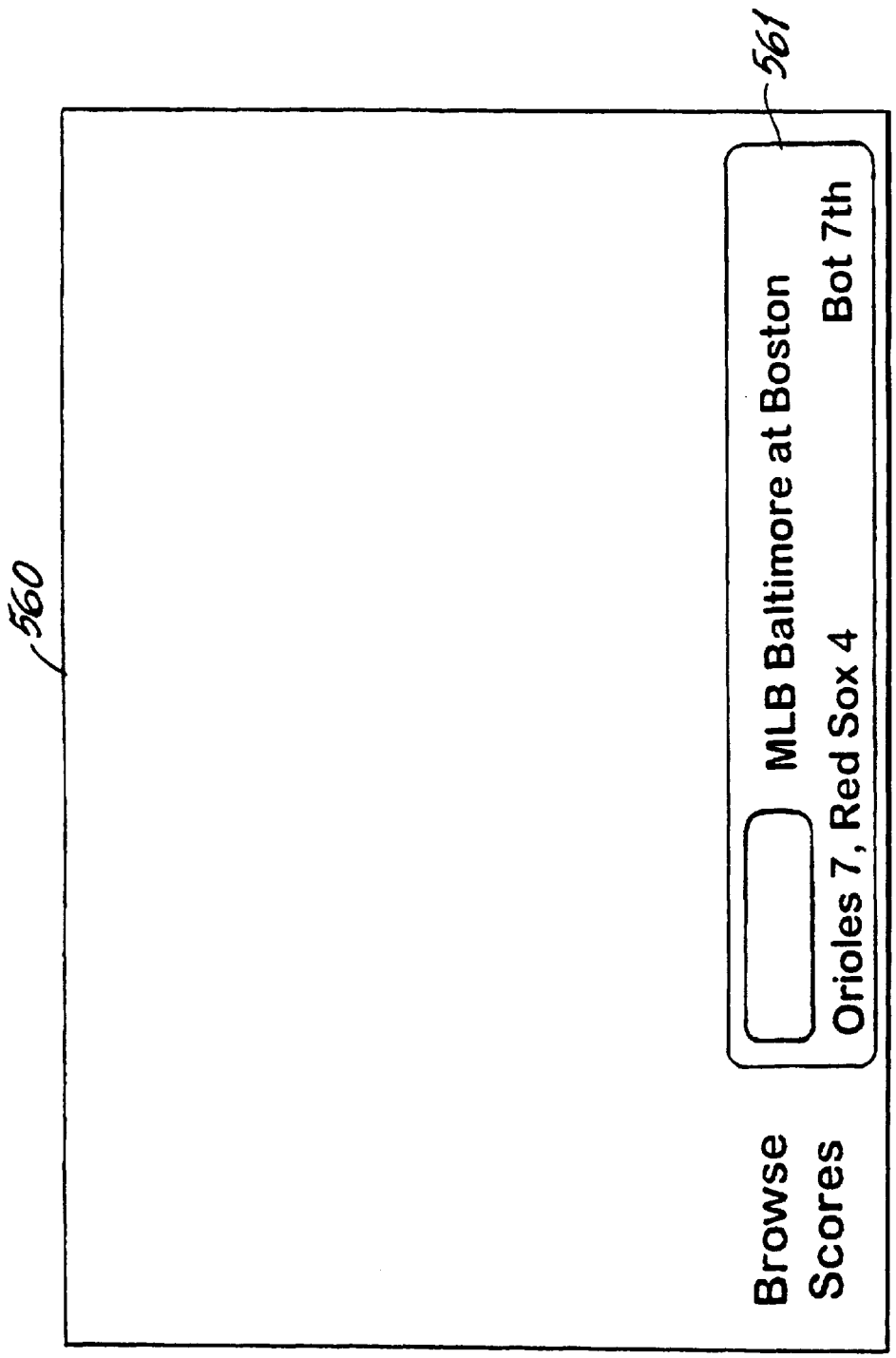
FIG. 54 illustrates an embodiment of the browse mode of the present invention.
Figure 55:
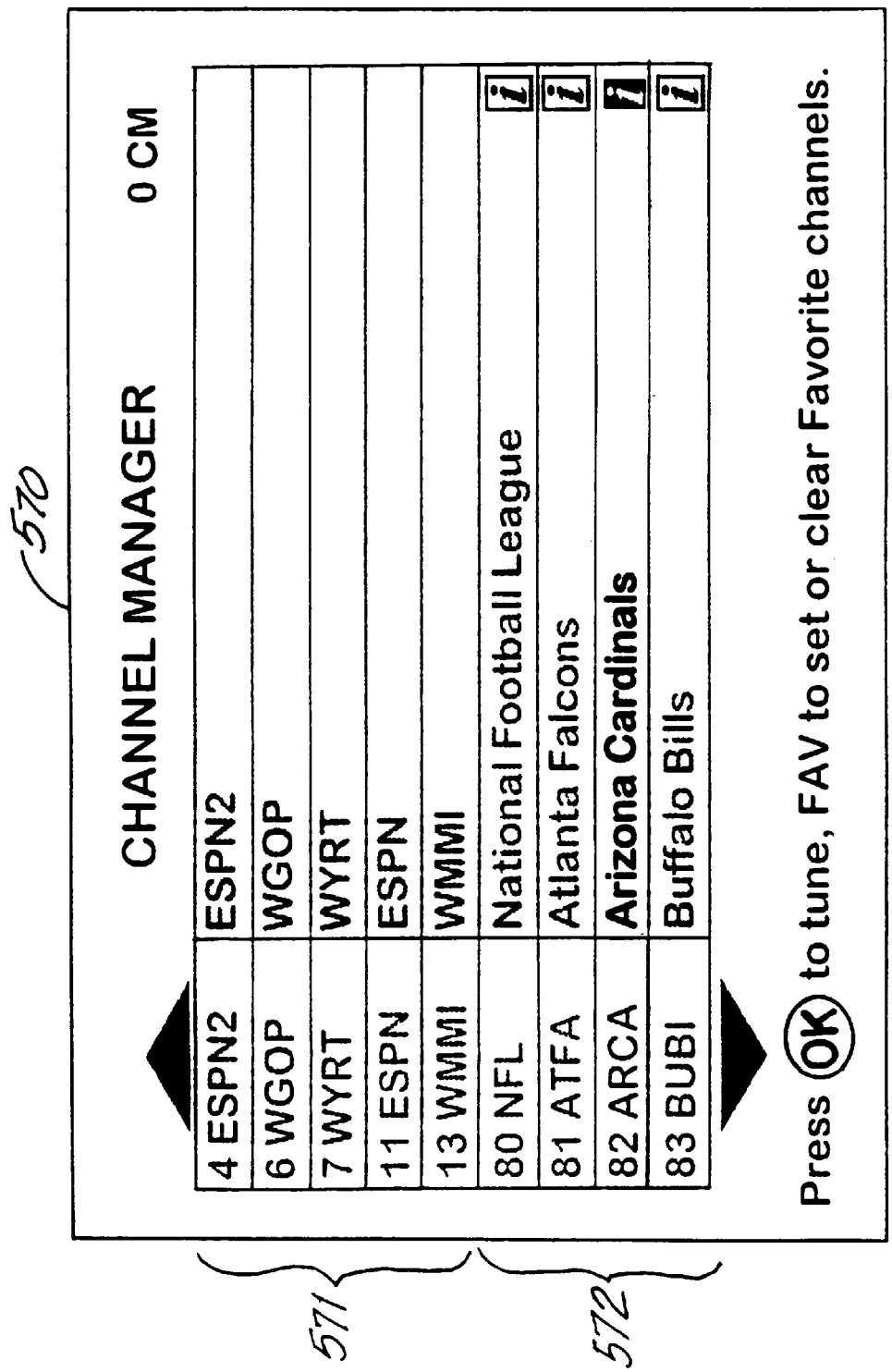
FIG. 55 illustrates a virtual channel screen for selecting favorite channels from both real and virtual channels.

In the browse scores mode shown in FIG. 54 where scores are displayed for games not being televised, it is not necessary to perform the correlation step described above. Microcontroller 16 may then be programmed to sequentially access each piece of information (i.e., updated scores) in the data feed for display by the VDG 23 under user-control with the up/down arrow keys 43A. Alternatively, in the browse scores mode, the microcontroller may be programmed to access only those updated scores for games not televised or televised games that are concluded and thus not displayed in browse mode of FIG. 52. Thus, when the user depresses the up/down arrow keys 43A, scores for televised games in progress are skipped by the microcontroller 16. In this manner, the scores browse mode may conveniently be accessed at the beginning or end of the sports browse mode of FIG. 52—after all the channels currently airing sporting events are cycled through using, e.g., the up arrow key, the user may then browse scores of non-televised and concluded games by continuing to depress the up arrow key and then wrap around to the beginning of the sports browse mode of FIG. 52.

The form and content of a particular computer program to implement the invention disclosed herein will be readily apparent to those skilled in the art of video system programming and graphic display. A flow chart showing the operation logic of the system is shown in FIGS. 36a–d. It will also be appreciated by those skilled in the art that there can be departure from the specific embodiment of the invention described herein without departing from the true scope of the claims appended hereto.

We claim:

1. An electronic television program schedule system comprising:

storage means for storing program schedule information for a plurality of television programs, said program schedule information comprising, for at least one of said programs, information identifying said at least one program as a sporting event;

data processing means for generating video display control commands;

means for receiving a data feed during the pendency of said sporting event, said data feed comprising information regarding the status of said event;

means for correlating said program schedule information for said sporting event with said status information for said sporting event;

a video display generator for receiving said video display control commands from said data processing means, said program schedule information from said storage means, and said status information from said data feed, wherein said video display generator generates a display signal concurrently comprising said program schedule information for said sporting event and said status information for said sporting event.

2. The system of claim 1 further comprising a television receiver for receiving said display signal and concurrently displaying said program schedule information for said sporting event and said status information for said sporting event.

3. A process for displaying program schedule information and status information for a sporting and in progress televised event comprising:

receiving, prior to said event, information identifying the title, time, and television channel of said event, storing said time, title, and channel information for said event in an electronic storage device, receiving, during said televised event, status information for said event, retrieving said time, title, and channel information from said storage device during said sporting event, correlating said retrieved time, title, and channel information with said received status information for said sporting event, and causing a display device to simultaneously display said time, title, and channel information and said status information for said sporting event during the pendency of said event.

4. The process of claim 3 further comprising receiving the television signal for said sporting event and causing said television signal to be displayed simultaneously with said time, title and channel information and said status information.

5. An electronic television program schedule system comprising:

storage means for storing program schedule information for a plurality of television programs, said program schedule information comprising, for at least one of said programs, information identifying said at least one program as a sporting event;

user control means for generating user control commands, said user control commands including channel tuning commands;

data processing means for generating video display control commands in response to said user control commands;

means for receiving a data feed, said data feed comprising information associated with said sporting event;

a user interface for said television program schedule system, said interface comprising a virtual channel for access to said data feed, said interface further comprising means for establishing a favorite channel tuning sequence controlled by said channel tuning commands, said sequence optionally comprising both real and said virtual channels;

a video display generator for receiving said video display control commands from said data processing means, said program schedule information from said storage means, said information from said data feed, and a television program signal from a television receiver, and for generating a display signal comprising any one of said received program schedule information, said received data feed information, and said received television program signal.

6. The system of claim 5 wherein:

said data feed further comprises additional information for a plurality of televised and non-televised sporting events and said video display generator receives said additional information and generates a display signal comprising said additional information.

7. The system of claim 5 wherein:

said program schedule information further comprises information indicating the availability for purchase of a product associated with said sporting event; and said video display generator generates a display signal comprising said information indicating the availability for purchase of said product.

8. The system of claim 7 wherein:

said program schedule information further comprises detailed information describing said product;

said user control commands further comprises a first control command; and said display generator generates a display signal comprising said detailed information describing said product in response to said first control command.

9. The system of claim 8 wherein:

said user control commands further comprises a second control command; and said data processing means generates an order for said product in response to said second control command.

10. The system of claim 1 wherein:

said data feed further comprises additional information for a plurality of televised and non-televised sporting events; and said video display generator additionally receives said additional information, and generates a display signal concurrently comprising a portion of said program schedule information and said received data feed information.

11. The system of claim 10 wherein:

said program schedule information further comprises information indicating the availability for purchase of a product associated with said at least one sporting event; and said video display generator generates a display signal concurrently comprising a portion of said received program schedule information, said received data feed information and said information indicating the availability for purchase of said product.

12. The system of claim 11 further comprising:

user control means for generating user control commands, said user control commands including a first control command; and wherein said data processing means generates video display control commands in response to said user control commands;

said program schedule information further comprises detailed information describing said product; and said display generator additionally receives said video display control commands, and generates said display signal further comprising said detailed information describing said product in response to said first control command.

13. The system of claim 12 wherein:

said user control commands further comprises a second control command; and said data processing means generates an order for said product in response to said second control command.

14. The process of claim 3 further comprising:

receiving additional information regarding televised and non-televised sporting events; and causing said display device to further display said additional information.

15. The process of claim 3 further comprising:

receiving information indicating the availability for purchase of a product associated with said sporting event; and causing said display device to further display said information indicating the availability for purchase of said product.

16. The process of claim 15 further comprising:

receiving detailed information regarding said product; and causing said display device to further display said detailed information.

17. The process of claim 16 further comprising:

causing said product to be ordered in response to user control commands received by said display device.

18. A process for displaying information associated with a sporting event and program schedule information for television programs comprising:

receiving a data feed, said data feed comprising information associated with a plurality of sporting events, receiving program schedule information for a plurality of television programs, said program schedule information comprising, for at least one of said programs, information identifying said at least one program as a sporting event, storing said data feed information and said program schedule information in an electronic storage device, retrieving said data feed information and said program schedule information from said storage device, correlating said data feed information and said program schedule information for said sporting events, and causing a display device to display at least a portion of any one of said data feed information, said program schedule information and said correlated data feed information and program schedule information.

19. An electronic television program schedule system comprising:

a storage means for storing program schedule information for a plurality of television programs, said program schedule information comprising, for at least one of said programs, information identifying said at least one program as a sporting event, data processing means for generating video display control commands, means for receiving a data feed, said data feed comprising information associated with a plurality of sporting events, means for correlating said schedule information and said data feed information, a video display generator for receiving said video display control commands from said data processing means, said program schedule information from said storage means, and said data feed information from said data feed, wherein said video display generator generates a display signal comprising at least a portion of any one of said program schedule information and said data feed information.

* * * * *